US012163630B2

(12) United States Patent
Hu et al.

(10) Patent No.: US 12,163,630 B2
(45) **Date of Patent: *Dec. 10, 2024**

(54) LIGHTING APPARATUS

(71) Applicant: EPISTAR CORPORATION, Hsinchu (TW)

(72) Inventors: Wei-Chiang Hu, Hsinchu (TW); Keng-Chuan Chang, Hsinchu (TW); Chiu-Lin Yao, Hsinchu (TW); Chun-Wei Lin, Hsinchu (TW); Jung-Chang Sun, Hsinchu (TW)

(73) Assignee: EPISTAR CORPORATION, Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/396,394

(22) Filed: Dec. 26, 2023

(65) Prior Publication Data

US 2024/0167640 A1 May 23, 2024

Related U.S. Application Data

(63) Continuation of application No. 17/653,842, filed on Mar. 7, 2022, now Pat. No. 11,852,302, which is a (Continued)

(30) Foreign Application Priority Data

Mar. 5, 2014 (TW) ................................ 103107599
Jan. 29, 2015 (TW) ................................ 104103105

(51) Int. Cl.
*F21K 9/23* (2016.01)
*F21K 9/00* (2016.01)
(Continued)

(52) U.S. Cl.
CPC ................. *F21K 9/23* (2016.08); *F21K 9/00* (2013.01); *F21V 19/0005* (2013.01); (Continued)

(58) Field of Classification Search
CPC ........... F21K 9/23; F21K 9/00; F21V 19/0005
(Continued)

(56) References Cited

U.S. PATENT DOCUMENTS 9,490,295 B2 11/2016 Chen et al.
9,732,930 B2 8/2017 Takeuchi et al.
(Continued)

FOREIGN PATENT DOCUMENTS

DE 10 2013 209 852 A1 11/2014
WO WO-2015/144469 A1 10/2015

*Primary Examiner* — Laura K Tso
(74) *Attorney, Agent, or Firm* — Muncy, Geissler, Olds & Lowe, P.C.

(57) ABSTRACT

A light-emitting unit, having a substrate; a first light-emitting body formed on the substrate, and having a first longer side and a first shorter side; a second light-emitting body formed on the substrate, and having a second longer side and a second shorter side which is parallel to the first longer side; a third light-emitting body formed on the substrate, having a third longer side and a third shorter side which is parallel to the first longer side, and electrically connected to the first light-emitting body and the second light-emitting body; a first electrode covering the first light-emitting body and the second light-emitting body, and electrically connecting to the first light-emitting body; a second electrode separated from the first electrode, and covering the second light-emitting body without covering the first light-emitting body; and a transparent element enclosing the first light-emitting body, the second light-emitting body, and the third light-emitting body.

20 Claims, 47 Drawing Sheets

Related U.S. Application Data continuation of application No. 16/888,004, filed on May 29, 2020, now Pat. No. 11,268,659, which is a continuation of application No. 15/935,880, filed on Mar. 26, 2018, now Pat. No. 10,670,192, which is a continuation of application No. 14/639,246, filed on Mar. 5, 2015, now Pat. No. 9,927,070.

(51) Int. Cl.
*F21V 19/00* (2006.01)
*F21Y 105/10* (2016.01)
*F21Y 115/10* (2016.01)

(52) U.S. Cl.
CPC ......... *F21V 19/001* (2013.01); *F21Y 2105/10* (2016.08); *F21Y 2115/10* (2016.08)

(58) Field of Classification Search
USPC ............................................ 362/382, 249.02
See application file for complete search history.

(56) References Cited

U.S. PATENT DOCUMENTS

| | | | | |
|---|---|---|---|---|
| 9,900,095 | B2 | 2/2018 | Hong et al. | |
| 9,927,070 | B2 | 3/2018 | Hu et al. | |
| 10,670,192 | B2 | 6/2020 | Hu et al. | |
| 11,268,659 | B2 | 3/2022 | Hu et al. | |
| 11,852,302 | B2 * | 12/2023 | Hu | F21K 9/23 |
| 2005/0185401 | A1 | 8/2005 | Jiang et al. | |
| 2009/0103295 | A1 | 4/2009 | Wang | |
| 2010/0103673 | A1 | 4/2010 | Ivey et al. | |
| 2011/0141739 | A1 | 6/2011 | Ha | |
| 2011/0221330 | A1 | 9/2011 | Negley et al. | |
| 2011/0222285 | A1 | 9/2011 | Ye et al. | |
| 2012/0155086 | A1 | 6/2012 | Shimonish et al. | |
| 2013/0058099 | A1 | 3/2013 | Shum et al. | |
| 2013/0100658 | A1 | 4/2013 | Pickard et al. | |
| 2013/0106301 | A1 | 5/2013 | Imai | |
| 2013/0271991 | A1 | 10/2013 | Hussell et al. | |
| 2014/0111979 | A1 | 4/2014 | Bushee | |
| 2014/0334164 | A1 | 11/2014 | Miyata | |
| 2015/0022088 | A1 | 1/2015 | Gershowitz et al. | |
| 2015/0176820 | A1 | 6/2015 | Abe et al. | |
| 2015/0233544 | A1 | 8/2015 | Kircher et al. | |

* cited by examiner

LIGHTING APPARATUS

CROSS-REFERENCE TO RELATED APPLICATIONS

This application is a continuation of co-pending application Ser. No. 17/653,842 filed Mar. 7, 2022, which is a continuation of Ser. No. 16/888,004 filed May 29, 2020 which issued as U.S. Pat. No. 11,268,659 on Mar. 8, 2022, which is a continuation of application Ser. No. 15/935,880 filed on Mar. 26, 2018 which issued as U.S. Pat. No. 10,0670,192 on Jun. 2, 2020, which is a continuation of application Ser. No. 14/639,246 filed Mar. 5, 2015 which issued as U.S. Pat. No. 9,927,070 on Mar. 27, 2018, for which priority is claimed under 35 U.S.C. § 120; and this application claims priority of Application No. 103107599 filed in Taiwan on Mar. 5, 2014, and Application No. 104103105 filed in Taiwan on Jan. 29, 2015 under 35 U.S.C. § 119; the entire contents of all of which are hereby incorporated by reference.

TECHNICAL FIELD

The present disclosure relates to a lighting apparatus and in particular to a package structure with a volume less than 5000 mm3 has a light intensity greater than 150 lumens.

DESCRIPTION OF THE RELATED ART

The light-emitting diodes (LEDs) of the solid-state lighting elements have the characteristics of low power consumption, low heat generation, long operational life, shockproof, small volume, quick response and good opto-electrical property like light emission with a stable wavelength so the conventional lighting fixture are gradually replaced by the LEDs. As the opto-electrical technology develops, the solid-state lighting elements have great progress in the light efficiency, operation life and the brightness, and LEDs have been widely used in household appliances.

SUMMARY OF THE DISCLOSURE

A lighting apparatus comprises: a board; a plurality of light-emitting units disposed on the board; and a package structure enclosing all of the light-emitting units and having a volume less than 5000 mm3. The lighting apparatus has a light intensity greater than 150 lumens.

The following description illustrates embodiments and together with drawings to provide a further understanding of the disclosure described above.

DETAILED DESCRIPTION OF THE EMBODIMENTS

The drawings illustrate the embodiments of the application and, together with the description, serve to illustrate the principles of the application. The same name or the same reference number given or appeared in different paragraphs or figures along the specification should has the same or equivalent meanings while it is once defined anywhere of the disclosure. The thickness or the shape of an element in the specification can be expanded or narrowed. It is noted that the elements not drawn or described in the figure can be included in the present application by the skilled person in the art.

Figure 1A:
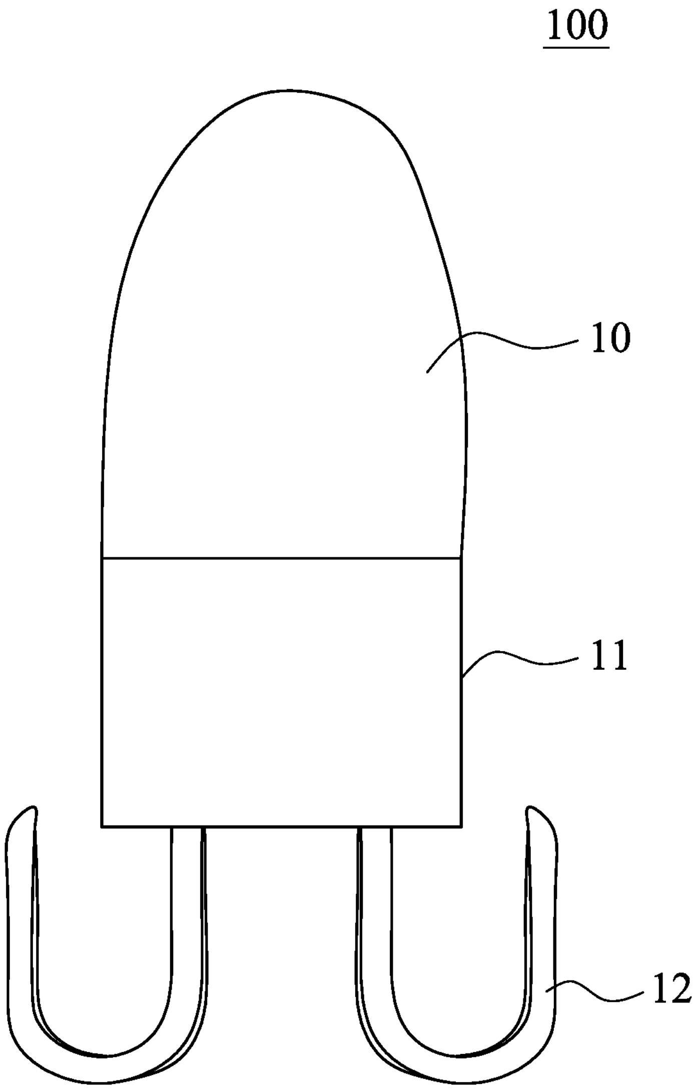
FIG. 1A shows a drawing of a lighting apparatus in accordance with an embodiment of the present disclosure.
Figure 1B:
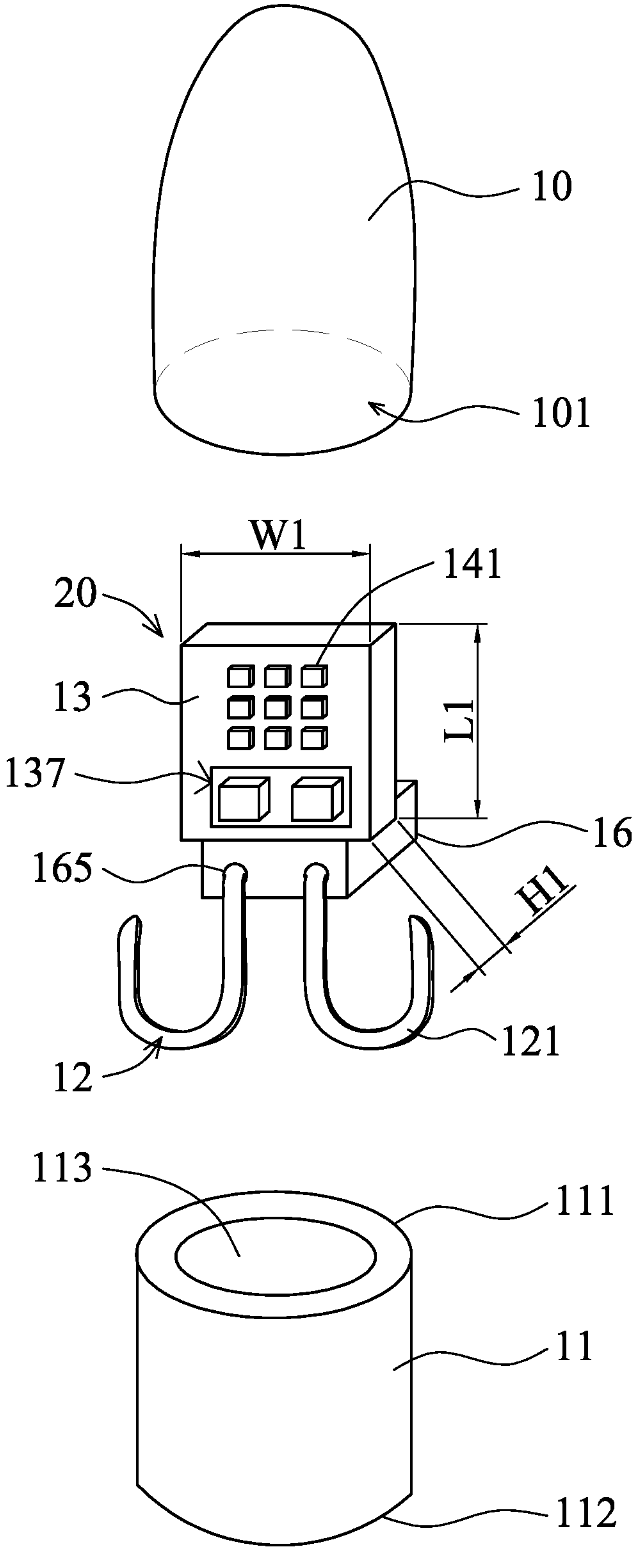
FIG. 1B shows an exploded view of the lighting apparatus shown in FIG. 1A.

FIG. 1A shows a drawing of a lighting apparatus 100 in accordance with an embodiment of the present disclosure. FIG. 1B shows an exploded view of the lighting apparatus 100. Referring to FIGS. 1A~1B, the lighting apparatus 100 has a package structure 10, a base 11, an electrical connector 12 and a light-emitting device 20. The light-emitting device 20 has a board 13, a plurality of light-emitting units 141 disposed on the board 13, a first circuit structure 137 disposed on the board 13, a connecting board 16 mounted on the board 13 and having two through holes 165. The electrical connector 12 extends into the through holes 165 and is electrically connected to the light-emitting units 141. In one embodiment, the package structure 10 is a hollow housing defining an inner chamber 101 therein, and the board 13 placed within the inner chamber 101 has a width (W1) which is a slightly smaller than or equal to the width of the inner chamber 101 or the inner width of the package structure 10 (referring to FIG. 6A). The light-emitting units 141 are substantially enclosed by the package structure 10, and the first circuit structure 137 is exposed outside of the package structure 10. In another embodiment, the package structure 10 can enclose or cover the first circuit structure 137, or the package structure 10 can enclose or cover the entire board 13. The base 11 has an upper portion 111 and a bottom portion 112. A chamber 113 is defined by the based 11 and is open at the upper portion 111 and the bottom portion 112. The first circuit structure 137 can be accommodated inside the chamber 113, that is, the base 11 can enclose the first circuit structure 137. The electrical connector 12 has two pins 121 penetrating through the bottom portion 112 of base 11, therefore a part of the pins 121 is enclosed by the base 11 and another part is exposed outside of the base 11 for electrically connecting to the external power supply (not shown). In another embodiment, the package structure 10 can enclose or cover the first circuit structure 137 or the entire board 13, and the base 11 encloses only a part of the electrical connector 12. The board 13 has a length (L1) of between 10 mm~35 mm, a width (W1) of between 5 mm~14 mm, and a height (H) of between 0.4 mm~1.5 mm. In the range of the foregoing size, the board 13 has an area (L1*W1) of between 50 mm2~490 mm2, and the lighting apparatus 100 has a weight of less than or equal to 12 grams.

Figure 2A:
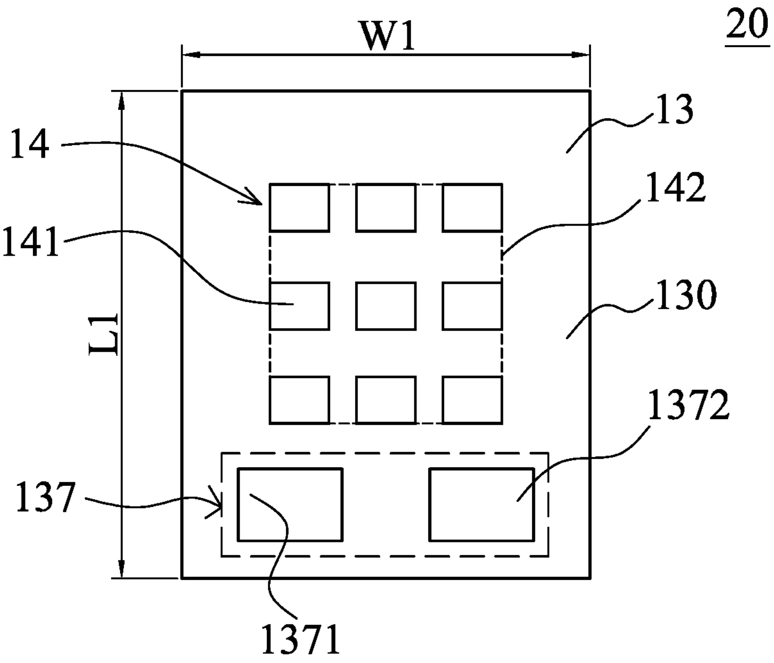
FIGS. 2A-2B show views of a plurality of the light-emitting units disposed on two opposite sides of the board in accordance with an embodiment of the present disclosure.
Figure 2B:
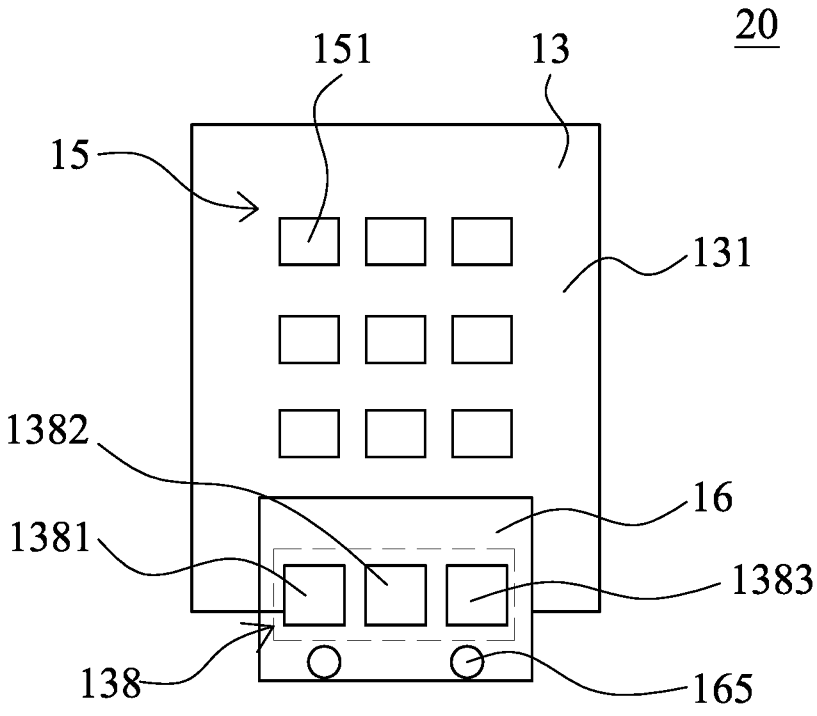

FIG. 2A and FIG. 2B show views of a light-emitting device 20 in accordance with one embodiment of the present disclosure. The board 13 has a first surface 130 and a second surface 131. Referring to FIG. 2A, a first light-emitting group 14 is disposed on the first surface 130. The light-emitting group 14 includes a plurality of the light-emitting units 141 electrically connected with each other in series. Moreover, the light-emitting units 141 can be electrically connected with each other in parallel or series-parallel connection. The first circuit structure 137 disposed on the first surface 130 is closer to the base 11 than the light-emitting units 141 (referring to FIG. 1B), and is electrically connected to the first light-emitting group 14. In this embodiment, the first circuit structure 137 includes a bridge rectification 1371 and a resistor 1372. In another embodiment, the first circuit structure 137 can include an inductor, a thermistor, a capacitor or an integrated circuit (IC). The thermistor can include negative temperature coefficient thermistor (NTC) or positive temperature coefficient thermistor (PTC). To be more specific, by virtue of the thermistor, the lighting apparatus 100 can have the substantially same power consumption between the cold state and the thermal steady state, for example, a difference of the power consumptions of the lighting apparatus 100 between the cold state and the thermal steady state is less than 10% of the power consumption in the cold state.

Figure 3A:
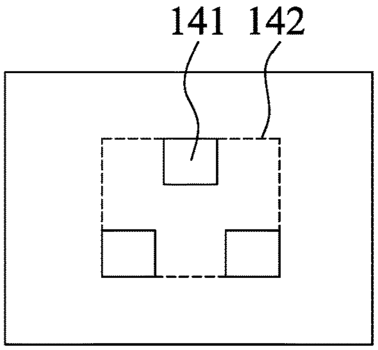
FIGS. 3A~3F show cross-sectional views of a plurality of light-emitting units placed on the board in different way.
Figure 3B:
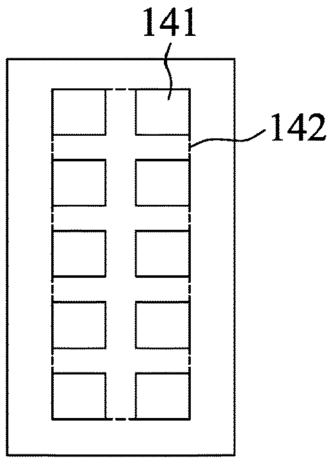
Figure 3C:
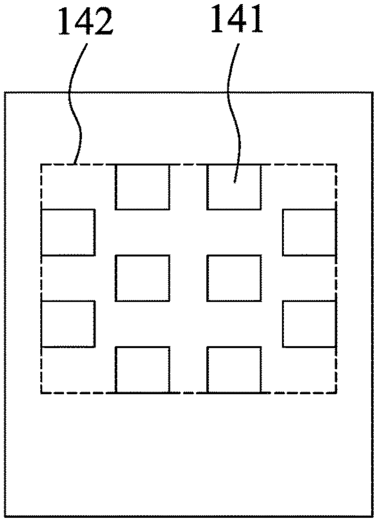
Figure 3D:
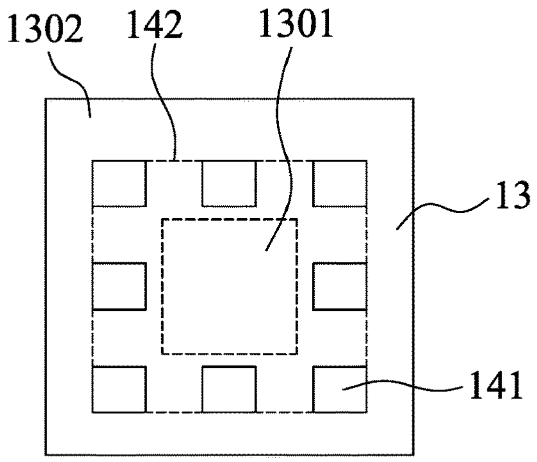
Figure 3E:
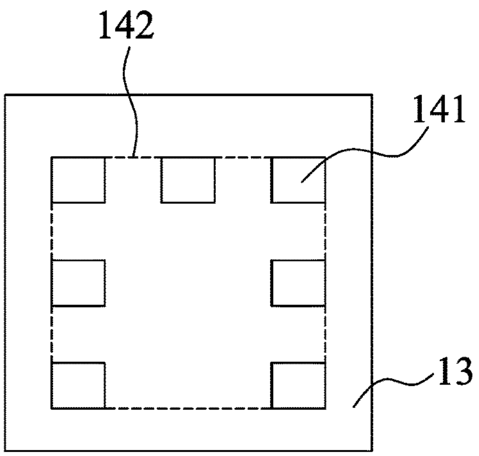

Referring to FIG. 2A, a plurality of light-emitting units 141 has an outer boundary defining a smallest rectangle 142. In other words, the smallest rectangle 142 is defined by a polygon enclosing all of the light-emitting units 141, and each side of the smallest rectangle 142 overlaps an outer boundary of at least one light-emitting unit. As shown in FIG. 3A, when the plurality of light-emitting units 141 are arranged in a triangle, the smallest rectangle defined by the outer boundary of the light-emitting units 141 is shown in the dotted line 142. As shown in FIG. 3B, when the plurality of light-emitting units 141 is arranged in two columns, the smallest rectangle defined by the outer boundary of the light-emitting units 141 is shown in the dotted line 142. Alternatively, the plurality of light-emitting units 141 is arranged as shown in FIG. 3C, the smallest rectangle is shown in the dotted line 142. Also, as shown in FIG. 3D, the board 13 has a central area 1301 and a surrounding area 1302 encircling the central area 1301. The plurality of the light-emitting units 141 is disposed outside of the central area 1301, that is, a plurality of light-emitting units 141 is arranged along the surrounding area 1302 without occupying the central area 1301. This configuration can reduce the light emitted from the plurality of light-emitting units 141 to be absorbed by the adjacent light-emitting unit so the light intensity of the lighting apparatus is increased. In this embodiment, although the central area 1301 of the board 13 does not have the light-emitting units 141 disposed thereon, the plurality of light-emitting units 141 still has an outer boundary defining a smallest rectangle (the dotted line 142). As shown in FIG. 3E, the plurality of the light-emitting units 141 is arranged in a ⊓ shape, and the smallest rectangle defined by the outer boundary of the plurality of the light-emitting units 141 is similar to that of FIG. 2A and/or FIG. 3E.

Figure 3F:
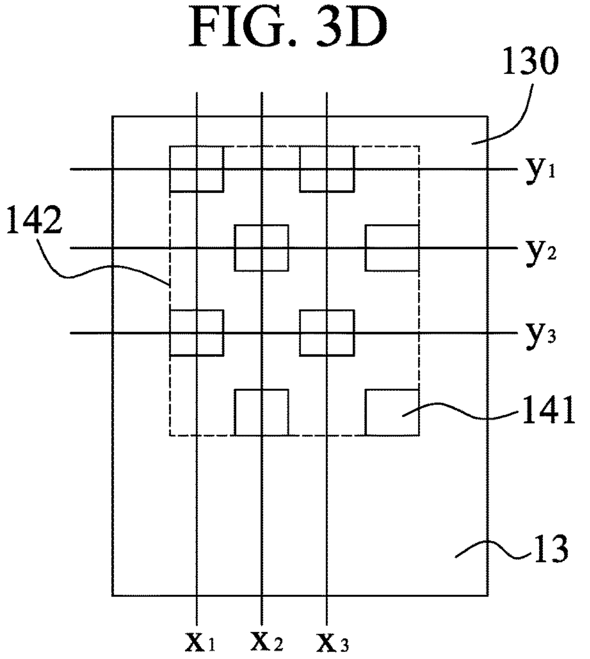

As shown in FIG. 3F, the plurality of the light-emitting units 141 is arranged on the board 13 in a staggered arrangement. In this embodiment, the position where the light-emitting units are disposed on the first surface 130 can be expressed in two dimensional Cartesian coordinates (xi, yi), herein xi and yi are the coordinates in horizontal direction and vertical direction, respectively; i and j are positive integer. For example: the plurality of the light-emitting units 141 includes at least three light-emitting units located at (x1, y1), (x2, y2), (x3, y1), however there is no light-emitting unit located at (x2, y1). Furthermore, in this embodiment, the smallest rectangle is shown in the dotted line 142.

FIGS. 3A~3F show merely the cross-sectional views of the first surface 130 of the board 13, and the light-emitting units 141 can also be disposed on the second surface 131. Additionally, while calculating the total surface area of the board 13, only the surface which has the light-emitting units disposed on are counted. For example, as shown is FIG. 2A, the smallest rectangle 142 is defined by the outer boundary of the plurality of the light-emitting units 141; the total surface area of the board 13 is L1*W1. When the smallest rectangle 142 as mentioned above has a surface area which is about 0.5~0.98 of the total surface area of the first surface 130 of the board 13, the lighting apparatus 100 operated under the operating current of 5~20 mA and the operating voltage with a root-mean-square voltage of 100~130V or 200~260V has a light intensity of more than 150 lumens or more than 200 lumens in the thermal steady state. When the smallest rectangle includes a non-lighting structure, the surface area of the smallest rectangle should deduct the surface area occupied by the non-lighting structure. For example, as shown in FIG. 3D, when a non-lighting structure such as inductor, resistor, capacitor, thermistor, integrated circuit (IC) or diode is disposed on the central area 1301, the surface area occupied by the non-lighting structure is required to be excluded while calculating the surface area of the smallest rectangle.

Referring to FIG. 2B, a second light-emitting group 15 is disposed on the second surface 131 of the board 13. The second light-emitting group 15 includes a plurality of the light-emitting units 151 electrically connected with each other in series. Moreover, the plurality of the light-emitting units 151 can be electrically connected with each other in parallel or series-parallel connection. The lighting apparatus 100 further includes a connecting board 16. The connecting board 16 is disposed on the second surface 131 and is closer to the base 11 than the second light-emitting group 15 (referring to FIG. 1B). The connecting board 16 has two through holes 165 at a position outside of the board 13 without overlapping the board 13. A second circuit structure 138 is disposed on the connecting board 16 and electrically connected to the second light-emitting group 15. The second circuit structure 138 is disposed between the second light-emitting group 15 and the through holes 165. In this embodiment, the second circuit structure 138 includes two capacitors 1381, 1382 and a resistor 1383. In another embodiment, the second circuit structure 138 can include an inductor, a thermistor, a capacitor or an integrated circuit (IC). The thermistor can include negative temperature coefficient thermistor (NTC) or positive temperature coefficient thermistor (PTC). As shown in FIG. 2A and FIG. 2B, the plurality of the light-emitting units 141, 151 are disposed on the two opposing surfaces of the board 13 so the lighting apparatus 100 can have an omni-directional light pattern with the emitting angle of at least 270 degrees (referring to FIG. 2C, the central axis (C) of the board 13 in a length direction is 0 degree and ±180 degrees, and the emitting angle of 270 degrees means the range between ±135 degrees); or the light emitted from the plurality of the light-emitting units 141,151 disposed on the two opposing surfaces of the board 13 (for example: emitting upward and downward) can be reflected by a reflector such that the light emitting toward opposite directions (for example: emitting upward and downward) is redirected toward the same direction (for example: the reflector reflects the light emitted upward to emit downward). In another embodiment, all of the plurality of the light-emitting units can be disposed on one of the surfaces of the board 13, and 90% of the light emitted from the plurality of the light-emitting units emits in a direction so the lighting apparatus has a semi-directional light pattern. Alternatively, a portion of the light emitting toward one direction (for example: emitting downward) can be redirected to opposite direction by using diffusion particles or an additional reflector (for example: about 5~20% of the light emitting downward is scattered or reflected to change its direction to emit upward). The definition of omni-direction and semi-direction can be referred to Energy Star requirements.

Figure 2C:
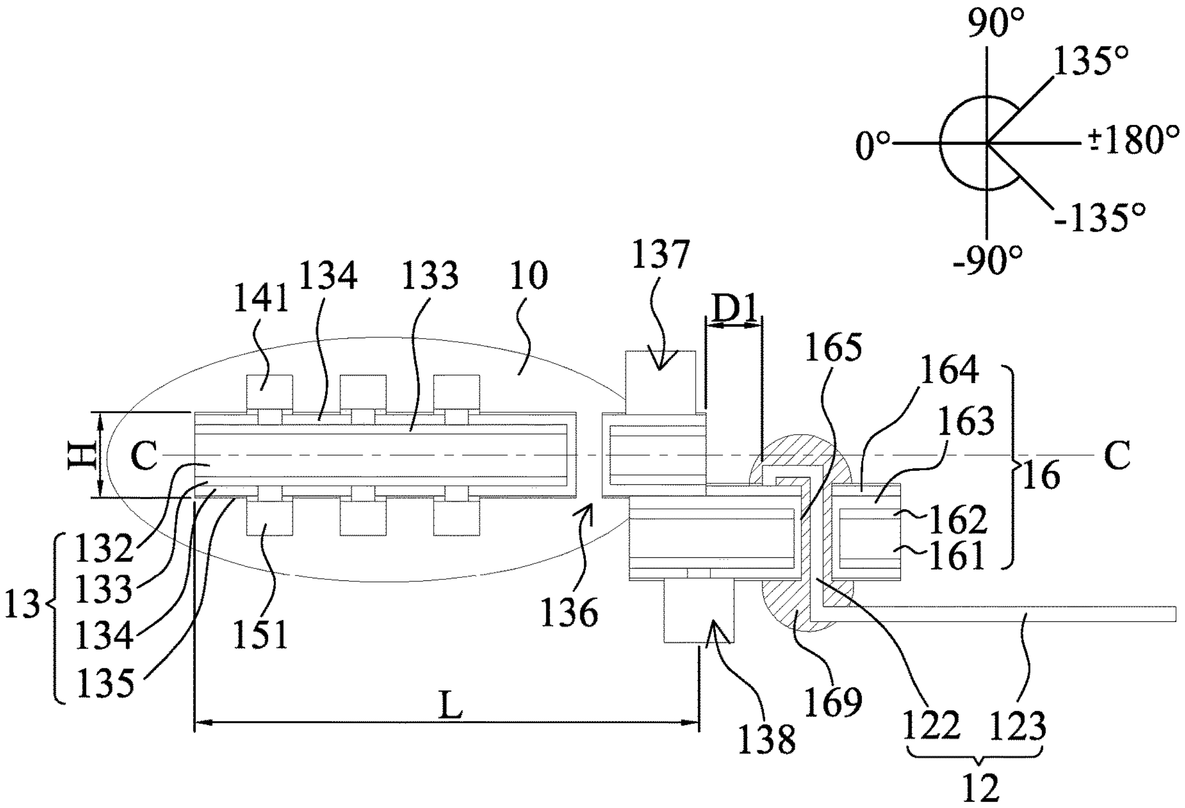
FIG. 2C shows a cross-sectional view of the lighting apparatus shown in FIG. 1A.

FIG. 2C shows a cross-sectional view of the lighting apparatus 100 shown in FIG. 1A. In FIG. 2C, the base 11 is not shown. The board 13 is a multi-layered structure and has a height (H) of 0.5~1.8 mm. The board 13 includes a supporting board 132, two insulating layers 133 formed on two opposite sides of the supporting board 132, respectively, two patterned conductive layers 134 formed on two insulating layers 133, respectively, and two reflective insulating layers 135 formed on the patterned conductive layers 134, respectively. The plurality of the light-emitting units 141, 151 is mounted on the patterned conductive layers 134 of two opposite sides of the board 13, respectively. The board 13 further includes a through hole 136 penetrating through the board 13. The patterned conductive layer 134 is also formed within the through hole 136 so two patterned conductive layers 134 disposed on two opposite sides of the supporting board 132 can be electrically connected with each other by the patterned conductive layer 134 formed within the through hole 136, and the light-emitting units 141 can also be electrically connected to the light-emitting units 151. The light emitting units 141, 151 can be electrically connected with each other in series or in parallel. The package structure 10 covers entirely all the light-emitting units 141, 151. The package structure can have a rectangle, elliptical, circular, or polygonal shape in cross section.

The connecting board 16 is a multi-layered structure and has a supporting board 161, two insulating layers 162 formed on two opposite sides of the supporting board 161, respectively, two patterned conductive layers 163 formed on two insulating layers 162, respectively, and two reflective insulating layers 164 formed on the patterned conductive layers 134, respectively. In one embodiment, two insulating layers 162 cannot be formed on two opposite sides of the supporting board 161; therefore, two patterned conductive layers 163 are directly formed on two opposite sides of the supporting board 161. The connecting board 16 is mounted on the second surface 131 of the board 13 and has a portion extending outside of the board 13. The patterned conductive layer 163 of the connecting board 16 contacts the patterned conductive layer 134 of the board 13 to form the electrical connection therebetween, and is further electrically connected to the light-emitting units 141, 151. The second circuit structure 138 is formed on the connecting board 16 opposite to the board 13. The connecting board 16 has two through holes 165 penetrating therethrough and the patterned conductive layer 163 is formed within the through holes 165, so the patterned conductive layers 163 disposed on two opposite sides of supporting layer 161 are electrically connected with each other by the patterned conductive layer 163 formed within the through holes 165. The electrical connector 12 has a first terminal 122 and a second terminal 123. The first terminal 122 penetrates the through hole 165 and the electrical connector 12 is mounted on the connecting board 16 by a conductive material 169 (such as solder or silver paste) to electrically connect the electrical connector 12, the first circuit structure 137, the second circuit structure 138 with the light-emitting units 141, 151. The second terminal 122 is used to electrically connect to the external circuit (for example: power supply).

The supporting board 132 has a height of 0.2~1.5 mm and includes a metal material, such as copper, aluminum, or electrically insulating material such as epoxy, glass fiber, aluminum oxide, or combinations thereof. The supporting board 161 can include electrically insulating material such as epoxy, glass fiber, aluminum oxide, or combinations thereof. The insulating layers 133, 162 include epoxy or silicone. The patterned conductive layers 134, 163 include copper, nickel, gold, tin or alloy thereof. The reflective insulating layers 135, 164 include white paint or ceramic ink. When the supporting board 132 of the board 13 is a metal material, the electrical connector 12 is separated from the board 13 by the connecting board 16 with a distance (D1) of not less than 1 mm to prevent flashover. Moreover, because of the length limitation of the lighting apparatus 100, the distance (D1) is not more than 30 mm.

Figure 2D:
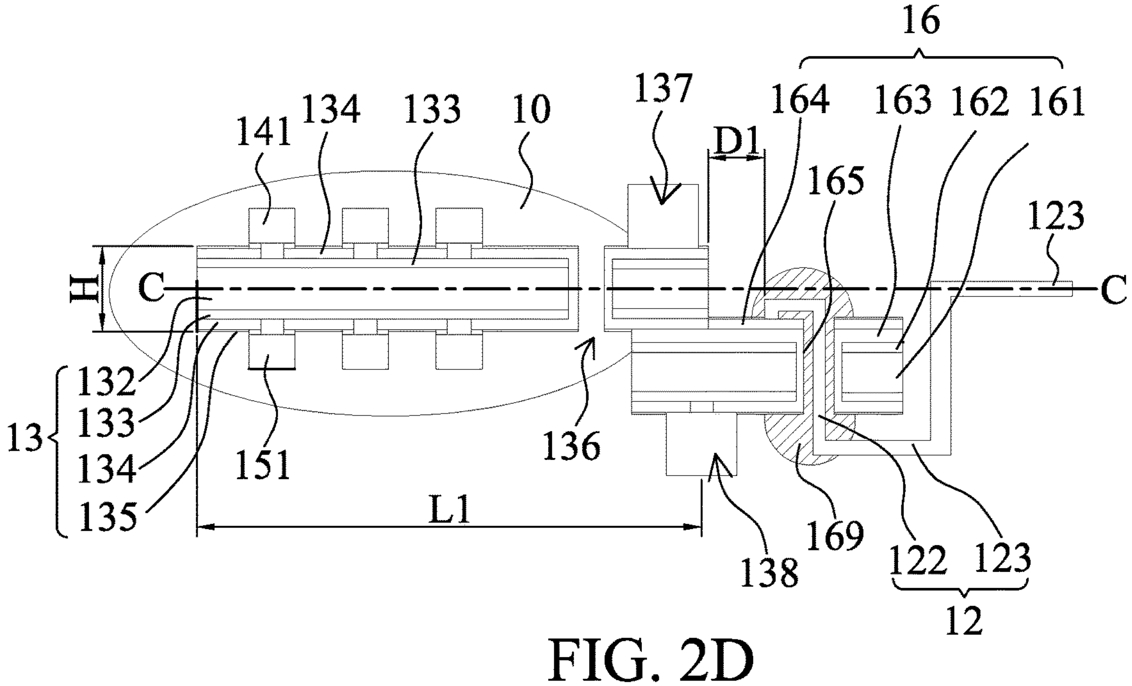
FIG. 2D show a cross-sectional view of the lighting apparatus in accordance with another embodiment of the present disclosure.
Figure 2E:
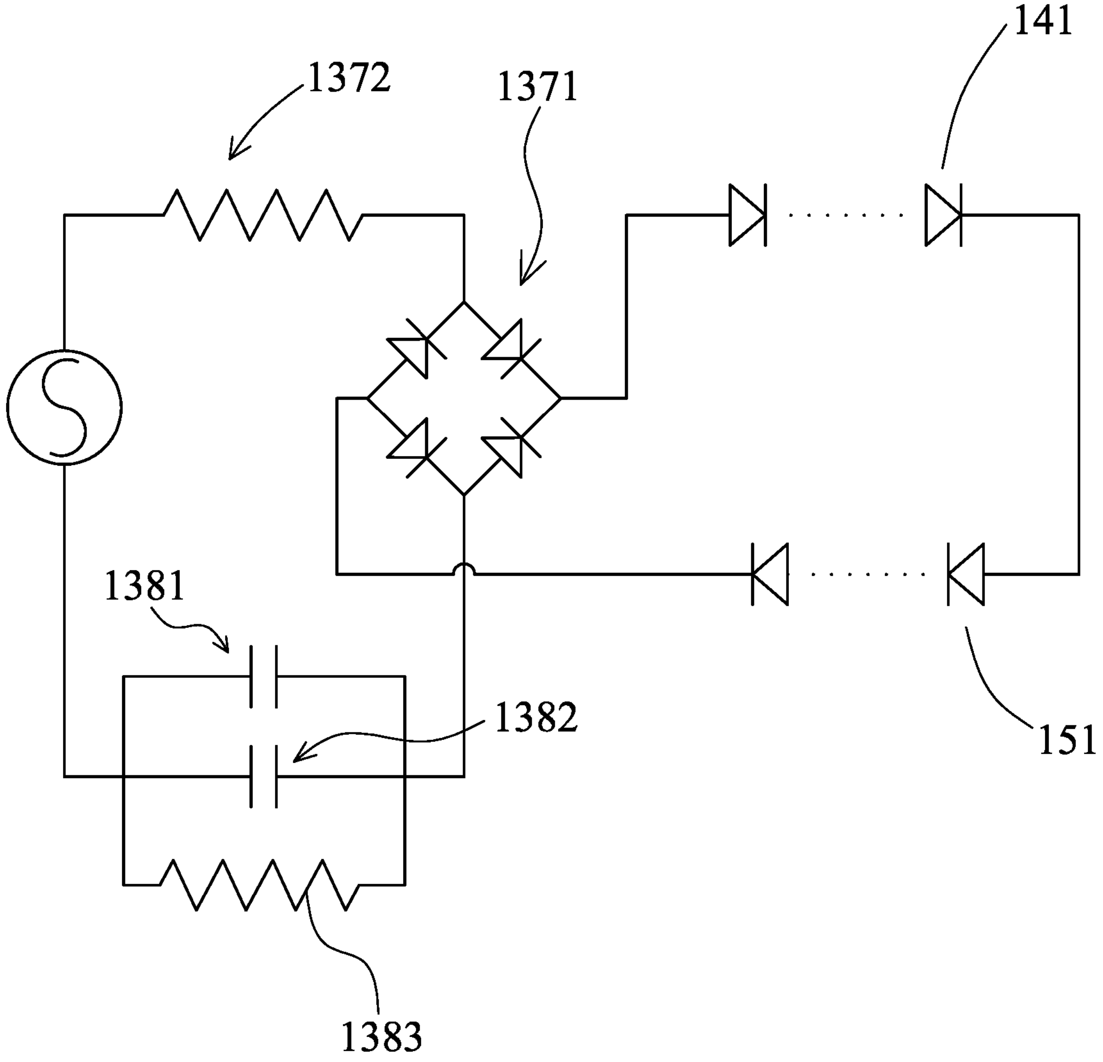
FIG. 2E shows an equivalent circuit diagram of the embodiment of FIG. 1A.

FIG. 2D shows a cross-sectional view of the lighting apparatus 100 in accordance with another embodiment of the present disclosure. The structure of FIG. 2D is similar to that of FIG. 2C wherein devices or elements with similar or the same symbols represent those with the same or similar functions. As shown in FIG. 2C, the second terminal 123 of the electrical connector 12 is located on a side of the board 13 without being in the same horizontal plane with the central axis (C). As shown in FIG. 2D, the second terminal 123 of the electrical connector 12 is located in the same horizontal plane with the central axis (C) for facilitating the subsequent manufacturing process of alignment. FIG. 2E shows an equivalent circuit diagram of the lighting apparatus shown in FIG. 1A and FIG. 1B. The resistor 1372 has a resistance of 20~50Ω. The resistor 1383 has a resistance of 1~10 MΩ. The capacitors 1381, 1382 have a capacitance of 0.1~1 μF, respectively. The bridge rectifier 1371 includes four emitting or non-emitting diodes.

In one embodiment, the volume of the package structure 10 is less than 5000 mm3 and greater than 1500 mm3. The described volume is a spatial volume occupied by the package structure 10 (including the volume of the inner chamber 101). The lighting apparatus 100 operated under an operating current 5~20 mA and an operating voltage with a root-mean-square voltage of 100~130V or 200~260V has a light intensity of more than 150 lumens while it is in the thermal steady state. In other words, the lighting apparatus 100 has a light intensity of 0.03~0.1 lumen per 1 mm3 of the package structure 10 (1 m/mm3). While the lighting apparatus 100 is electrically connected to the external power supply, the lighting apparatus 100 in an initial state (cold-state), and a cold-state lighting efficiency (light output (lumen)/watt) is measured; hereinafter, in every period of time (ex. 30 ms, 40 ms, 50 ms, 80 ms, or 100 ms), the lighting efficiency is measured. When a difference between the adjacent measured light emitting efficiencies is smaller than 3%, the lighting apparatus is in the thermal steady state.

Depending on the quantity of light-emitting units on the board 13, the lighting apparatus 100 operated under the operating current and operating voltage as mentioned above has a light intensity of more than 200 lumens in the thermal steady state. Furthermore, in the aforesaid operating condition, the power consumption of the lighting apparatus 100 is of between 0.5~5.5 Watt; or between 1~5 Watt; or between 2~4 Watt. When the light generated from the light-emitting units passes through the package structure 10 and is observed by external object (for example: human eyes, integration sphere, or other optical sensors), since a portion of the light is absorbed or reflected by the package structure 10, not one hundred percent of the light can be observed and about 5~20 percent of the light cannot be observed by the external object (hereby called light dissipation). Hence, the light intensity of the plurality of light-emitting units is larger than that of the lighting apparatus 100. The light-emitting units can disposed merely on one side of the board or on two opposite sides of the board.

In an embodiment, a plurality of light-emitting units on the board 13 operated under an operating current of between 5~20 mA and an operating voltage (forward voltage) of 100~130V or 240~320V, the light-emitting units have a light intensity of more than 180 lumens in the thermal steady state and the lighting apparatus 100 has a light intensity of more than 150 lumens. Alternatively, a plurality of light-emitting units on the board 13 operated under the operating current of between 5~20 mA and the operating voltage (forward voltage) between 100~140V or between 240~320V has a light intensity of more than 250 lumens in the thermal steady state and the lighting apparatus 100 has a light intensity of more than 200 lumens. In other words, the lighting apparatus 100 has a light intensity of 0.04~0.13 lumen per 1 mm3 of the package structure 10. The light-emitting units can disposed merely on one side of the board or on two opposite sides of the board.

Figure 4:
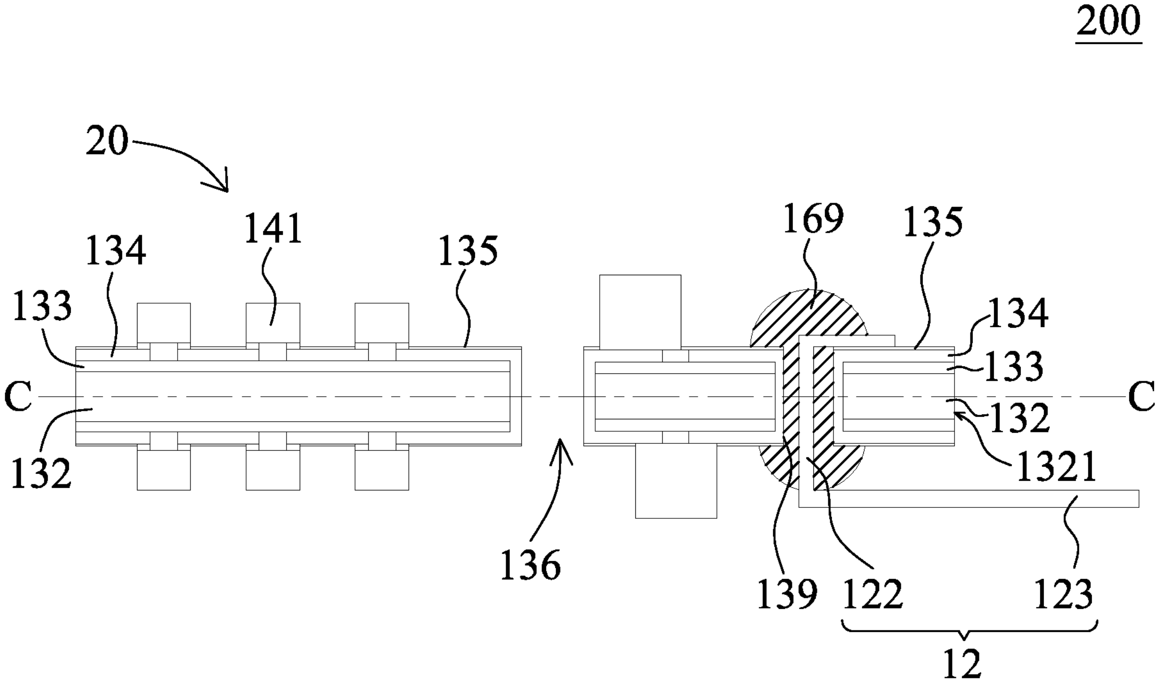
FIG. 4 shows a cross-sectional view of a lighting apparatus in accordance with another embodiment of the present disclosure.

FIG. 4 shows a cross-sectional view of the light-emitting device 20 and the electric connector 12 of a lighting apparatus 200 in accordance with another embodiment of the present disclosure. The lighting apparatus 200 has a structure similar to the lighting apparatus 100 wherein devices or elements with similar or the same symbols represent those with the same or similar functions. The package structure 10 and the base 11 of the lighting apparatus 200 can be referred to those shown in FIG. 2B, and are omitted herein for brevity. The board 13 is a multi-layered structure and includes a supporting board 132, two insulating layers 133 formed on two opposite sides of the supporting board 132, respectively, two patterned conductive layers 134 formed on two insulating layers 133, respectively, and two reflective insulating layers 135 formed on two patterned conductive layers 134, respectively. The light-emitting units 141, 151 are mounted on the patterned conductive layers 134 of two opposite sides of the board 13. The board 13 further includes a through hole 136 penetrating therethrough. In this embodiment, the supporting board 132 is made of an electrically insulating material. The board 13 further includes a through hole 139. The electrical connector 12 has a first terminal 122 penetrating the through hole 139 and the electrical connector 12 is mounted on the connecting board 16 by a conductive material 169 (such as solder or silver paste) to electrically connect the electrical connector 12, the first circuit structure 137, the second circuit structure 138 with the light-emitting units 141, 151. The second terminal of the electrical connector 12 is electrically connected to the external circuit (for example: power supply). The patterned conductive layer 134 is also formed in the through holes 136, therefore, the patterned conductive layers 134 disposed on two opposite sides of supporting layer 132 are electrically connected with each other by the patterned conductive layer 134 formed in the through hole 136, and the light-emitting unit 141 can be electrically connected to the light-emitting unit 151. In another embodiment, as shown in FIG. 4, when the supporting board 132 is a made of a metal material, an electrically insulating material (not shown) can be formed on the sidewall 1321 of the supporting board 132 or cover the electrical connector 12 to prevent flashover between the board 13 and the electrical connector 12.

Figure 5A:
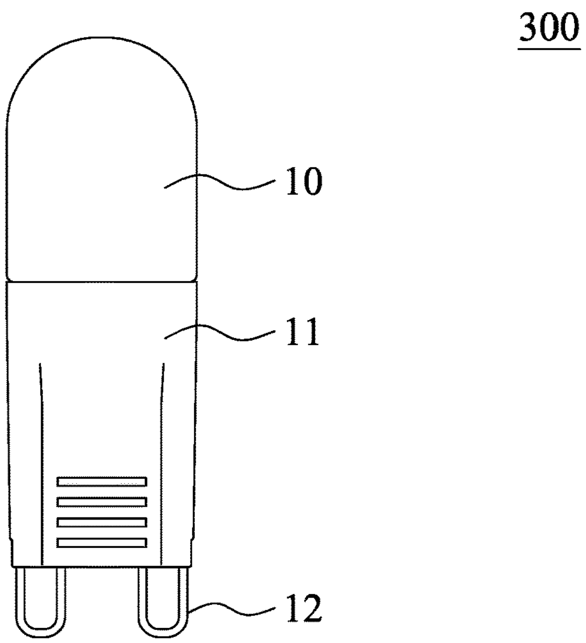
FIG. 5A shows a perspective view of a lighting apparatus in accordance with another embodiment of the present disclosure.
Figure 5B:
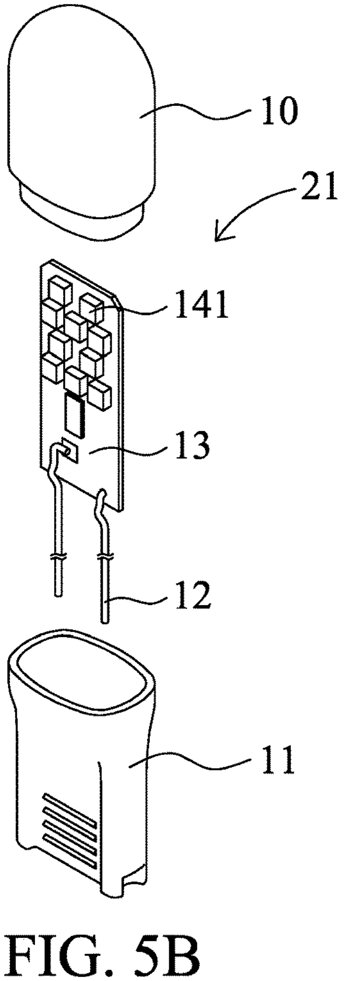
FIG. 5B shows an exploded view of the lighting apparatus of FIG. 5A.
Figure 5C:
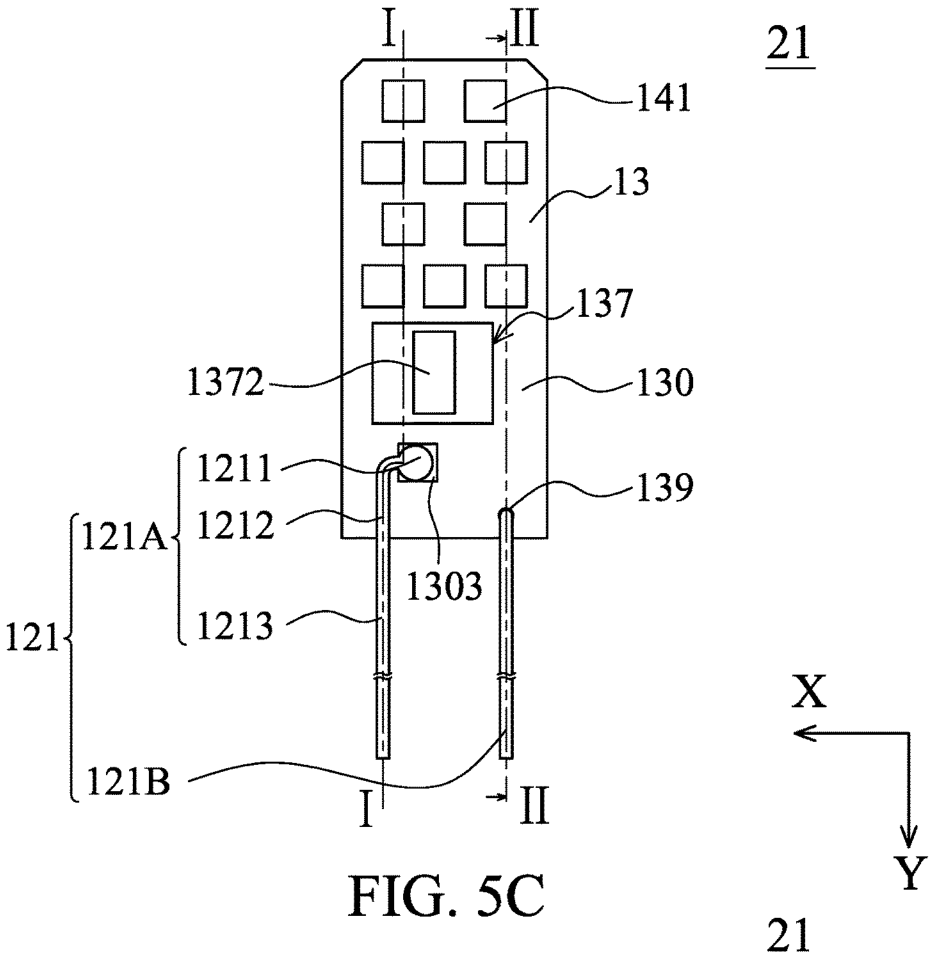
FIGS. 5C~5D show views of two opposite sides of a board and an electrical connector of the lighting apparatus of FIG. 5B.
Figure 5D:
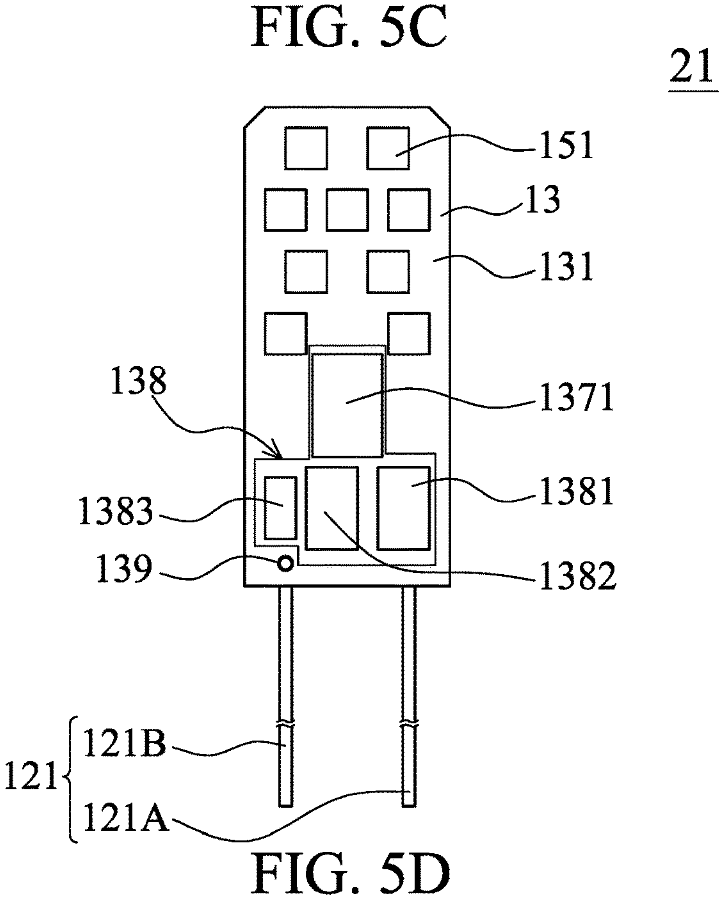

FIG. 5A shows a perspective view of a lighting apparatus 300 in accordance with another embodiment of the present disclosure. The lighting apparatus 300 has a structure similar to the lighting apparatus 100, wherein devices or elements with similar or the same symbols represent those with the same or similar functions. FIG. 5B shows an exploded view of the lighting apparatus 300. FIG. 5C shows a view of one side of the light-emitting device 21. FIG. 5D shows a view of another side of the light-emitting device 21. Briefly, the electric connector 121 shown in FIGS. 5B~5D is not bent. As shown is FIGS. 5A~5D, the lighting apparatus 300 includes a package structure 10, a light-emitting device 21, a base 11, and an electrical connector 12. The light-emitting device 12 includes a board 13, a plurality of light-emitting units 141, 151 disposed on the two opposite sides of the board 13. As shown in FIG. 5C, ten light-emitting units 141 are disposed on the first surface 130 of the board 13 in a staggered arrangement. An electrically connecting region 1303 and a first circuit structure 137 (in this embodiment, the first circuit structure 137 includes a resistor 1372 with a resistance of 20~50Ω) formed on the first surface 130, and the resistor 1372 is placed between the electrically connecting region 1303 and the light-emitting unit 141. A through hole 139 is formed and penetrates through the board 13.

As shown in FIG. 5D, nine light-emitting units 151 are disposed on the second surface 131 of the board 13 in a staggered arrangement. In one embodiment, the amounts of the light-emitting units 141, 151 disposed on two opposite sides of the board 13 are not equal. However, depending on actual requirements (e.g. voltage, brightness etc.), the amounts of the light-emitting unit 141, 151 disposed on two opposite sides of the board 13 can be equal. Additionally, a through hole (not shown) is formed within the board 13 and a conductive material is filled in the through hole for electrically connecting the light-emitting units 141, 151 with each other in series. A second circuit structure 138 is formed on the second surface 131 of the board 13. The second circuit structure 138 includes a bridge rectifier 1371, a resistor 1383, and two capacitors 1381, 1382. The electrical connector 12 includes two pins 121A, 121B. The pin 121A is connected to the electrically connecting region 1303 of the first surface 131 without penetrating through the board 13 and the pin 121B penetrates through the through hole 139. The pins 121A, 121B are electrically connected to the light-emitting units 141, 151, the first circuit structure 137 and the second circuit structure 138, wherein the equivalent circuit diagram is shown as FIG. 2E.

Figure 5E:
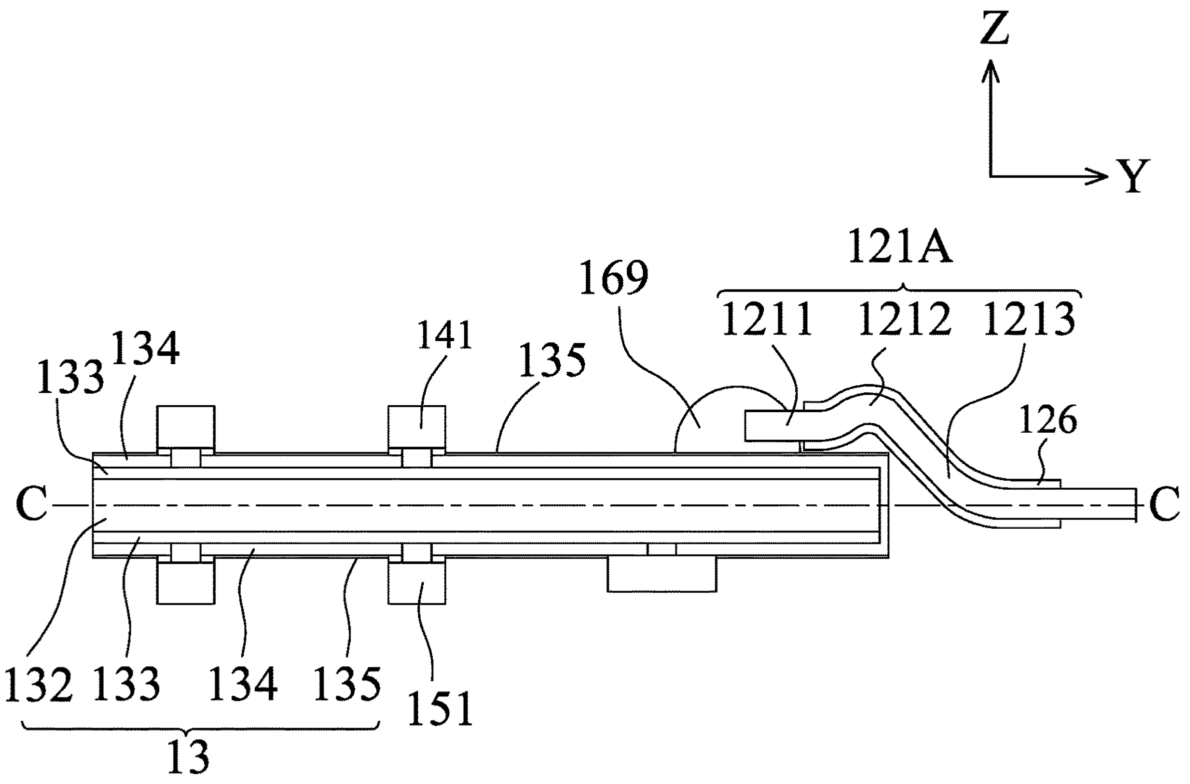
FIG. 5E shows a cross-sectional view taken along line I-I of FIG. 5C.
Figure 5F:
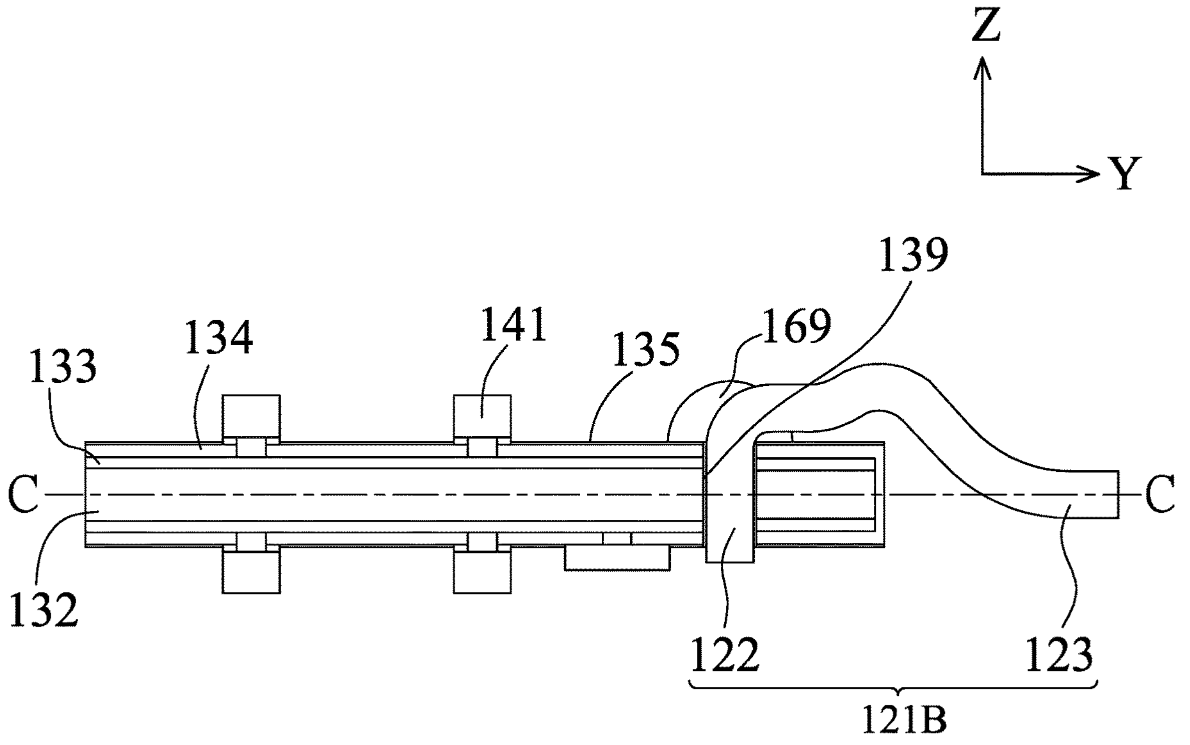
FIG. 5F shows a cross-sectional view taken along line II-II of FIG. 5C.

FIG. 5E is the cross sectional view taken along line I-I of FIG. 5C. FIG. 5F is the cross sectional view taken along line II-II of FIG. 5C. Referring to FIG. 5C and FIG. 5E, the board 13 is a multi-layered structure and includes a supporting board 132, two insulating layers 133 formed on two opposite sides of the supporting board 132, respectively, two patterned conductive layers 134 formed on two insulating layers 133, respectively, and two reflective insulating layers 135 formed on two patterned conductive layers 134, respectively. The light-emitting units 141,151 are mounted on the patterned conductive layers 134 of two opposite sides of the board 13, respectively. The pin 121A has a first portion 1211 extending along the X direction, a second portion 1212 extending from the first portion 1211 along the Y direction, and a third portion 1213 extending from the second portion 1212 along the Y direction. The second portion 1212 has an arc shape and is spaced apart from the board 13 in the Z direction and the Y direction, that is, the second portion 1212 does not contact the board 13. In addition, an insulating sleeve 126 is provided to cover the second portion 1212 for preventing the undesired short-circuit path between the pin 121A and the board 13. The insulating sleeve 126 can contact or not contact the board 13. The third portion 1213 has a central axis in the same horizontal plane with the central axis (C) of the board 13 for facilitating alignment in manufacturing processes. Referring to FIG. 5C and FIG. 5F, the pin 121B has a first portion 122 with an arc shape and penetrating through the through hole 139 and a second portion 123 extending from the first portion 122 along the Y direction and having a central axis in the same horizontal plane with the central axis (C) of the board 13 for facilitating alignment in manufacturing process. In this embodiment, the pin 121A and the pin 121B have different shapes. In another embodiment, the pin 121A and the pin 121B can be designed to have the same shape.

Figure 6A:
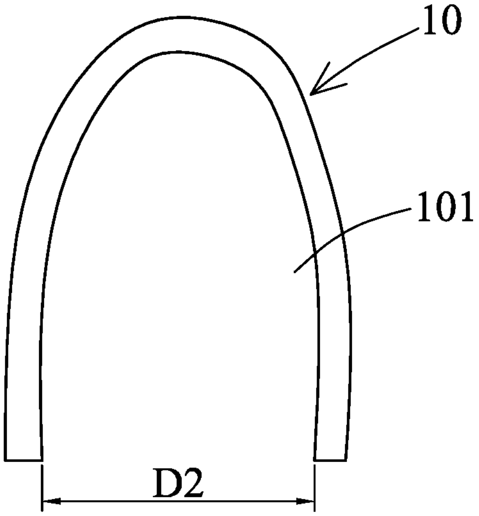
FIGS. 6A~6F show views of making a lighting apparatus in accordance with an embodiment of the present disclosure.

FIGS. 6A~6E show views of making a lighting apparatus 100 of FIG. 1A in accordance with an embodiment of the present disclosure. As shown in FIG. 6A, a package structure 10 (in this embodiment, the package structure is a hollow housing) with an inner chamber 101 is provided, and a first filler (not shown) is filled within the inner chamber 101. The first filler is a transparent material which is transparent to light, such as sunlight or the light emitted from the light-emitting unit. The first filler can be gel, liquid, or gas. The gel includes epoxy, silicone, polyimide (PI), benzocyclobutene (BCB), perfluorocyclobutane (PFCB), Su8, acrylic resin, polymethyl methacrylate (PMMA), polyethylene terephthalate (PET), polycarbonates (PC), or polyetherimide. The liquid includes silicone oil, pure water, or inert liquid. The gas includes hydrogen, helium, nitrogen or combinations thereof. The pressure of the filling gas is at least of more than 0.5 atm (atmosphere) or of between 0.8~1.2 atm. The material of the package structure 10 includes a glass with the refraction index of 1.3~1.8; and the first filler has a refraction index of 1.3~1.6. In one embodiment, the refraction index of the package structure is larger than that of the first filler. When the first filler is gel, it has a hardness of 5~50 or 10~30 (Shore A) and a coefficient of thermal expansion of 200~300 ppm/oC or 30~50 ppm/oC. The gel can be obtained from the commercial product, for example: Tempo 1430, Sanyo EL1235, or Dow Corning 7091. In one embodiment, the housing can be made of a transparent material such as diamond, quartz, amorphous alumina, polycrystalline alumina, polycarbonates (PC), epoxy, silicone, polyimide (PI), benzocyclobutene (BCB), acrylic resin, polymethyl methacrylate (PMMA), polyethylene terephthalate (PET), polycarbonates (PC), polyetherimide, or polybutylene terephthalate (PBT), wherein the plastic material is beneficial in mass production and cost. In one embodiment, the inner chamber 101 does not include the first filler filled therein.

Figure 6B:
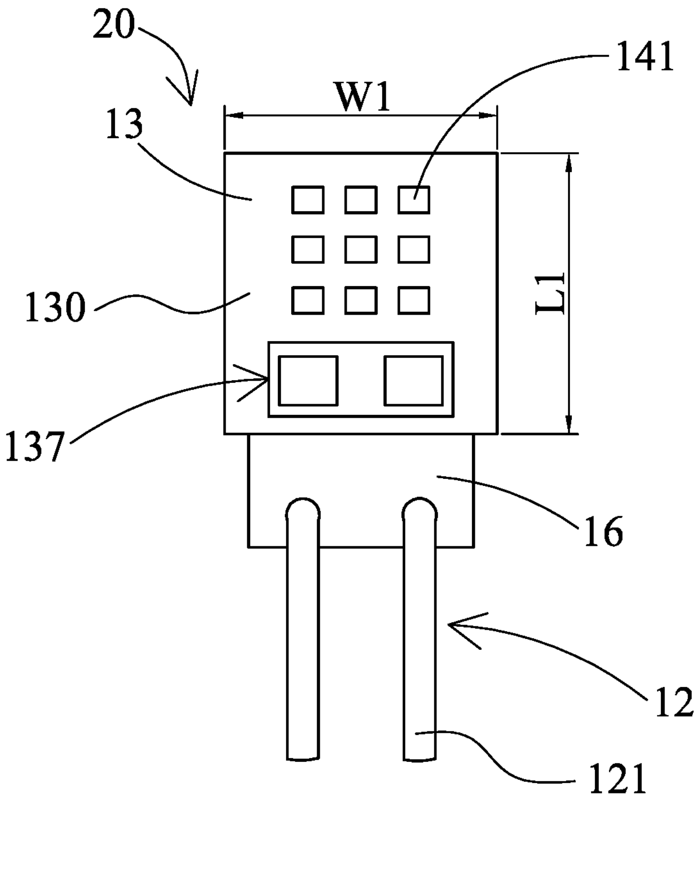

A plurality of diffusing particles (for example: titanium dioxide, zirconium oxide, zinc oxide or alumina) can be optionally filled within the first filler for enhancing the diffusion or scattering of the light emitted from the light-emitting units 141. The diffusing particles can be chosen from dehydrated titanium dioxide such as the commercial product from Echo Chemical, CR-EL-0000000-23NI. The first filler has a weight concentration of 0.005%~0.1% (w/w) or 1%~3% (w/w) and a particle size of 10 nm~100 nm or 10~50 um. As shown in FIG. 6B, a light-emitting device 20 and an electrical connector 12 are provided. The light-emitting device 20 includes a board 13, a plurality of light-emitting units 141 and a connecting board 16. The electrical connector 12 includes two pins 121. FIG. 6B shows merely the first surface 130 of the board 13, but the plurality of the light-emitting units 151 can be disposed on the second surface 131 of the board 13.

Figure 6C:
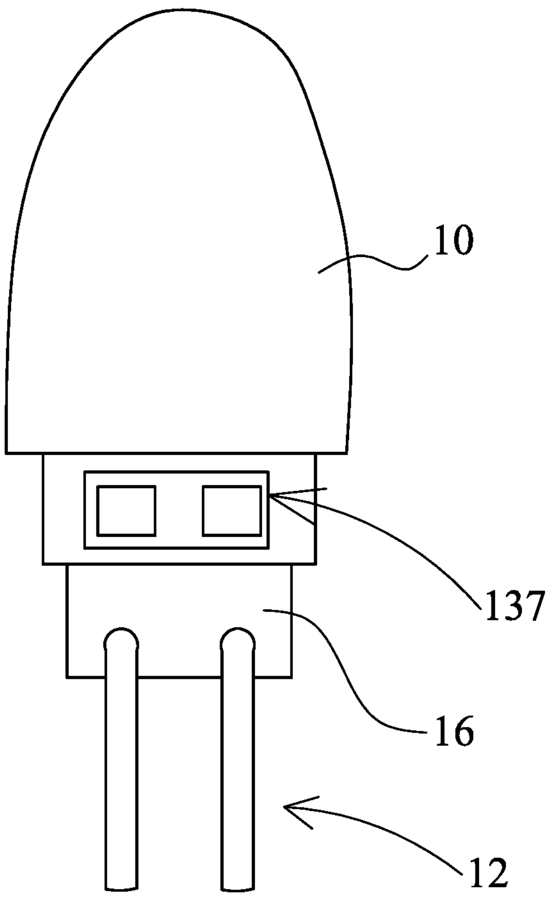

As shown in FIG. 6C, the board 13 is embedded into the first filler so the first filler covers the light-emitting unit 141 to expose the first circuit structure 137. The heat generated by the light-emitting unit 141 can be dissipated to the package structure 10 by the first filler, then to the ambient environment. The thickness of the package structure 10 is of between 0.3~0.8 mm and the heat of the package structure 10 is mainly dissipated to ambient environment by radiation. FIG. 6B is viewed in a vertical direction, wherein the length of the board 13 is L1 and the width of the board 13 is W1. The width (W1) of the board 13 is substantially equal to or less than the inner width (D2) of the package structure 10.

Figure 6D:
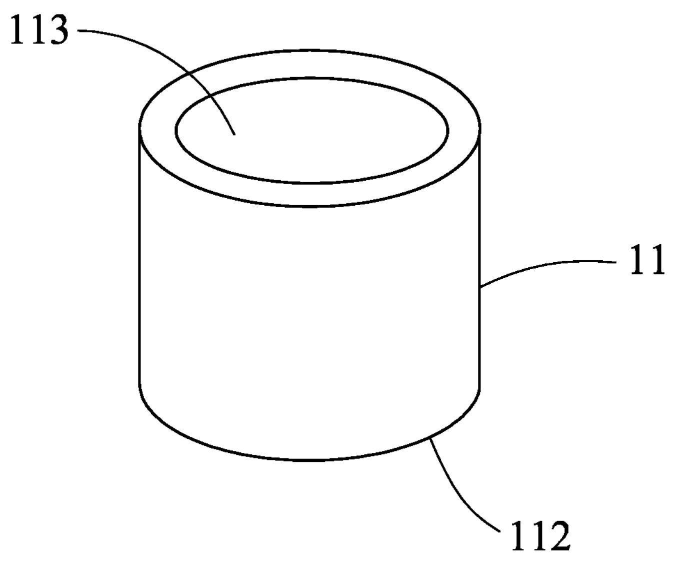

As shown in FIG. 6D, a base 11 is provided. The base 11 can include a thermal conductive plastic material or a ceramic material. The thermal conductive plastic material is a mixture of a plastic substance (PP, ABS, PC, PA, LCP, PPS or PEEK) and the thermal conductive powder (ceramic powder such as BN, SiC, AlN; metal oxide such as magnesium oxide, zinc oxide or silicon dioxide; or conductive powder such as carbon fiber, carbon nanotube). The ceramic material includes aluminum oxide or aluminum nitride. The base 11 defines a chamber 113 with a second filler (not shown) filled therein. The first circuit structure 137 is covered by the second filler, and heat generated by the first circuit structure 137 can be transferred to the base 11 by the second filler and then to the ambient environment. In one embodiment, the second filler has a hardness of 30~50 (Shore A) and can be obtained from the commercial product, for example: Tempo 1430, Sanyo EL1235, or Dow Corning 7091. The material of the second filler can be same as or different from that of the first filler. Alternatively, the material of the second filler is same as that of the first filler but the harnesses of the second filler is different from that of the first filler. For example, the first filler is made of silicone with a hardness of 5~30 (Shore A); and the second filler is made of silicone with a hardness of 30~50 (Shore A). The bottom portion 112 of the base 11 has two through holes (not shown).

Figure 6E:
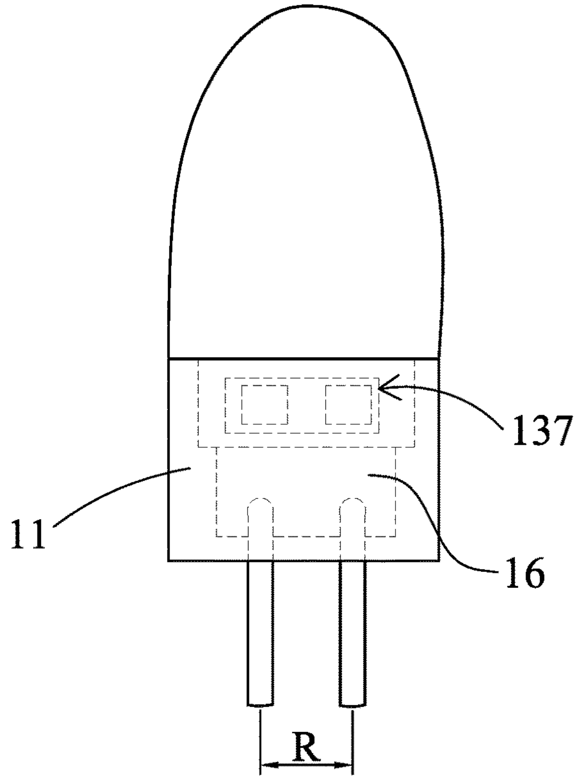

Next, as shown in FIG. 6E, the structure of FIG. 6C is embedded into the base 11, therefore, the first circuit structure 137, the connecting board 16 and a portion of the two pins 121 are located within the chamber 113 of the base 11 and another portions of the two pins 121 penetrate through two through holes in the bottom portion 112 of the base 11, respectively, to protrude outside of the base 11.

Figure 6F:
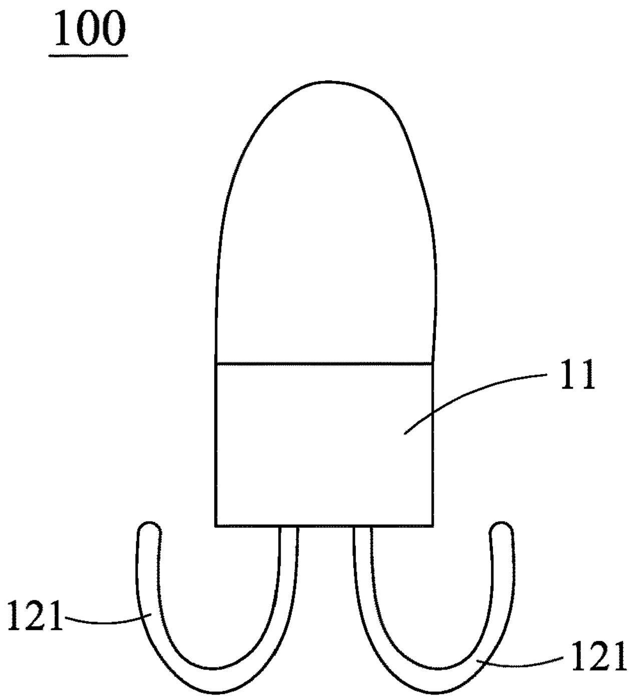

As shown in FIG. 6F, the two pins 121 are bent to extend toward the base 11 for finishing the lighting apparatus 100. After bending, the geometric centers of the two pins 121 are spaced apart from each other with a distance of 7~15 mm to meet the G9 standard requirement (for example: IEC 60061-1). In another embodiment, the two pins 121 are not bent and have axes spaced apart from each other with a distance (R) of 4~12 mm to meet the G4 or GU10 standard. In addition, the package structure 10 and the base 11 can have a through hole (not shown) so when the filler is filled in the housing or the base, due to a volume variation of the filler resulted from the thermal expansion and cold shrinkage occurred by the temperature variation during the subsequent manufacturing process, the through hole can provide a buffer space to prevent the package structure or the base from crack and damage caused by the volume variation of the filler so the production yield is enhanced. The making process shown in FIGS. 6A-6F can also be implemented in making the lighting apparatus in other embodiments. In addition, the sequence of the making process can be optionally changed according to actual requirements. For example, the electrical connector 12 can be mount on the board 13 and then assembled with the base 11, wherein the light-emitting units 141, 151 are exposed outside of the base 11; next, the second filler is filled within the chamber 113 of the base 11; finally, a package structure 10 with the first filler is provided to cover the light-emitting units 141, 151. Certainly, the package structure 10 without the first filler can be provided to cover the light-emitting units 141, 151.

Figure 7A:
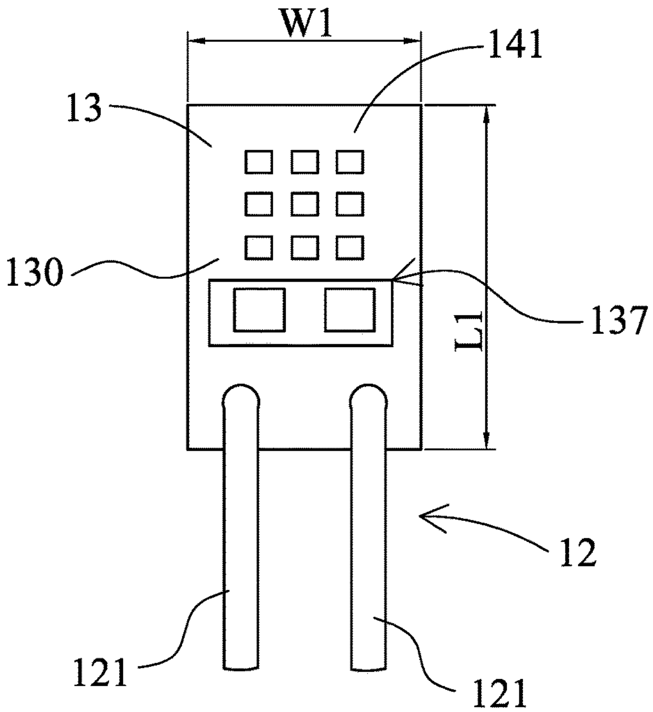
FIGS. 7A~7E show views of making a lighting apparatus in accordance with another embodiment of the present disclosure.
Figure 7B:
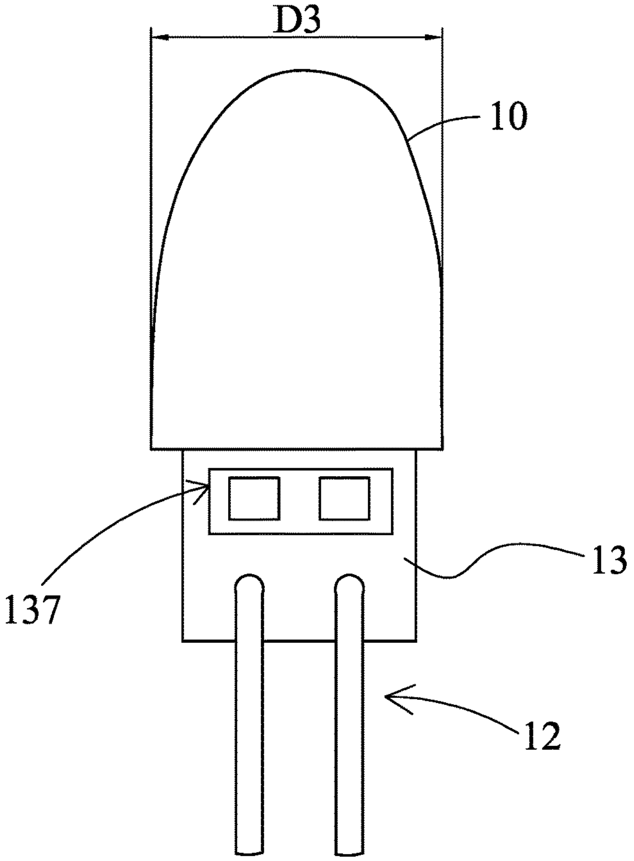

FIGS. 7A~7E show views of making a lighting apparatus in accordance with an embodiment of the present disclosure. As shown in FIG. 7A, a board 13, a plurality of the light-emitting units 141 and an electrical connector 12 are provided. FIG. 7A shows only the first surface 130 of the board 13, but the plurality of the light-emitting units 151 can be disposed on the second surface 131 of the board 13. The electrical connector 12 includes two pins 121. A mold (not shown) is provided, and a package structure 10 is formed by molding such as injection molding or compression molding to cover the light-emitting units 141 and expose the first electrode structure 137, as shown in FIG. 7B. In another embodiment, the package structure 10 can cover the entire board 13 and a part of the electrical connector 12, but exposes merely another part of the electrical connector 12 for electrically connecting to the external power supply. Optionally, a diffusing particles (for example: titanium dioxide, zirconium oxide, zinc oxide or alumina) can be included in the package structure 10 for enhancing the diffusion or scattering of the light emitted from the light-emitting units 141. The diffusing particles (for example: dehydrated titanium dioxide such as the commercial product from Chemical, CR-EL-0000000-23NI) in the package structure 10 has a weight concentration (w/w) of 0.005%~0.1% or 1%~3% and has a particle size of 10 nm~100 nm or 10~50 um. In this embodiment, the package structure 10 is a solid body. The material of the solid body includes epoxy, silicone, polyimide (PI), benzocyclobutene (BCB), perfluorocyclobutane (PFCB), Su8, acrylic resin, polymethyl methacrylate (PMMA), polyethylene terephthalate (PET), polycarbonates (PC) or polyetherimide. FIG. 7A and FIG. 7B are views in a direction vertical to the board 13, wherein the board 13 has a length (L1) and a width (W1). The width of the board 13 is substantially equal to or less than the diameter (D3) of the solid body.

Figure 7C:
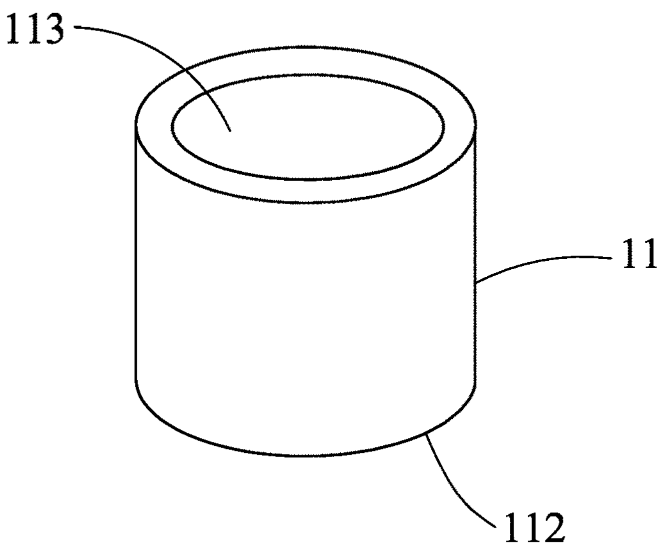
Figure 7D:
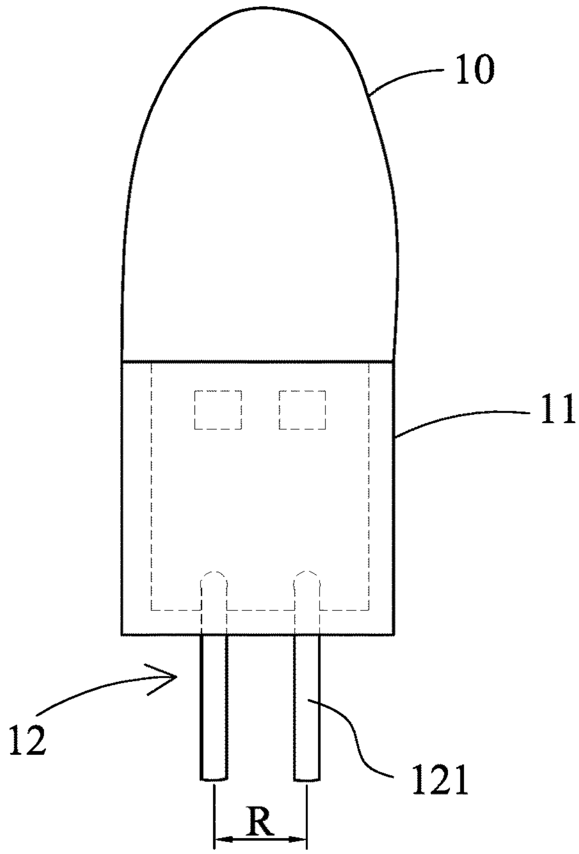
Figure 7E:
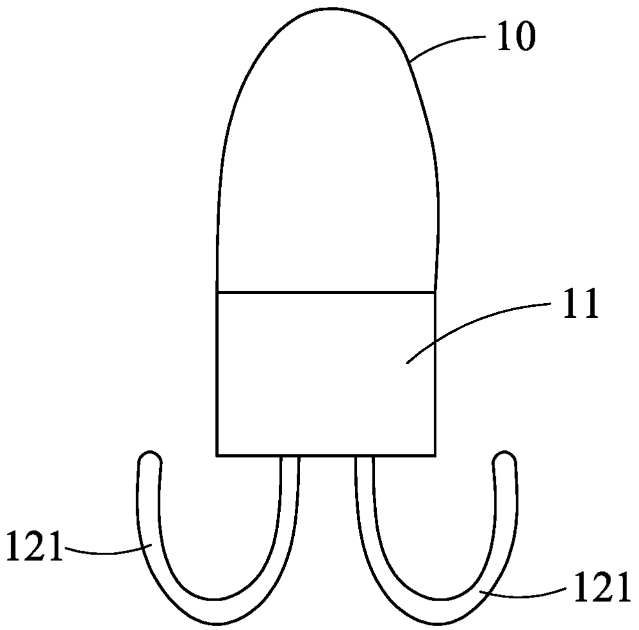

As shown in FIG. 7C, a base 11 is provided. The base 11 defines a chamber 113 therein and a filler is filled within the chamber 113. The filler can be gel, liquid or gas (the material is as mentioned above). The base 11 has a bottom portion 112 with two through holes (not shown). Next, as shown in FIG. 7D, the structure shown in FIG. 7B is embedded within the base 11, so the first circuit structure 137 and electric connector 12 are placed within the chamber 113 of the base 11, and two pins 121 penetrate through two through holes in the bottom portion 112 of the base 11, respectively, to protrude outside of the base 11. As shown in FIG. 7E, the two pins 121 are bent to extend toward the base 11. After bending, the geometric centers of the two pins 121 are spaced apart from each other with a distance of 7~15 mm to meet the G9 standard. In another embodiment, the two pins 121 are not bent, and have axes spaced apart from each other with a distance (R) of 4~12 mm to meet the G4 or GU10 standard. The making process shown in FIGS. 7A~7F can also be implemented in making the lighting apparatus of other embodiments.

Figure 8A:
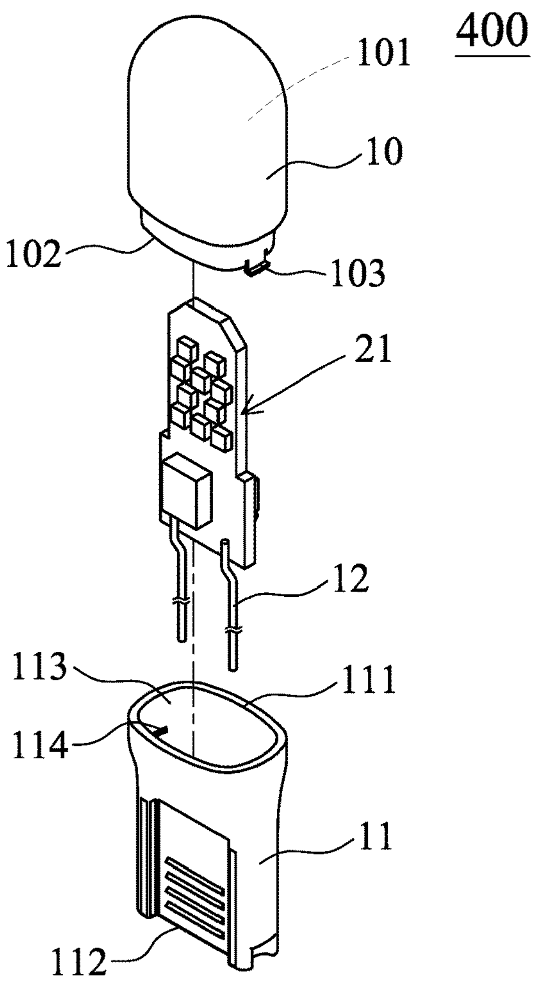
FIG. 8A shows an exploded view of a lighting apparatus in accordance with an embodiment of the present disclosure.
Figure 8B:
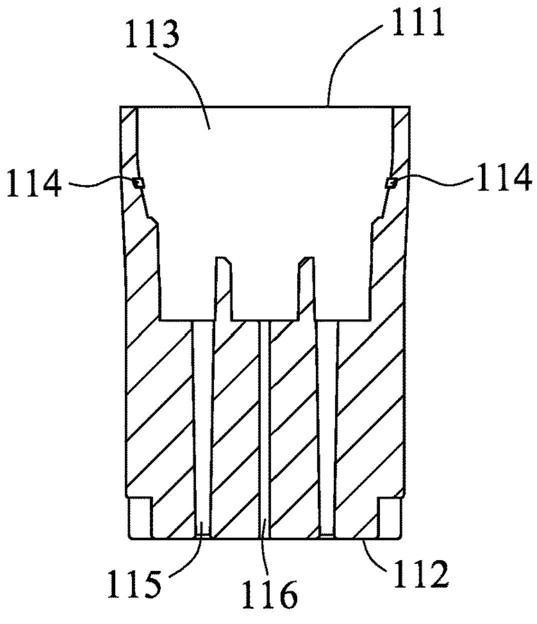
FIG. 8B shows a cross-sectional view of a base of the lighting apparatus of FIG. 8A.

FIG. 8A shows an exploded view of a lighting apparatus 400 in accordance with another embodiment of the present disclosure. The lighting apparatus 400 includes a package structure 10, a light-emitting device 21, a base 11, and an electrical connector 12. FIG. 8B shows a cross-sectional view of the base 11. In this embodiment, the package structure 10 is a hollow plastic housing and defines an inner chamber 101 therein and an opening end 102. Two fasteners 103 are connected to the opening end 102, extend from the opening end 102 toward the base 11, and have an L-shaped cross section. The base 11 has an upper portion 111 and a bottom portion 112. A chamber is defined by the base 11 and is open at the upper portion 111 and the bottom portion 112. Two grooves 114 are formed in the upper portion 111 and are combined to the two fasteners 103. The bottom portion 112 defines two through holes 115 extending in a direction from the upper portion 111 to the bottom portion 112. The through holes 115 are elongated and pass through the bottom portion 112 of the base 11 and are in communication with the chamber 113. The base 11 also defines a through hole 116 formed between the two through holes 115. The through hole 116 is elongated and extends in a direction from the upper portion 111 to the bottom portion 112, passes through the bottom portion 112 of the base 11 and is in communication with the chamber 113. The light-emitting device 21 is placed in the inner chamber 101. The detailed structure of the light-emitting device 21 can be referred to FIG. 5C and FIG. 5D, and related paragraphs. The electric connector 12 penetrates through the holes 115 and is electrically connected to the external circuit (not shown). A filler (not shown) is filled within the inner chamber 101 and the chamber 113 by the through hole 116 to cover the entire light-emitting device 21 for facilitating heat from the light-emitting device 20 to dissipate to the package structure 10 and then to ambient environment. The filler can also include the diffusing particles dispersed therein. The material of the filler and the diffusing particles is as mentioned above. When air is formed between the light-emitting device 21 and the filler, the heat dissipation would be decreased. Therefore, in order to get the good heat dissipation, air is not existed between the light-emitting device 21 and the filler. In one embodiment, the volume ratio of air in the filler is not more than 10%.

In another embodiment, the filler is not filled in the inner chamber 101 and the chamber 113; therefore, there is only air between the light-emitting device 21 and the package structure 10. When the light-emitting device 21 operates under an operating current, the light-emitting device 21 would illuminate and generate heat, and the volatile organic compounds (VOC) in the light-emitting device 21 would escape due to heat. If the volatile organic compounds (VOC) cannot be eliminated and remain in the light-emitting device 21, the light efficiency of the light-emitting device 21 would be affected. Hence, the volatile organic compounds (VOC) can be exhausted out the lighting apparatus 400 by the through hole 116. Possibly, the volatile organic compounds generated by other devices (not light-emitting device 21) of the lighting apparatus 400 can also escape out the lighting apparatus 400 by the through hole 116. In one condition, the volatile organic compounds are generated by other devices of the lighting apparatus other than the light-emitting device 21, an air-tight protective film (acrylate polymer) is provided to cover the light-emitting device 21 for preventing the volatile organic compounds from leaking into the light-emitting device 21 for adversely affecting the lighting efficiency of the light-emitting device 21. According to the aforesaid embodiments, the through hole 116 can be a glue injecting hole or an exhaust hole. The position of the through hole 116 shown in FIG. 8A is exemplary, and it should not be limited to the scope of the present disclosure. Optionally, the base 11 has the cylindrical through hole 116 or has the through hole 116 formed at other positions.

Figure 8C:
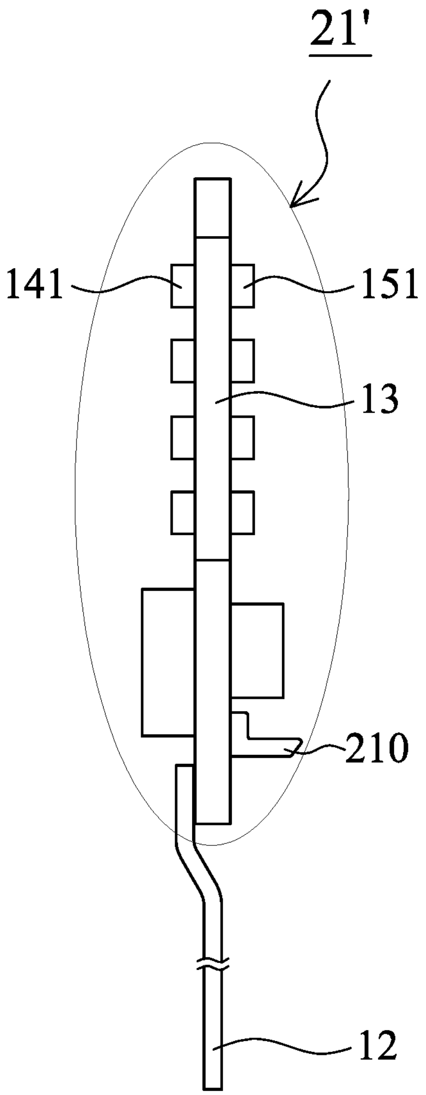
FIG. 8C shows a side view of a light-emitting device and an electric connector in accordance with another embodiment of the present disclosure.

FIG. 8C shows a side view of a light-emitting device 21' and an electric connector 12 in accordance with another embodiment of the present disclosure. In this embodiment, an L-shaped heat-dissipation element 210 is attached to the board 13. When using the light-emitting device 21' instead of the light-emitting device 21 in the lighting apparatus 400, the L-shaped heat-dissipation element 210 can provide additional contacting area with the filler. Accordingly, the heat generated by the light-emitting units 141, 151 can be transferred more effectively to ambient environment by the board 13, the L-shaped heat-dissipation element 210, the filler, the package structure 10 or the base 11 (referring to FIG. 8A). In another embodiment, the L-shaped heat-dissipation element 210 can be designed in directly contact with the package structure 10 or the base 11 so the heat generated by the light-emitting units 141, 151 is transferred to ambient environment by the board 13, the L-shaped heat-dissipation element 210, the package structure 10 or the base 11 (referring to FIG. 8A). The L-shaped heat-dissipation element 210 includes metal material, thermal conductive plastic material, and ceramic material. The detailed structure of the thermal conductive plastic material and ceramic material can be referred to other embodiments.

Figure 8D:
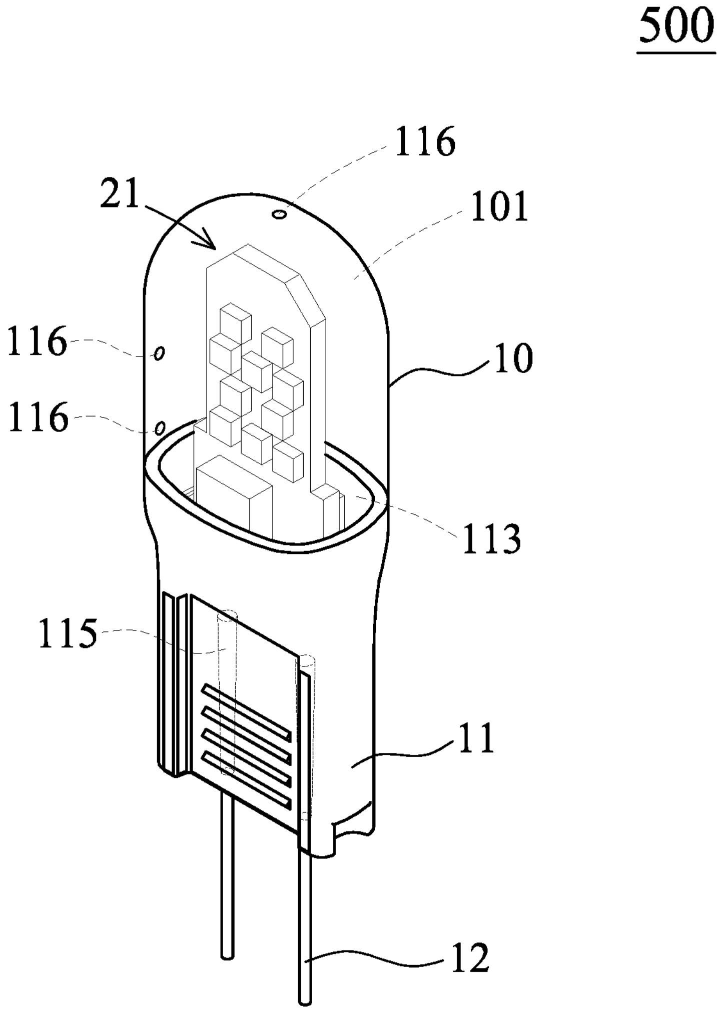
FIG. 8D shows a perspective view of a lighting apparatus in accordance with another embodiment of the present disclosure.

FIG. 8D shows an exploded view of a lighting apparatus 500 in accordance with another embodiment of the present disclosure. The lighting apparatus 500 is similar to the lighting apparatus 400, wherein devices or elements with similar or the same symbols represent those with the same or similar functions. In this embodiment, the through hole 116 is not provided on the base 11 but provided on the package structure 10, for example: on the upper portion, or/and the side, or/and the bottom portion. The position of the through hole 116 shown in FIG. 8D is exemplary, and it should not be limited to the scope of present disclosure.

Figure 9A:
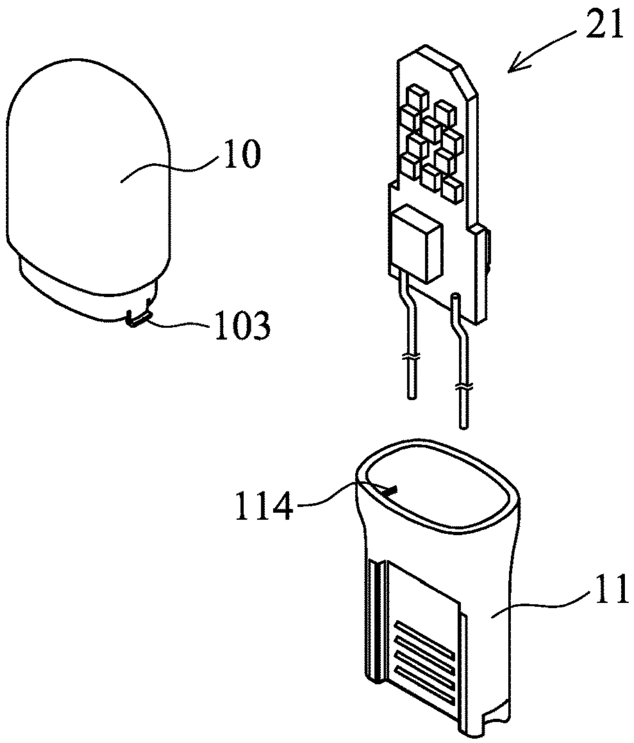
FIGS. 9A~9D show views of making a lighting apparatus in accordance with an embodiment of the present disclosure.
Figure 9B:
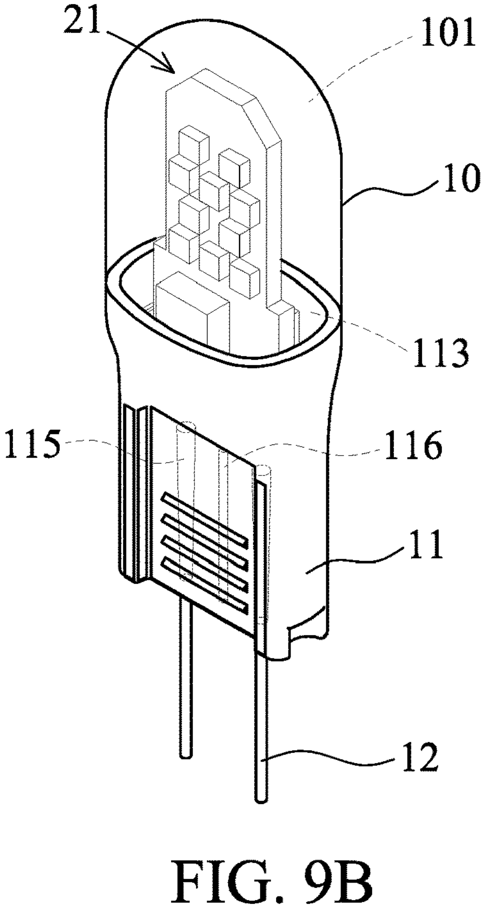
Figure 9C:
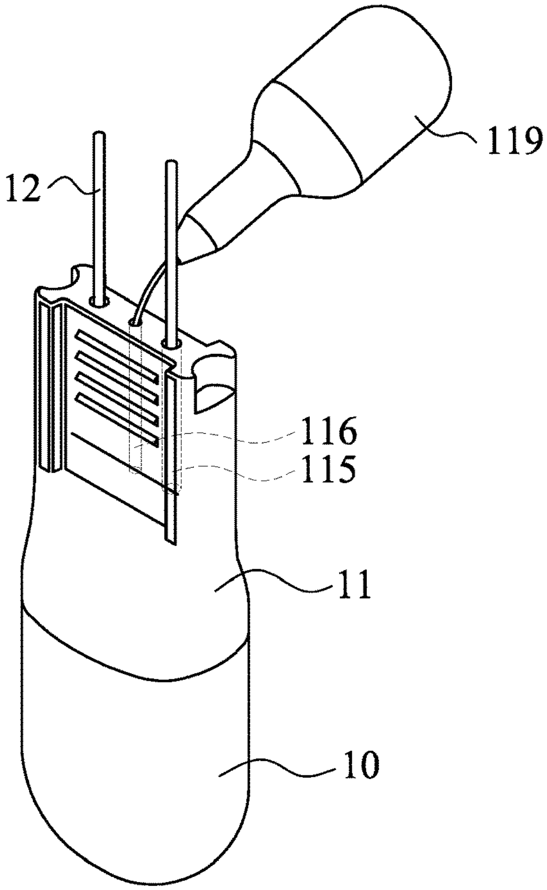
Figure 9D:
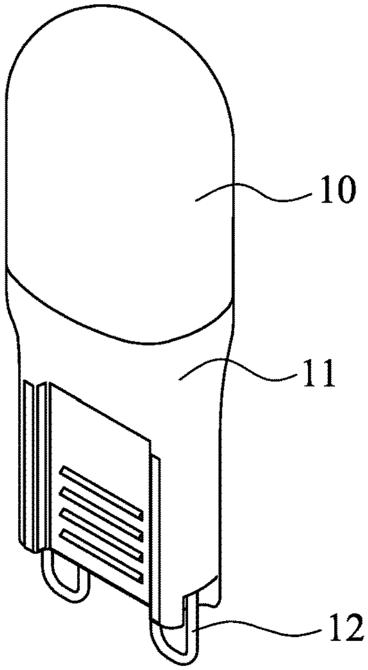

FIGS. 9A~9D views of making a lighting apparatus in accordance with an embodiment of the present disclosure. As shown in FIG. 9A, a package structure 10 with fasteners 103 is provided, and a base 11 with grooves 114, through holes 115, 116, is also provided. An electric connector 12 is mounted on the light-emitting device 20 and passes through the through holes 115 of the base 11 to mount the light-emitting device 21 on the base 11. Subsequently, as shown in FIG. 9B, the fasteners 103 are combined with the grooves 114 to fix the package structure 10 and the base 11 for forming an inner space (an inner chamber 101 and a chamber 113). After combing the package structure 10 with the base 11, the light-emitting device 21 disposed within the inner space can be observed because the package structure 10 is light transmitted. As shown in FIG. 9C, the package structure 10 and the base 11 are reversely disposed to show the through hole 116. A container 119 containing a filler with diffusing particles is provided, and the filler is filled within the inner space by the through hole 116. During the process of filling, due to gravity, the filler would automatically flow downward and squeeze the gas in the inner space, and then the gas escapes to the ambient environment through the through holes 115. When the filler fills up the inner space, a heating process is performed to solidify the filler for combining the package structure 10 and the base 11 more firmly. Because the gas of the inner space escapes through the through holes 115, the through hole 115 can also be an exhaust hole. The through hole 115 has a size designed to be a little larger than diameter of the electric connector 12 for facilitating exhaust. The filler can be gel, liquid or gas (the material is as mentioned above). In the method of this embodiment, only one material is filled within the inner space defined by the package structure 10 and the base 11, therefore, the crack due to different coefficients of thermal expansion among different materials, and the separation due to the poor adhesions among different materials can be reduced. Finally, as shown in FIG. 9D, the electric connector 12 is bent. The making process shown in FIGS. 9A-9D can also be implemented in making the lighting apparatus of other embodiments.

Figure 10A:
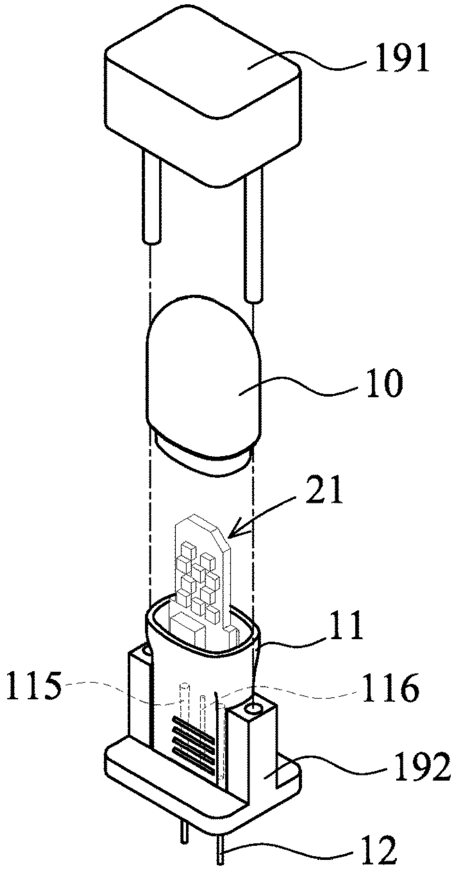
FIGS. 10A-10B show views of a lighting apparatus in accordance with another embodiment of the present disclosure.
Figure 10B:
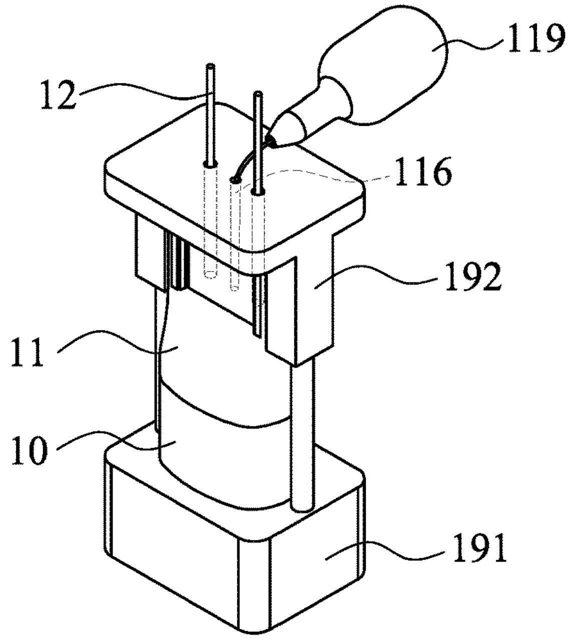

FIGS. 10A~10B show views of making a lighting apparatus in accordance with an embodiment of the present disclosure. At first, the electric connector 12 penetrates through the through hole 115 of the base 11 for mounting the light-emitting device 21 on the base 11. After aligning and fixing the package structure 10 and the base 11 by an upper fixture 191 and a lower fixture 192, an inner space is defined. A filler is filled within the inner space by the through hole 116. Finally, a heating process is performed to solidify the filler for combining the package structure 10 and the base 11 more firmly. Comparing to the embodiment shown in FIGS. 9A-9D, in this embodiment, by virtue of the fixtures 191, 192 for supporting, the package structure 10 optionally do not have the fasteners 103 and the base 11 do not have the groove 114 as well. The making process shown in FIGS. 10A-10B can also be implemented in making the lighting apparatus of other embodiments.

Figure 11A:
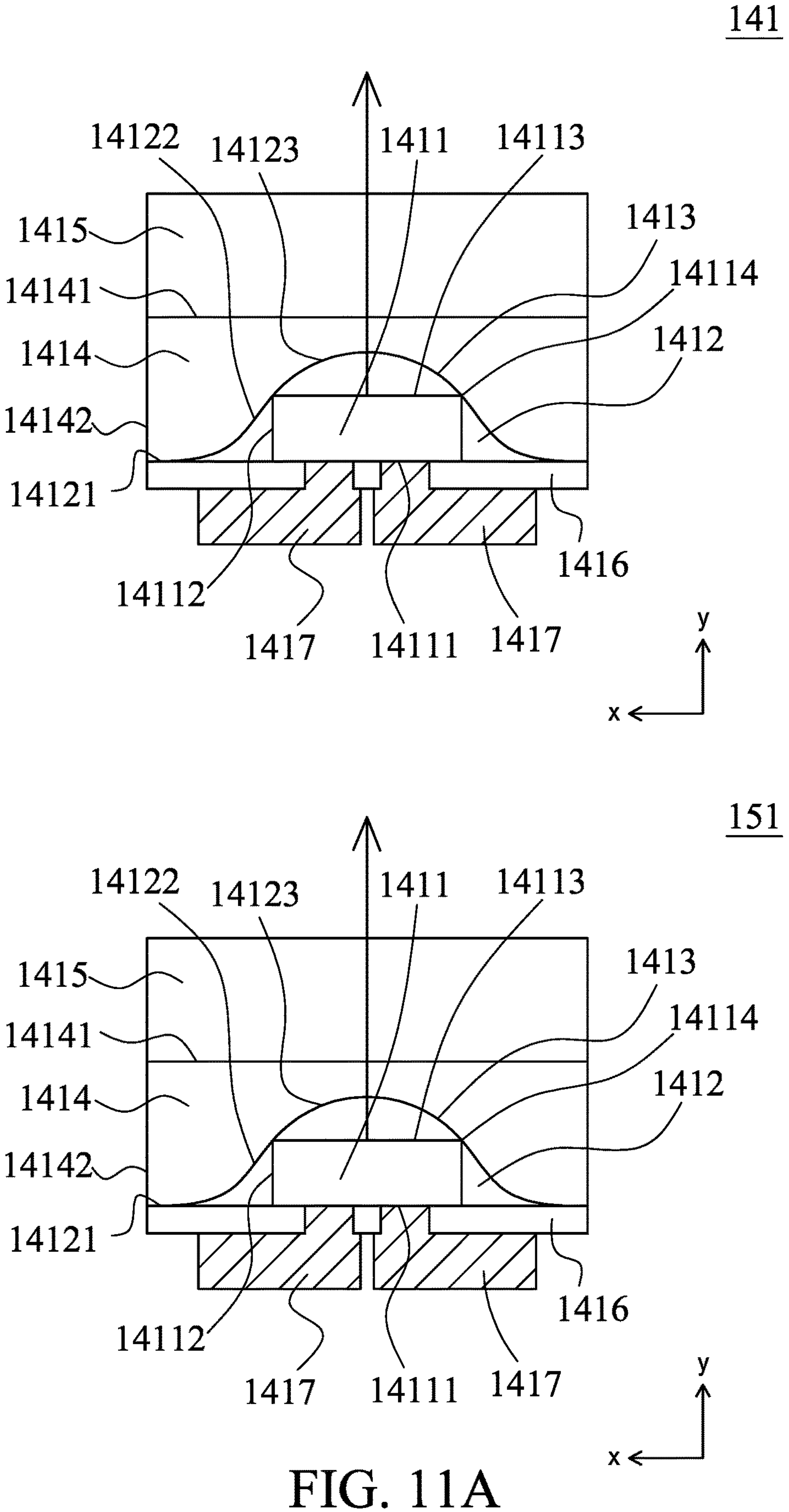
FIG. 11A shows a cross-sectional view of a light-emitting unit in accordance with an embodiment of the present disclosure.

FIG. 11A shows a cross-sectional view of the light-emitting unit 141 and/or 151 of the present disclosure. The light-emitting unit 141 comprises a light-emitting body 1411, a first transparent element 1412, a phosphor structure 1413, a second transparent element 1414 and a third transparent element 1415. The light-emitting body 1411 includes a first-type semiconductor layer, an active layer, and a second-type semiconductor layer. The first-type semiconductor layer and the second-type semiconductor layer, for example a cladding layer or a confinement layer, respectively provide electrons and holes such that electrons and holes can be combined in the active layer to emit light. The first-type semiconductor layer, the active layer, and the second-type semiconductor layer can include III-V group semiconductor material, such as AlxInyGa (1-x-y) N or AlxInyGa(1-x-y)P, wherein 0≤x, y≤1; (x+y)≤1. Based on the material of the active layer, the light-emitting body 1411 can emit a red light with a peak wavelength of 610-650 nm; emit a green light with a peak wavelength of 530-570 nm; or emit a blue light with a peak wavelength of 450-490 nm. The light-emitting unit 141 further includes a reflective insulating layer 1416 and extension electrodes 1417. The extension electrodes 1417 are electrically connected to the first-type semiconductor layer and the second-type semiconductor layer. The first transparent element 1412, the second transparent element 1414 and the third transparent element 1415 is transparent to light like the sunlight or the light emitted from the light-emitting body 1411. In one embodiment, the first transparent element 1412, the second transparent element 1414 or/and the third transparent element 1415 can include diffusing particles, such as titanium oxide, zirconium dioxide, zinc oxide, or aluminum oxide.

In another embodiment, the phosphor structure 1413 includes a plurality of phosphor particles (not shown) and is formed to conform to the profile of the first transparent element 1412. A portion of adjacent phosphor particles contact with each other, but other portion of adjacent phosphor particles do not contact with each other. The phosphor particles have a particle size of 5 μm~100 μm and include one or two kinds of phosphor material. The phosphor material includes, but is not limited to, yellow-greenish phosphor and red phosphor. The yellow-greenish phosphor includes aluminum oxide (such as YAG or TAG), silicate, vanadate, alkaline-earth metal selenide, or metal nitride. The red phosphor includes silicate, vanadate, alkaline-earth metal sulfide, metal nitride oxide, a mixture of tungstate and molybdate. The diffusing material comprises TiO2, ZnO, ZrO2, or Al2O3.

The phosphor structure 1413 can absorb a first light emitted from the light-emitting unit 141 to convert to a second light with a peak wavelength different from the first light. The first light is mixed with the second light to produce a white light. The lighting apparatus 100 has a whiter color temperature of 2200K~6500K (ex. 2200K, 2400K, 2700K, 3000K, 5700K, 6500K) and a color point (CIE x, y) is within a seven-step MacAdam ellipse. In addition, the lighting apparatus 100 has a color rendering index greater than 80 or 90. The first transparent element 1412 substantially has an arch-shaped profile. The arch-shaped profile includes a first region 14121, a second region 14122, and a third region 14123. The first region 14121 is substantially arranged in the same horizontal plane with a bottom surface 14111 of the light-emitting body 1411, parallel to an upper surface 14141 of the second transparent element 1414 and extending to a side surface 14142 of the second transparent element 1414. The second region 14122 extends from the first region 14121 and has a curve shape. In addition, the second region 14122 is arranged to surround a side surface 14112 of the light-emitting body 1411. The third region 14123 extends from the second region 14122 to the upper surface 14141 of the second transparent element 1414 and arranged on a top surface 14113 of the light-emitting body 1411. Moreover, the third region 14123 does not surround the side surface 14112 of the light-emitting body 1411. A distance between the second region 14122 and the side surface 14112 is decreased along a vertical direction (a direction from the bottom surface 14111 to the top surface 14113, y direction). Furthermore, an intersection where the second region 14122 meets with the third region 14123 is located at a point 14114 of the light-emitting body 1411 and is most close to the light-emitting body 1411 within all the arch-shaped profile. A distance of the third region 14123 and the top surface 14113 is gradually increased and then gradually decreased along a horizontal direction (x). The third region 14123 is disposed at a central region of the light-emitting body 1411. The maximum distance between the second region 14122 and the side surface 14112 of the light-emitting body 1411 is greater than that between the third region 14123 and the top surface 14113 of the light-emitting body 1411. An average distance between the second region 14122 and the side surface 14112 of the light-emitting body 1411 is substantially equal to that between the third region 14123 and the top surface 14113 of the light-emitting body 1411. The first region 14121 is closer to the reflective insulating layer 1416 than the second region 14122 and the third region 14123.

Each of the first transparent element 1412 and the second transparent element 1413 includes silicone, epoxy, PI, BCB, PFCB, SU8, acrylic resin, PMMA, PET, PC, polyetherimide, fluorocarbon polymer, Al2O3, SINR, or SOG. The third transparent element 1415 includes sapphire, diamond, glass, epoxy, quartz, acrylic resin, SiOX, Al2O3, ZnO, silicone. The reflective insulating layer 1416 includes a mixture including a matrix and high reflective material. The matrix can include silicone-based matrix or epoxy-based matrix, and the high reflective material can include titanium oxide, silicon dioxide, or aluminum oxide. The extension electrodes 1417 include metal, such as Cu, Ti, Au, Ni or combinations thereof. In this embodiment, the light-emitting unit 141 is defined as a five-surface light-emitting structure and has a emitting angle of about 140°. In another embodiment, the light-emitting unit 141 does not include the third transparent element 1415.

Figure 11B:
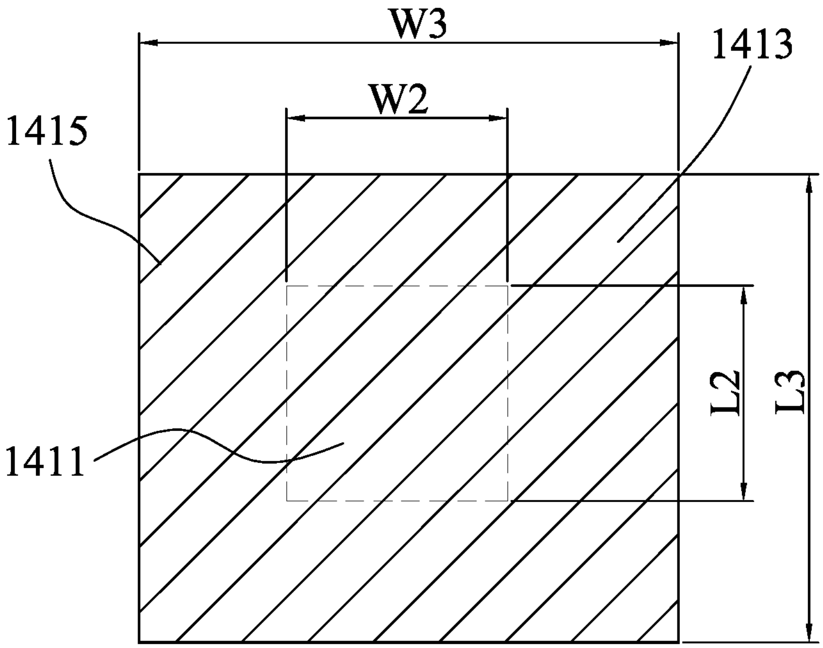
FIG. 11B shows a top view of the light-emitting unit of FIG. 11A.

FIG. 11B is a top view of the light-emitting unit 141 or/and 151. The light-emitting body 1411 has a length (L2) of 0.3 mm-1.4 mm, a width (W2) of 0.2 mm-1.4 mm, and an area of 0.06 mm2-1.96 mm2. The light-emitting unit 141 or/and 151 has a length (L3) of 1 mm-3 mm, a width (W3) of 0.5 mm-3 mm, and an area of 0.5 mm2-9 mm2. The third transparent element 1415 includes transparent material or light-transmitted material, therefore, when the light-emitting unit 141 does not emit light, the phosphor structure 1413 can be slightly visible under illumination. In addition, in the top view, an area occupied by the phosphor structure 1413 is substantially equal to the area of the third transparent element 1415. Referring to the lighting apparatus in FIG. 1A, the light-emitting units 141, 151 are formed on the first surface 130 and the second surface 131 of the board 13, respectively. The light-emitting units 141, 151 have total emitting areas (for example, one light-emitting unit has an emitting area of 1 mm2 and ten light-emitting units have the total emitting area of 1*10=10 mm2.) which are 0.1-0.01 times the areas of the first surface 130 and the second surface 131 of the board 13, respectively, such that under the operating current of 5~20 mA and the operating voltage with a root-mean-square voltage of 100~130V or 200~260V, the lighting apparatus has a light intensity greater than 150 lumens or greater than 200 lumens at the thermal steady state. In other embodiment, the light-emitting units 141 are only disposed on the first surface 130 and the light-emitting units 141 has a total emitting area which is 0.1~0.01 times the area of the first surface 130 of the board 13, such that under the operating current of 5~20 mA and the operating voltage with a root-mean-square voltage of 100~130 V or 200~260 V, the lighting apparatus has a light intensity greater than 100 lumens, or greater than 200 lumens, or of 100~250 lumens at the thermal steady state.

Figure 11C:
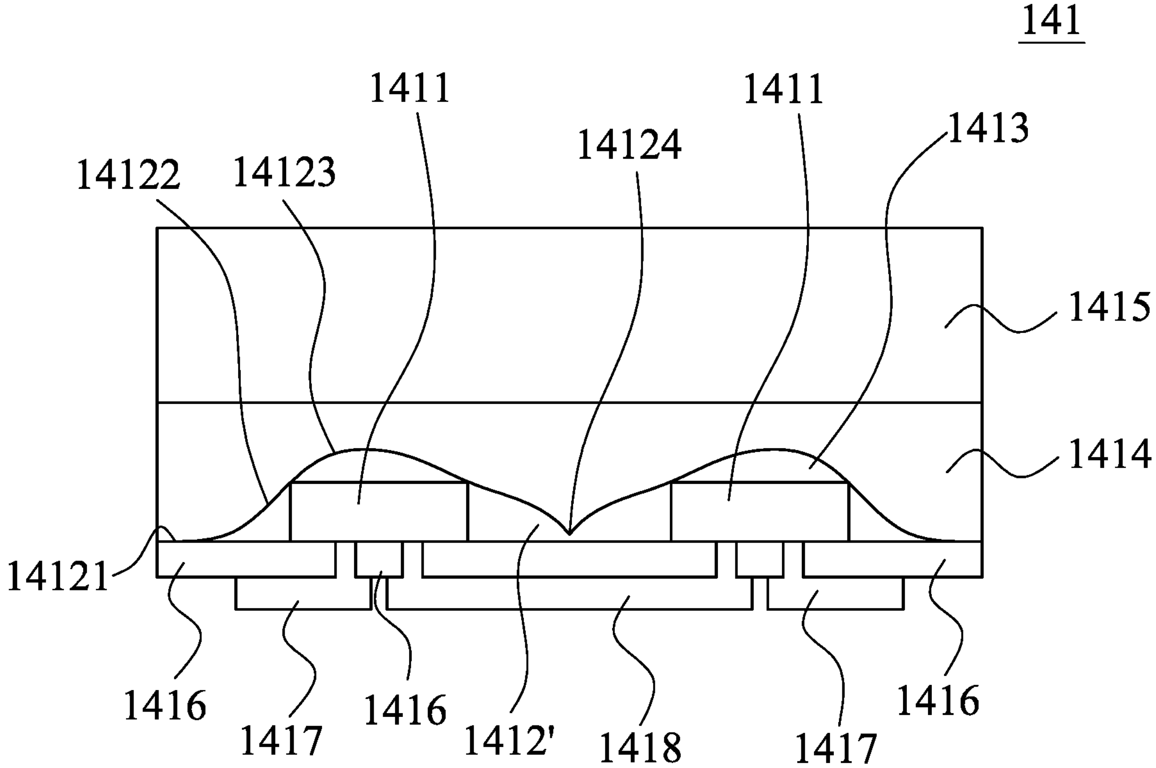
FIG. 11C shows a cross-sectional view of a light-emitting unit in accordance with another embodiment of the present disclosure.

FIG. 11C shows a cross-sectional view of the light-emitting unit 141 or/and 151 in accordance with another embodiment of the present disclosure. The structure of FIG. 11C is similar to that of FIG. 11A. The light-emitting unit 141 includes a plurality of light-emitting bodies 1411, a first transparent element 1412', a phosphor structure 1413, a second transparent element 1414, a third transparent element 1415, a reflective insulating layer 1416 and a pair of extension electrodes 1417. The light-emitting unit 141 further includes a connecting conductive line 1418 connecting the light-emitting bodies 1411 with each other. Depending on actual requirements, one light-emitting unit 141 can include two or more light-emitting bodies 1411 such that a forward voltage of the light-emitting diode unit 141 is larger than 3V based on the quantity of the light-emitting body 1411 (assuming an forward voltage of one light-emitting body 1411 is of 3V). For example, a light-emitting unit 141 includes five light-emitting bodies 1411 so the forward voltage the light-emitting unit 141 is 15V. Similar to the first transparent element 1412 of FIG. 11A, the first transparent element 1412' substantially has an arch-shaped profile (for example, M-like cross section). The arch-shaped profile of FIG. 11C is similar to that of FIG. 11A (the same structure having the first region 14121, the second region 14122 and the third region 14123 is not described herein and refers to the description of FIG. 11A). However, the first transparent element 1412' further includes a fourth region 14124 between two adjacent light-emitting bodies 1411 and surrounding the side surface 14112 of two adjacent light-emitting bodies 1411. The fourth region 14124 has a V-shaped cross section. In one embodiment, the phosphor structure 1413 includes a plurality of phosphor particles (not shown) and is formed to conform to the profile of the first transparent element 1412'. It is noted that a portion of adjacent phosphor particles contact with each other, but other portion of adjacent phosphor particles do not contact with each other.

Figure 12A:
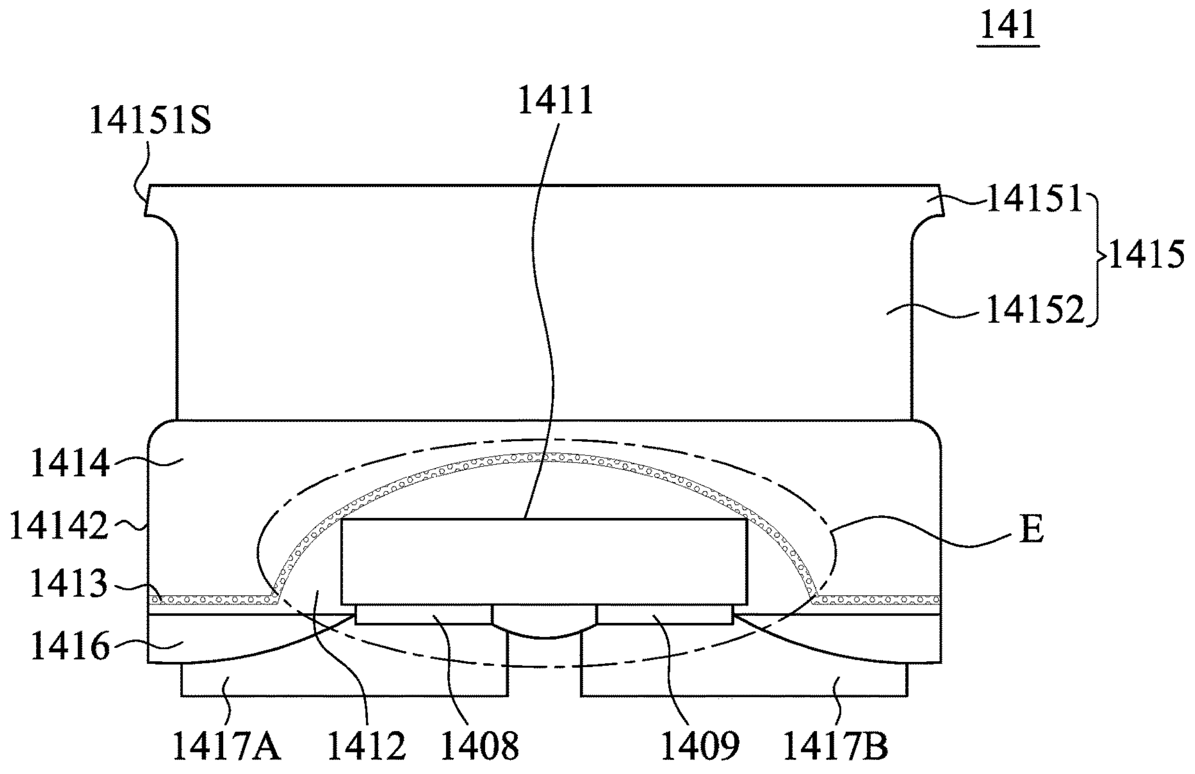
FIG. 12A shows a cross-sectional view of a light-emitting unit in accordance with another embodiment of the present disclosure.
Figure 12B:
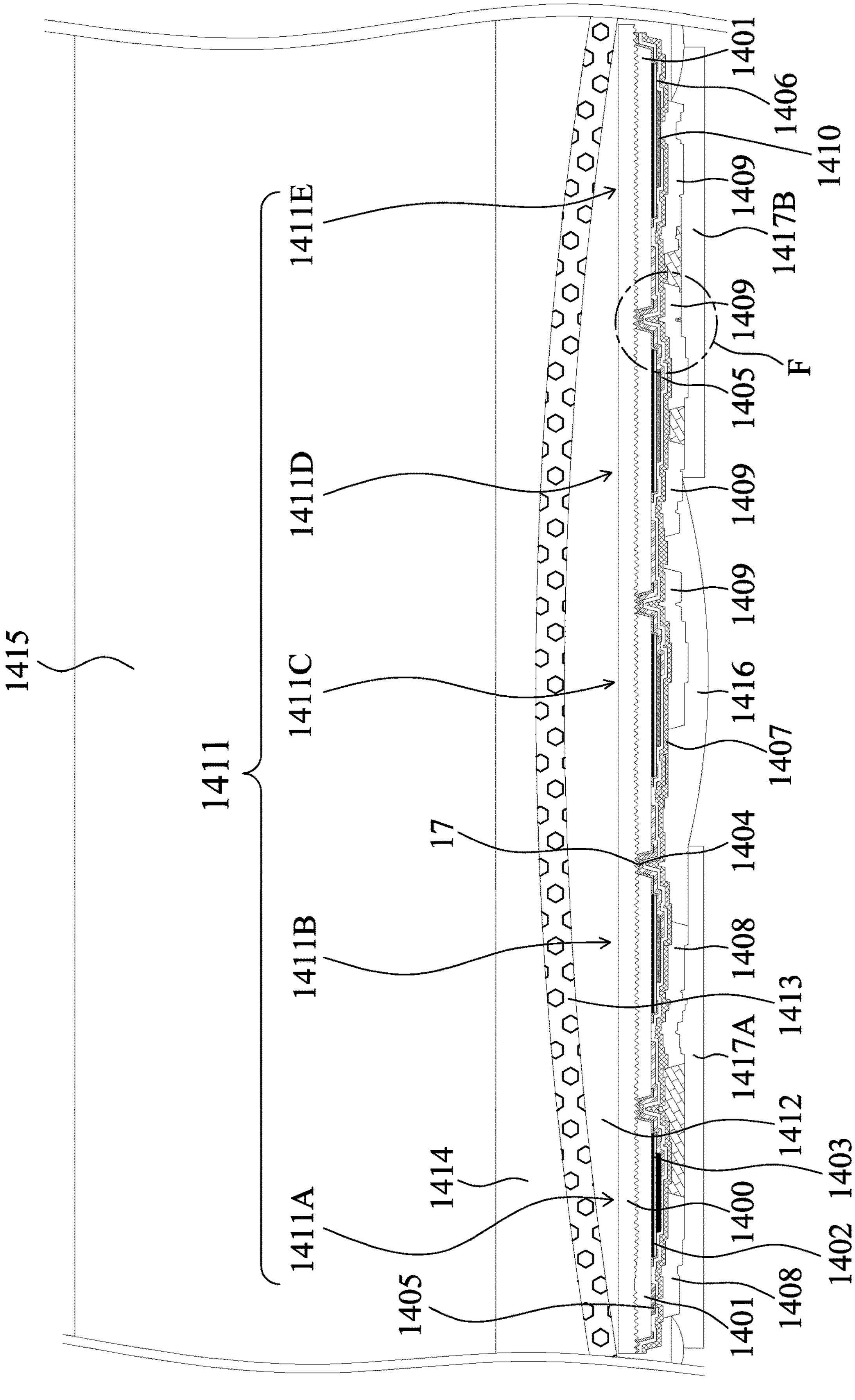
FIG. 12B shows an enlarged view of FIG. 12A.
Figure 12C:
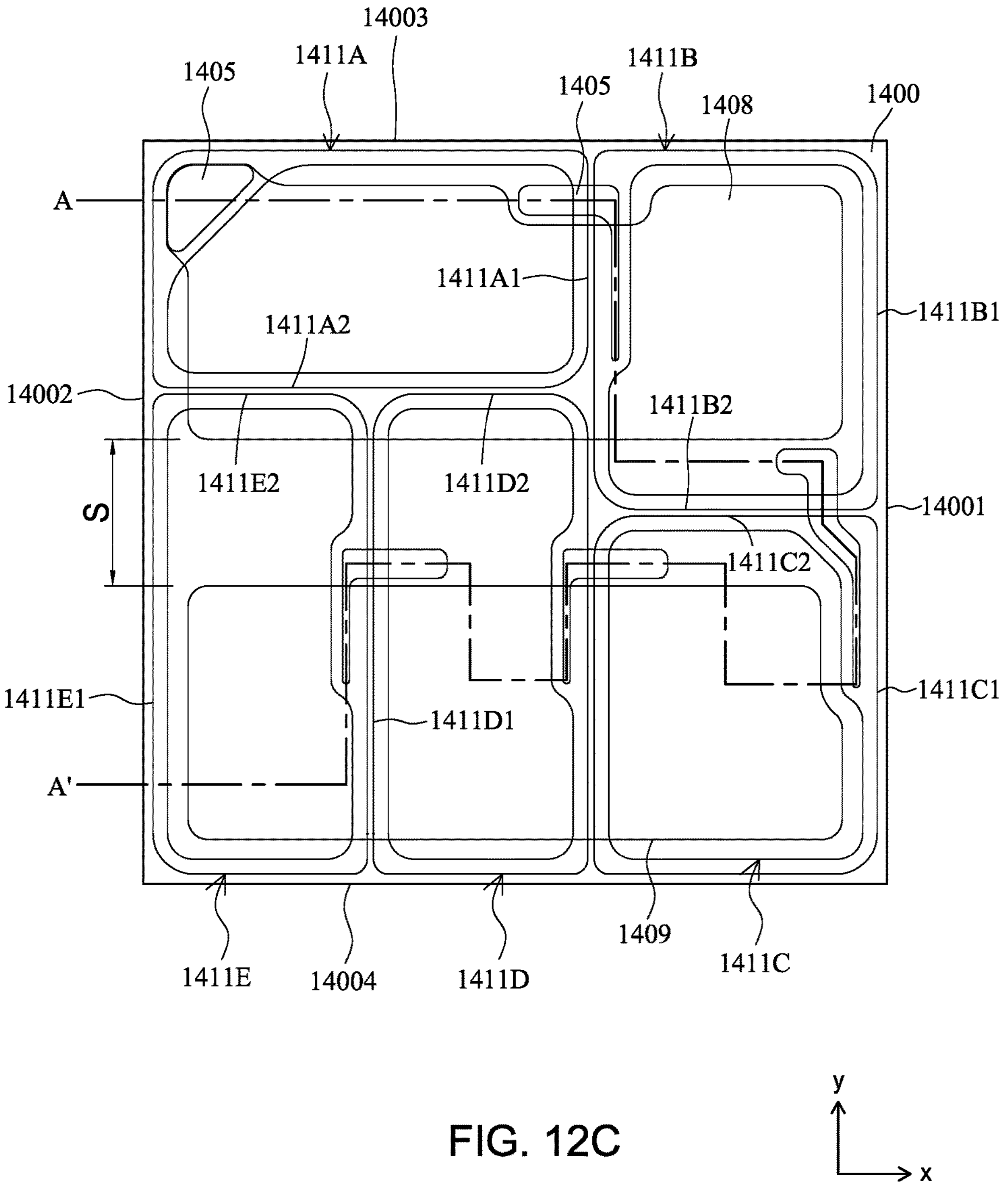
FIG. 12C shows a top view of a plurality of light-emitting bodies of FIG. 12B.

FIG. 12A shows a cross-sectional view of the light-emitting unit 141 in accordance with another embodiment of the present disclosure. FIG. 12B shows an enlarged view of E in FIG. 12A and FIG. 12C shows a top view of the light-emitting bodies 1411; wherein FIG. 12B shows a cross-sectional view taken along line A-A' of FIG. 12C. The light-emitting unit 151 can also have the same structure as the light-emitting unit 141. As shown in FIGS. 12A and 12B, the light-emitting unit 141 includes a patterned substrate 1400, a plurality of light-emitting bodies 1411A-E commonly formed on the patterned substrate 1400, a trench 17 formed between the light-emitting bodies 1411A-E to physically separate the light-emitting bodies 1411A-E from each other, a first transparent element 1412, a phosphor structure 1413, a second transparent element 1414, a third transparent element 1415, a reflective insulating layer 1416 and a pair of extension electrodes 1417A, 1417B. The phosphor structure 1413 includes a plurality of phosphor particles dispersed in a matrix body. Alternatively, the phosphor structure 1413 can further include diffusing particles. The matrix body includes epoxy, silicone, PI, BCB, PFCB, Su8, acrylic resin, PMMA, PET, PC, or polyetherimide. The description of the phosphor particles and the diffusing particles can refer to other embodiments.

As shown in FIG. 12A, the third transparent element 1415 has a tapered shape. Specifically, the third transparent element 1415 has a first portion 14151 and a second portion 14152. The second portion 14152 is close to the second transparent element 141 than the first portion 14151 and has a width smaller than that of the first portion 14151. The first portion 14151 has a thickness 1%~20% or 1%~10% of the thickness of the third transparent element 1415. In this embodiment, an intersection where the first portion 14151 meets with the second region 14152 is an arch shape. The first portion 14151 has a side surface 14151S is more far away from the light light-emitting body 1411 than a side surface 14142 of the second transparent element 1414. In other embodiment, the side surface 14151S can be flush with the side surface 14142.

As shown in FIGS. 12A-12C, each of the light-emitting bodies 1411A-E includes a first-type semiconductor layer 1401, an active layer 1402, and a second-type semiconductor layer 1403. A first insulating layer 140 is formed on the trench 17 and covers the first-type semiconductor layer 1401 of the light-emitting bodies 1411A-E to avoid undesired electrical path. A conductive layer 1410 is formed on a second-type semiconductor layer 1403 of portions of the light-emitting bodies for electrically connecting thereto. Thereafter, a plurality of spaced-apart conductive structures 1405 formed on the first insulating layer 1404 and further formed on two adjacent light-emitting bodies. To be more specific, each of the conductive structures 1405 has an end formed on the first-type semiconductor layer 1401 and the other end formed on and extended to the second-type semiconductor layer 1403 of adjacent light-emitting body such that two adjacent light-emitting bodies 1411 are electrically connected to each other. The conductive structures 1405 cover a portion of the conductive layer 1410 and also formed on a portion of the second-type semiconductor layer 1403 of the light-emitting body 1411A for electrically connecting thereto. A second insulating layer 1406 is formed on the conductive structures 1405 and covers the entire light-emitting bodies 1141B, 1141C, 1141D and a portion of the light-emitting bodies 1141A, 1141E to expose the conductive structure 1405 of the light-emitting body 1141A and the conductive layer 1410 of the light-emitting bodies 1141E. A third insulating layer 1407 is formed to cover the second insulating layer 1406. A first electrode 1408 and a second electrode 1409 are electrically connected to the light-emitting body 1411A and the light-emitting body 1411E, respectively. The first electrode 1408, the second electrode 1409, and the conductive structure 1405 can be made of metal material, such as Au, Ag, Cu, Cr, Al, Pt, Ni, Ti, Sn or alloy thereof or a multilayer thereof. The first insulating layer 1404 can be a single layer or a multilayer. When the first insulating layer 1404 is a single layer, it can be made of a material including oxide, nitride or polymer. The oxide can include Al2O3, SiO2, TiO2, Ta2O5, or AlOx; the nitride can include AlN or SiNX; the polymer can include polyimide or benzocyclobutane (BCB). When the first insulating layer 1404 is a multilayer, the multilayer is stack of alternate layers, each of which is Al2O3, SiO2, TiO2, or Nb2O5 to form a Distributed Bragg Reflector (DBR) structure. The second insulating layer 1406 and the third insulating layer 1407 can be made of a material referring to the first insulating layer 1404. In this embodiment, the light-emitting unit 141 includes five light-emitting bodies, the forward voltage of each of which is about 3V, and therefore, the forward voltage of the light-emitting unit 141 is about 15V. When the lighting apparatus is operated at the operating current of 5~20 mA and the operating voltage (forward voltage) of 100~130 V or 240~320 V, the total quantity of the light-emitting unit 141 is in a range of 6~9 or of 16~22. Alternatively, in one embodiment, the light-emitting unit 141 includes eight light-emitting bodies, and therefore the forward voltage of the light-emitting unit 141 is about 24V. When the lighting apparatus is operated at the operating current of 5~20 mA and the operating voltage (forward voltage) of 100~130V or 240~320V, the total quantity of the light-emitting unit 141 is in a range of 4~8 or of 10~14.

For clearly illustrating, parts of the light-emitting bodies are shown in FIG. 12C and drawn in solid line. The relation and description of each stack can refer to other drawings. Since the first electrode 1408 and the second electrode 1409 are used to directly connect to an external electrode or other external circuit, the first electrode 1408 and the second electrode 1409 are required to have an area enough to meet the aforesaid condition. Furthermore, when the areas of the first electrode 1408 and the second electrode 1409 are too small, a problem of misalignment with the external electrode or other external circuit will occur. However, when the areas of the first electrode 1408 and the second electrode 1409 are too large, a distance between the first electrode 1408 and the second electrode 1409 will be too small so a short circuit may occur during subsequent soldering process for connecting the electrodes 1408, 1409 with an external electrode or other external circuit. As shown in FIG. 12C, the first electrode 1408 has the area more than 10% and less than 50% of the area of the substrate 1400. The first electrode 1408 covers most of the area of the light-emitting bodies 1141A, 1141B (for example, 40%~100% area of the light-emitting body 1141A is covered by the first electrode 1408; 40%~100% area of the light-emitting body 1141B is covered by the first electrode 1408). Alternatively, the first electrode does not cover or can cover portions of the light-emitting bodies 1141D, 1141E (for example, 0%~30% area of the light-emitting body 1141E is covered by the first electrode 1408; 0%~30% area of the light-emitting body 1141B is covered by the first electrode 1408). The second electrode cover most of the area of the light-emitting bodies 1141C, 1141D, 1141E (for example, 10%~70% area of the light-emitting body 1141C is covered by the second electrode 1409; 10%~70% area of the light-emitting body 1141D is covered by the second electrode 1409; 40%~100% area of the light-emitting body 1141E is covered by the second electrode 1409). Based on the area of the light-emitting bodies 1141A~1141E covered by the first electrode 1408 or the second electrode 1409, the first electrode 1408 or the second electrode 1409 can be designed to have different or almost the same area. In addition, a minimum distance (S) between the first electrode 1408 and the second electrode 1409 is 90 μm~250 μm. In other embodiment, the first electrode 1408 can merely cover the light-emitting body 1411A and the second electrode 1409 can merely cover the light-emitting body 1411E.

Figure 12D:
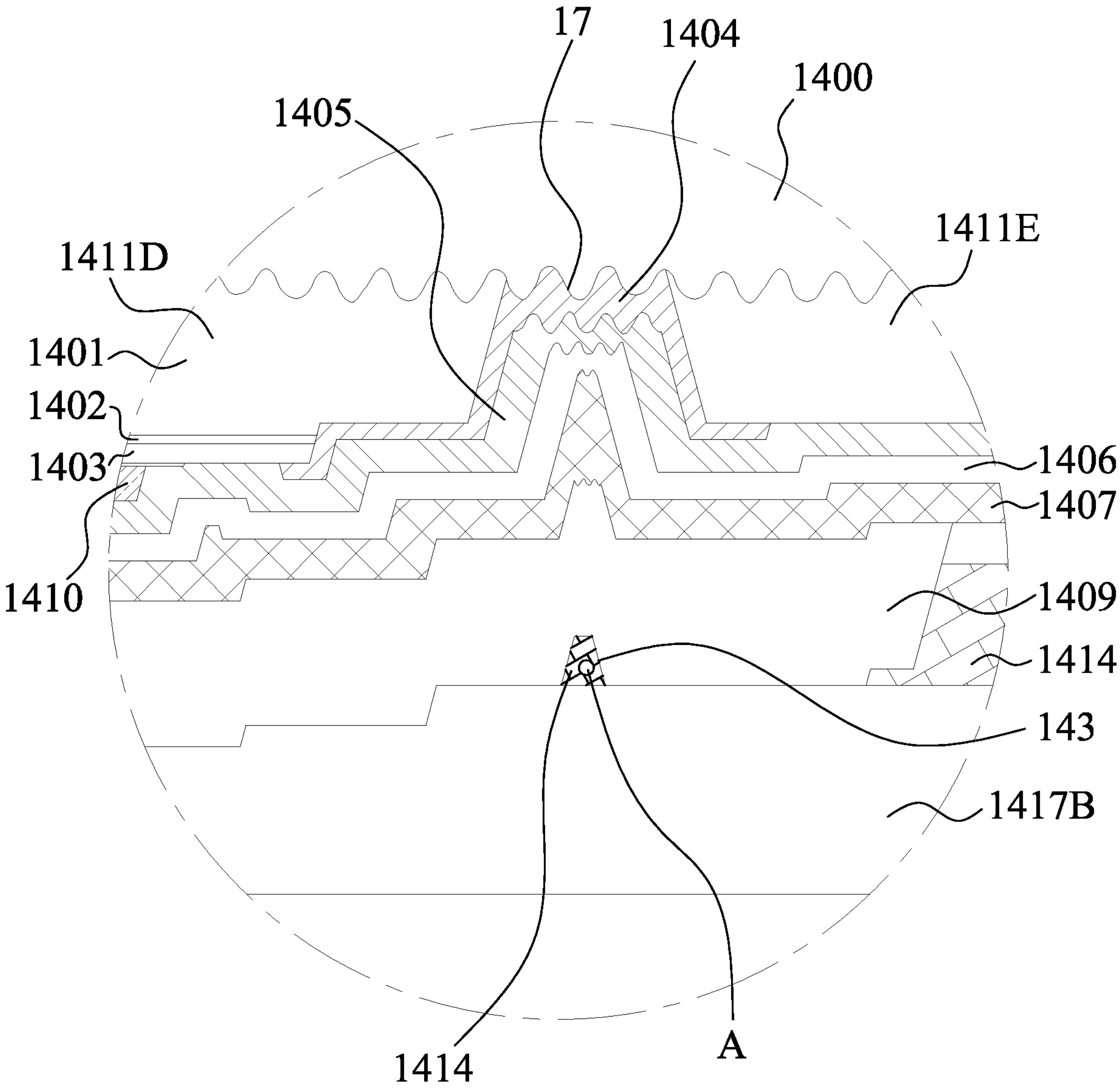
FIG. 12D shows an enlarged view of FIG. 12B.

FIG. 12D shows an enlarged view of F in FIG. 12D. The first insulating layer 1404 formed between two adjacent light-emitting bodies 1411D, 1411E has a profile substantially equal to that of the patterned substrate 1400, that is, the first insulating layer 1404 formed on the trench 17 has a profile substantially equal to that of the patterned substrate 1400. In this embodiment, since the patterned substrate 1400 has a curve shape in cross section, the first insulating layer 1404 also has a curve shape in cross section. When the patterned substrate 1400 has a triangular or circle shape in cross section, the first insulating layer 1404 also has a triangular or circle shape in cross section. Likewise, the conductive structure 1405, the second insulating layer 1406, the third insulating layer 1407, and the second electrode 1408 formed between the two adjacent light-emitting bodies 1411 and sequentially formed on the first insulating layer 1404 also have a profile substantially equal to that of the first insulating layer 1404 or the patterned substrate 1400. In this embodiment, the second electrode 1409 and the extension electrode 1417B has a gap 143 and the second transparent element 1414 can fill entirely or partially within the gap 143. When the second transparent element 1414 partially fills within the gap 143, there may be a bubble A produced therein.

Figure 13A:
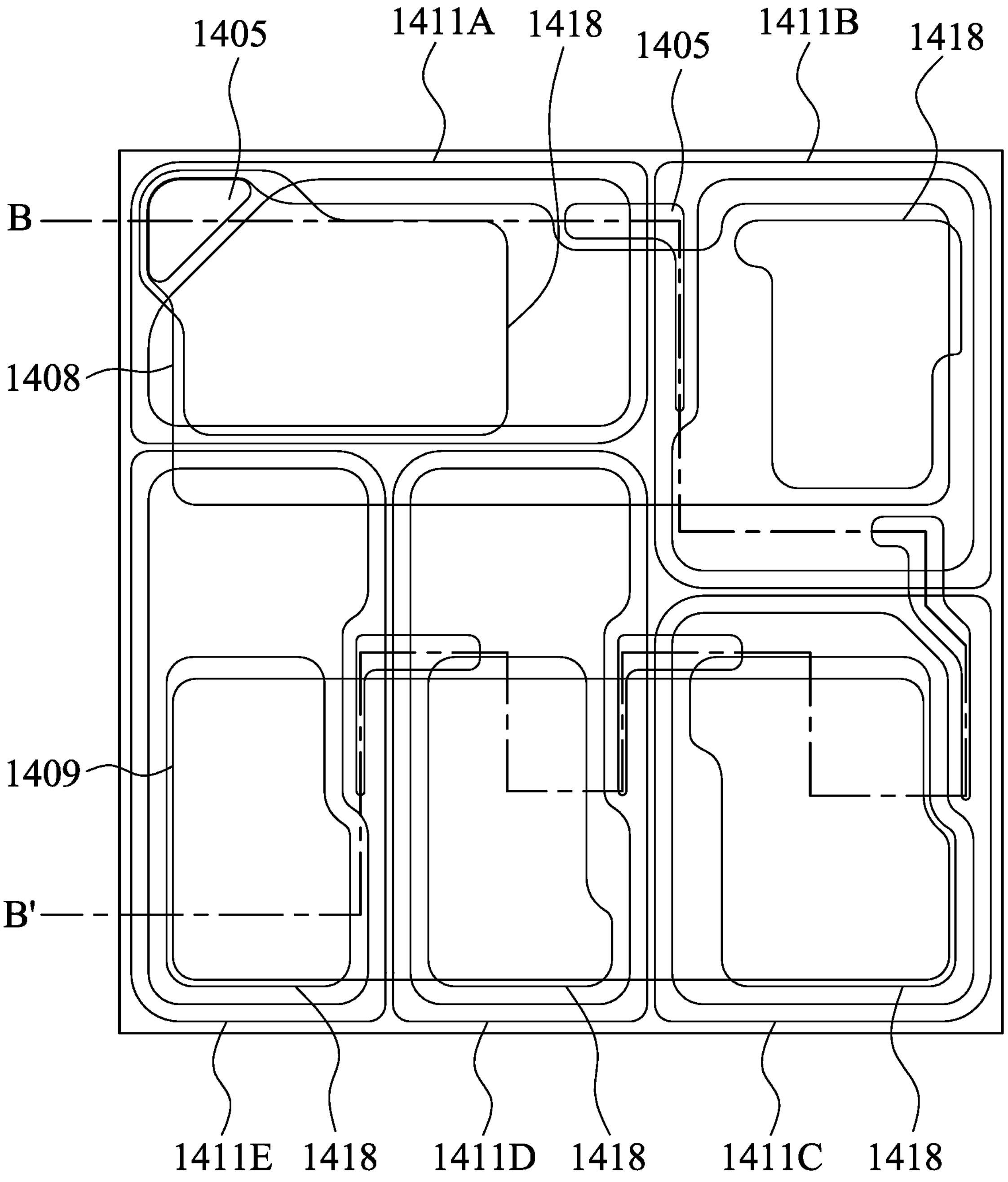
FIG. 13A shows a top view of a plurality of light-emitting bodies in accordance with another embodiment of the present disclosure.
Figure 13B:
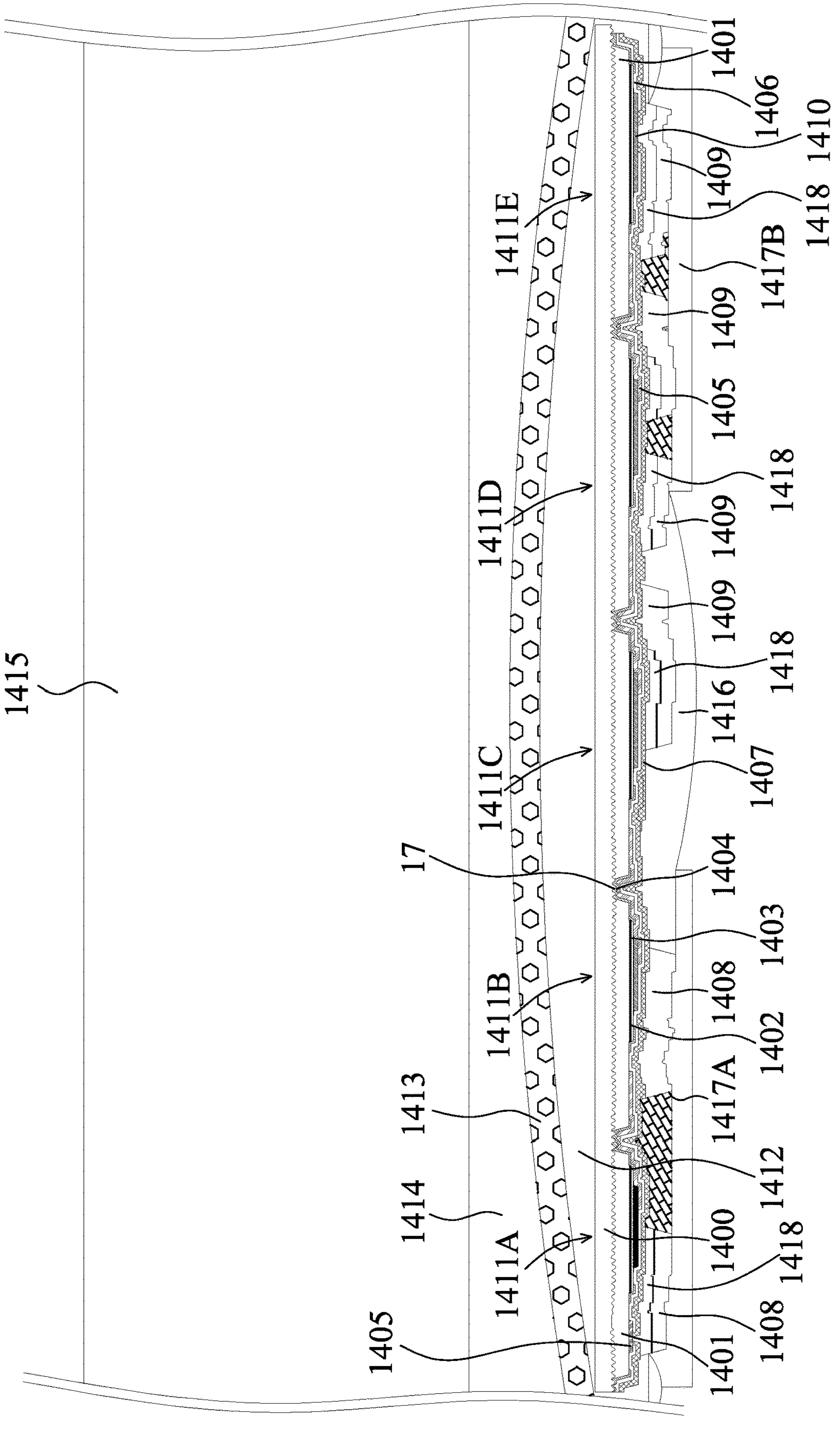
FIG. 13B shows a cross-sectional view taken along line B-B' of FIG. 13A.

FIG. 13A shows a top view of the light-emitting unit 141 in accordance with another embodiment of the present disclosure. FIG. 13B shows a cross-sectional view taken along line B-B' of FIG. 13A. The light-emitting unit 151 can also have the same structure as the light-emitting unit 141. The light-emitting unit 14 of FIG. 13A has a structure similar to that of FIG. 12C, wherein devices or elements with similar or the same symbols represent those with the same or similar functions. The light-emitting unit 14 of FIG. 13A further includes a plurality of heat-dissipating pads 1418. The heat-dissipating pad 1418 is formed on the conductive structure 1405 of the light-emitting body 1411A for connecting thereto; the heat-dissipating pad 1418 is formed on the conductive layer 1410. Thereafter, the first electrode 1408 is formed on the heat-dissipating pads 1418 of the light-emitting bodies 1411A, 1411B and the second electrode 1409 is formed on the heat-dissipating pads 1418 of the light-emitting bodies 1411C, 1411D, 1411E. The first electrode 1408 is merely electrically connected to the light-emitting body 1411A and the second electrode 1409 is merely connected to the light-emitting body 1411E. The heat-dissipating pads 1418 can be made of a metal material, such as Au, Ag, Cu, Cr, Al, Pt, Ni, Ti, Sn or alloy thereof or a multilayer thereof.

Figure 14:
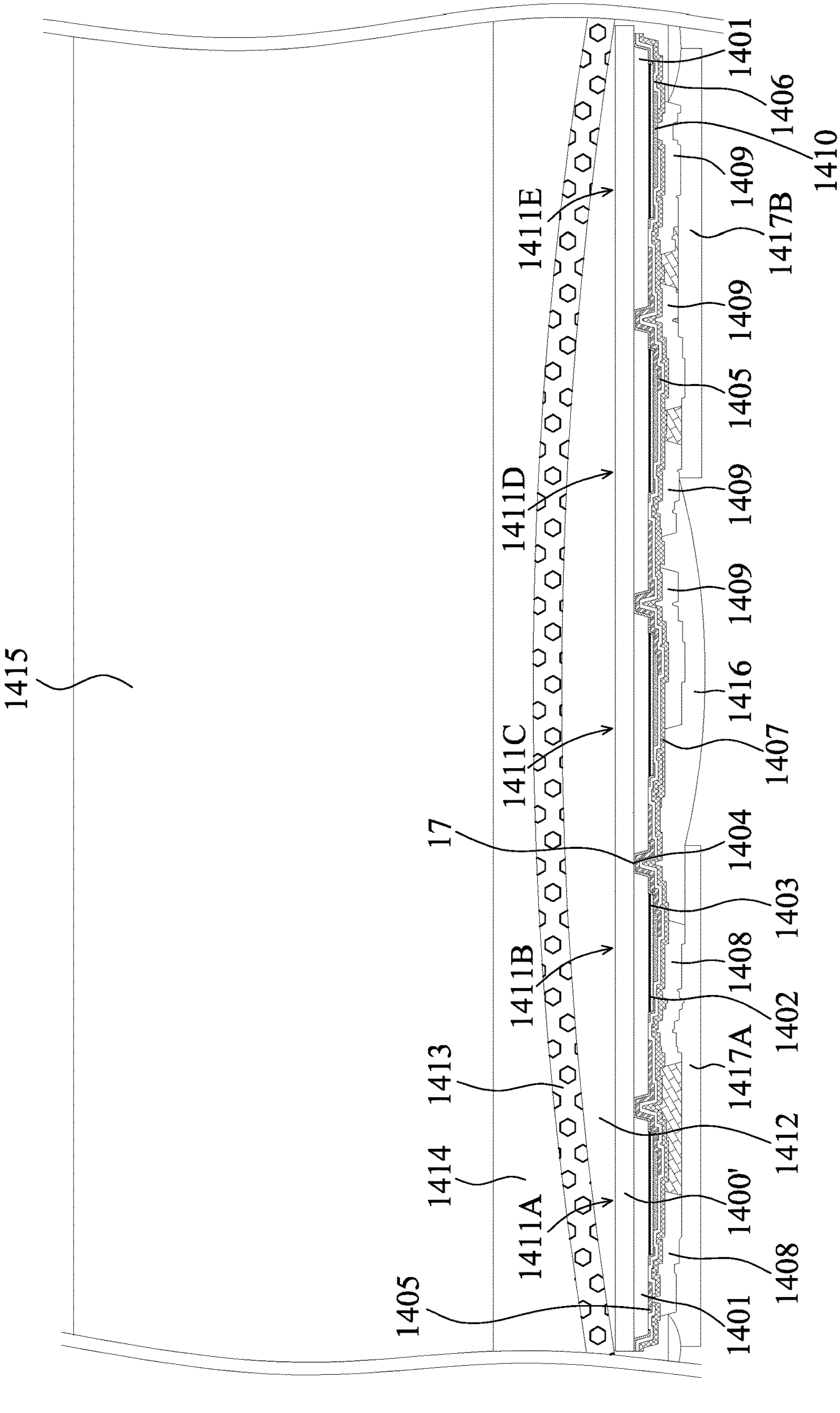
FIG. 14 shows a cross-sectional view of a light-emitting unit in accordance with another embodiment of the present disclosure.

FIG. 14 shows a top view of the light-emitting unit 141 in accordance with another embodiment of the present disclosure. The light-emitting unit 151 can also have the same structure as the light-emitting unit 141. The top view of FIG. 14 is equal to FIG. 12C, and then is omitted herein for brevity. Different from FIG. 12B, the light-emitting unit 141 includes a flat substrate 1400' (not patterned) and a plurality of the light-emitting bodies 1411A-E commonly formed on the substrate 1400'.

Figure 15A:
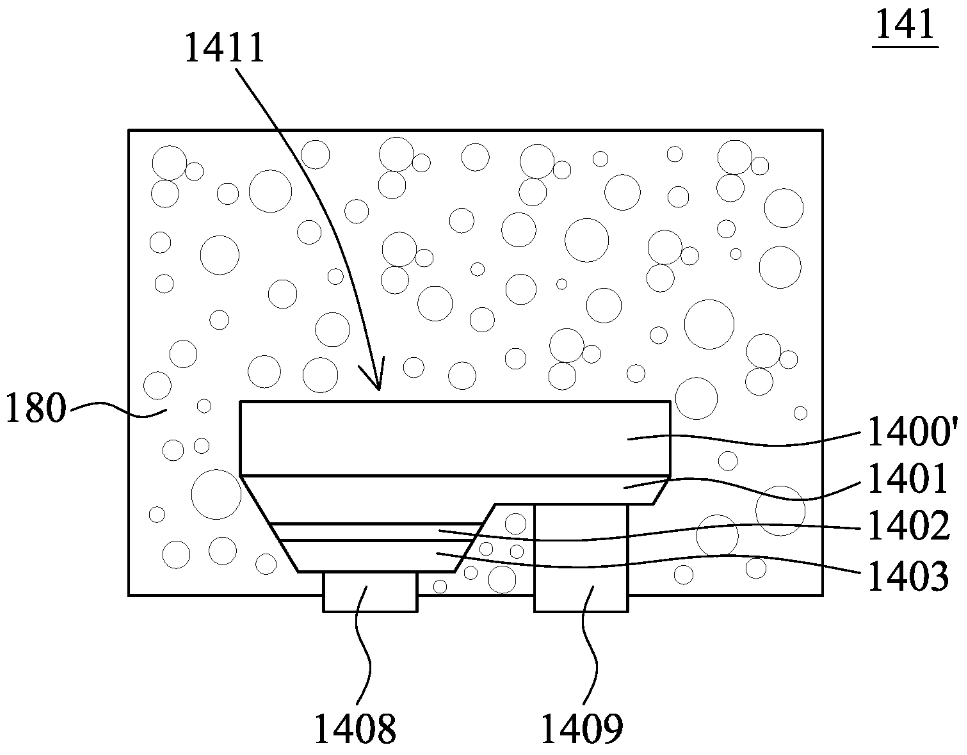
FIG. 15A shows a cross-sectional view of a light-emitting unit in accordance with another embodiment of the present disclosure.

FIG. 15A shows a cross-sectional view of the light-emitting unit 141 in accordance with another embodiment of the present disclosure. The light-emitting unit 151 can also have the same structure as the light-emitting unit 141. The light-emitting unit 141 of FIG. 15A is similar to that of FIG. 12A wherein devices or elements with similar or the same symbols represent those with the same or similar functions. In this embodiment, the light-emitting unit 141 includes merely a light-emitting body 1411 and a phosphor structure 180 enclosing the light-emitting body 1411 to expose the electrodes 1408, 1409. The phosphor structure 180 includes a plurality of phosphor particles dispersed in a matrix body. Alternatively, the phosphor structure 180 can further include diffusing particles. The matrix body includes epoxy, silicone, PI, BCB, PFCB, Su8, acrylic resin, PMMA, PET, PC, or polyetherimide. The description of the phosphor particles and the diffusing particles can refer to other embodiments.

Figure 15B:
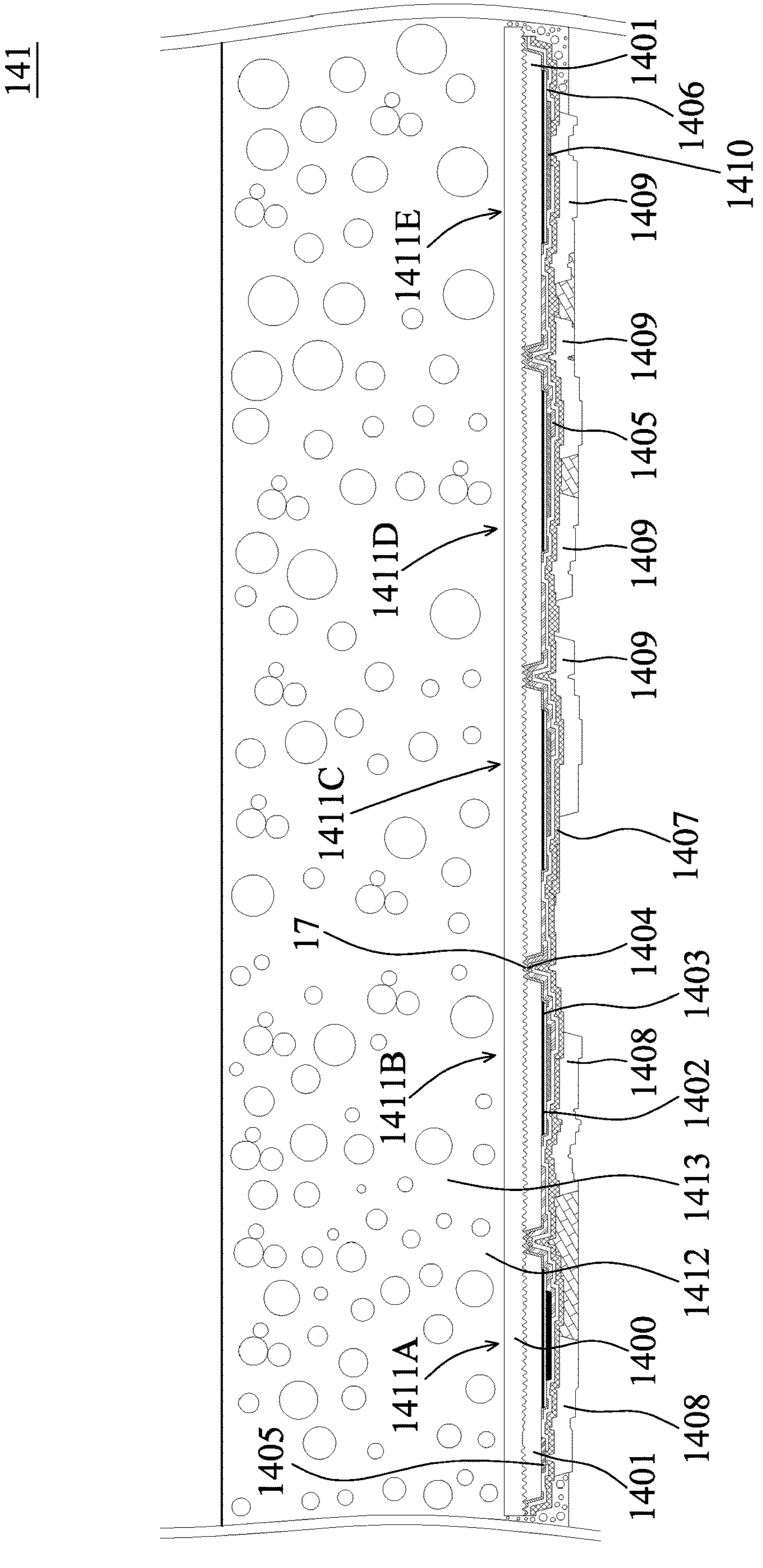
FIG. 15B shows a cross-sectional view of a light-emitting unit in accordance with another embodiment of the present disclosure.

FIG. 15B shows a cross-sectional view of a portion of the light-emitting unit 141 in accordance with another embodiment of the present disclosure. The light-emitting unit 151 can also have the same structure as the light-emitting unit 141. The light-emitting unit 141 of FIG. 15B is similar to that of FIG. 15A, wherein devices or elements with similar or the same symbols represent those with the same or similar functions. The light-emitting unit 141 of FIG. 15B includes a plurality of light-emitting bodies 1411(1411A~E) commonly formed on the substrate 1400. The description of other detailed structures can refer to FIGS. 12A-12D.

Figure 15C:
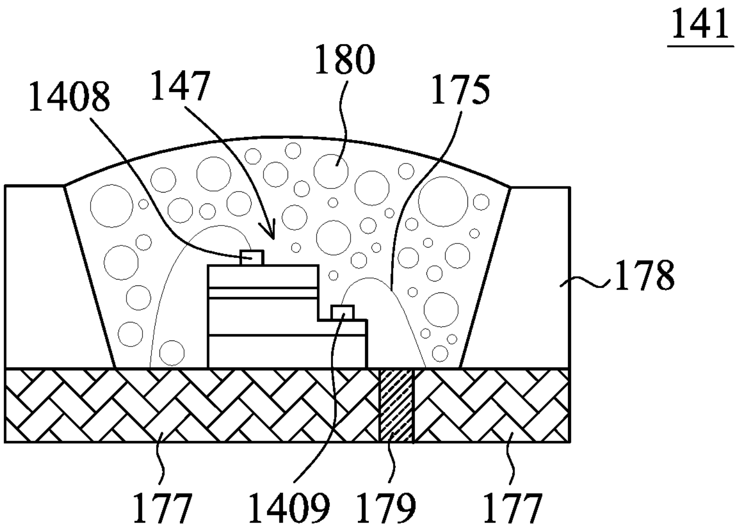
FIG. 15C shows a cross-sectional view of a light-emitting unit in accordance with another embodiment of the present disclosure.

FIG. 15C shows a cross-sectional view of the light-emitting unit 141 in accordance with another embodiment of the present disclosure. The light-emitting unit 141 includes a light-emitting body 147, two bonding wires 175, two spaced-apart conductive frames 177 and a reflector 178. Two bonding wires 175 electrically connect the light-emitting body 147 with the two conductive frames 177. An insulator 179 is filled within the space between and to physically separate the two conductive frames 177. The phosphor structure covers the light-emitting body 147. The reflector 178 includes Epoxy Molding Compound (EMC) or Silicone Molding Compound (SMC). In top view, the light-emitting unit 141 can have an area of 3.0 mm*3.0 mm, 2.8 mm*3.5 m, 1.6 mm*1.6 mm, 1.0 mm*1.0 mm, and so on. In addition, in this embodiment, an forward voltage of the light-emitting unit 141 only is about 3V, therefore, when the lighting apparatus is operated at the operating current of 5~20 mA and the operating voltage (forward voltage) of 100~130V or 240~320V, the total quantity of the light-emitting unit 141 is in a range of 33~44 or of 80~110. Alternatively, the quantity of the light-emitting unit 141 can be varied depending on actual requirements.

Figure 15D:
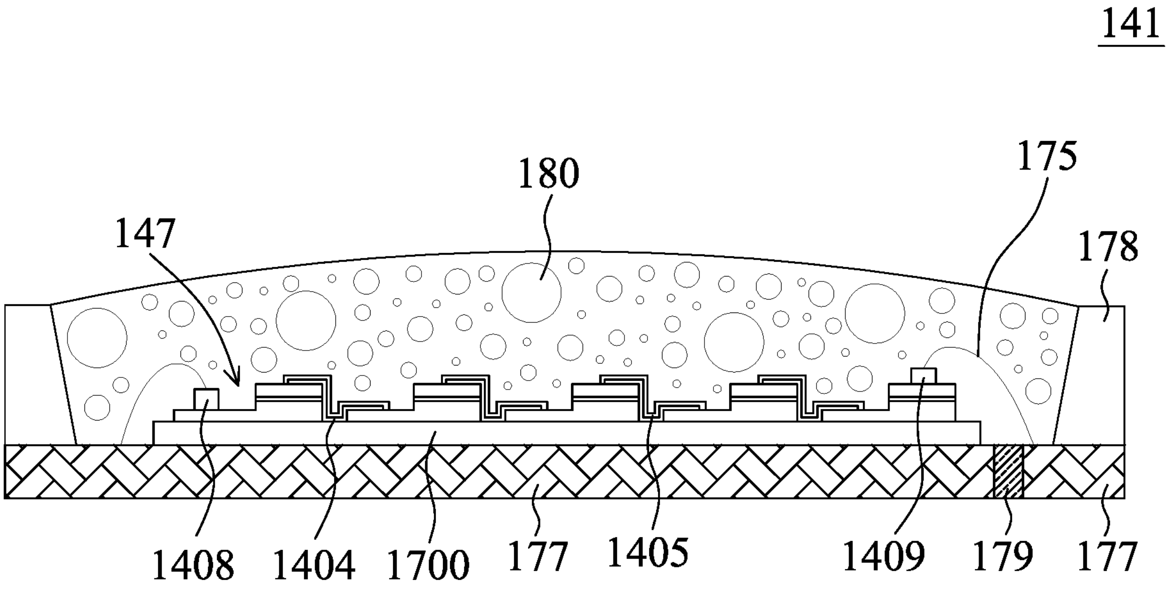
FIG. 15D shows a cross-sectional view of a light-emitting unit in accordance with another embodiment of the present disclosure.

FIG. 15D shows a cross-sectional view of the light-emitting unit 141 in accordance with another embodiment of the present disclosure. The light-emitting unit 141 of FIG. 15D is similar to that of FIG. 12C wherein devices or elements with similar or the same symbols represent those with the same or similar functions. In this embodiment, the light-emitting unit 141 includes five light-emitting bodies 147 commonly formed on a substrate 1700, and thus the forward voltage of the light-emitting unit 141 is about 15V. When the lighting apparatus is operated at the operating current of 5~20 mA and the operating voltage (forward voltage) of 100~130V or 240~320V, the total quantity of the light-emitting unit 141 is in a range of 6~9 or of 16~22. Alternatively, the light-emitting unit 141 includes eight light-emitting bodies 147, and thus the forward voltage of the light-emitting unit 141 is about 24V. When the lighting apparatus is operated at the operating current of 5~20 mA and the operating voltage (forward voltage) of 100~130V or 240~320V, the total quantity of the light-emitting unit 141 is in a range of 4~8 or of 10~14. Alternatively, the quantity of the light-emitting body in one light-emitting unit can be varied depending on actual requirements.

Figure 16A:
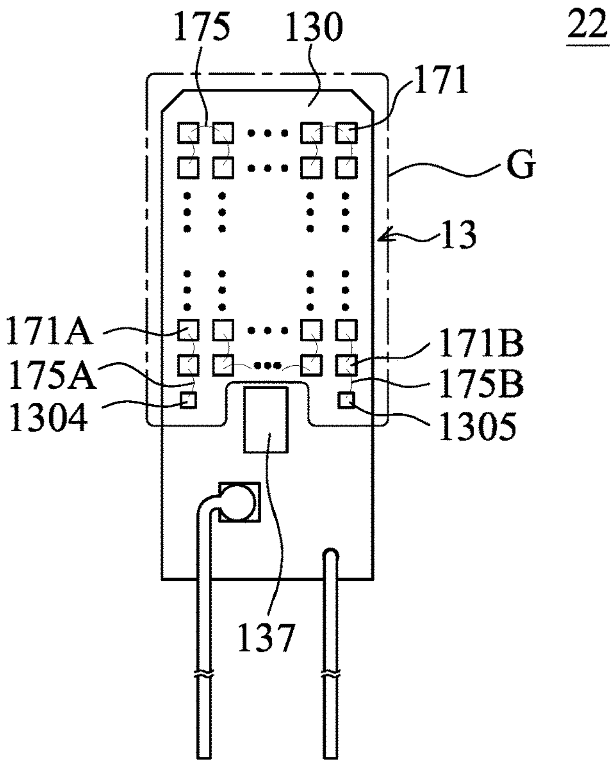
FIGS. 16A~16B show views of two opposite sides of a light-emitting device in accordance with another embodiment of the present disclosure.
Figure 16B:
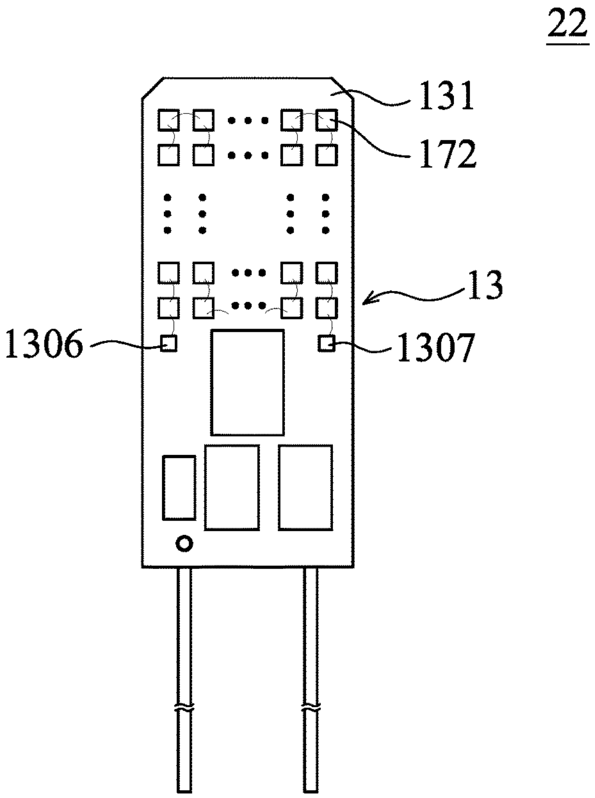
Figure 16C:
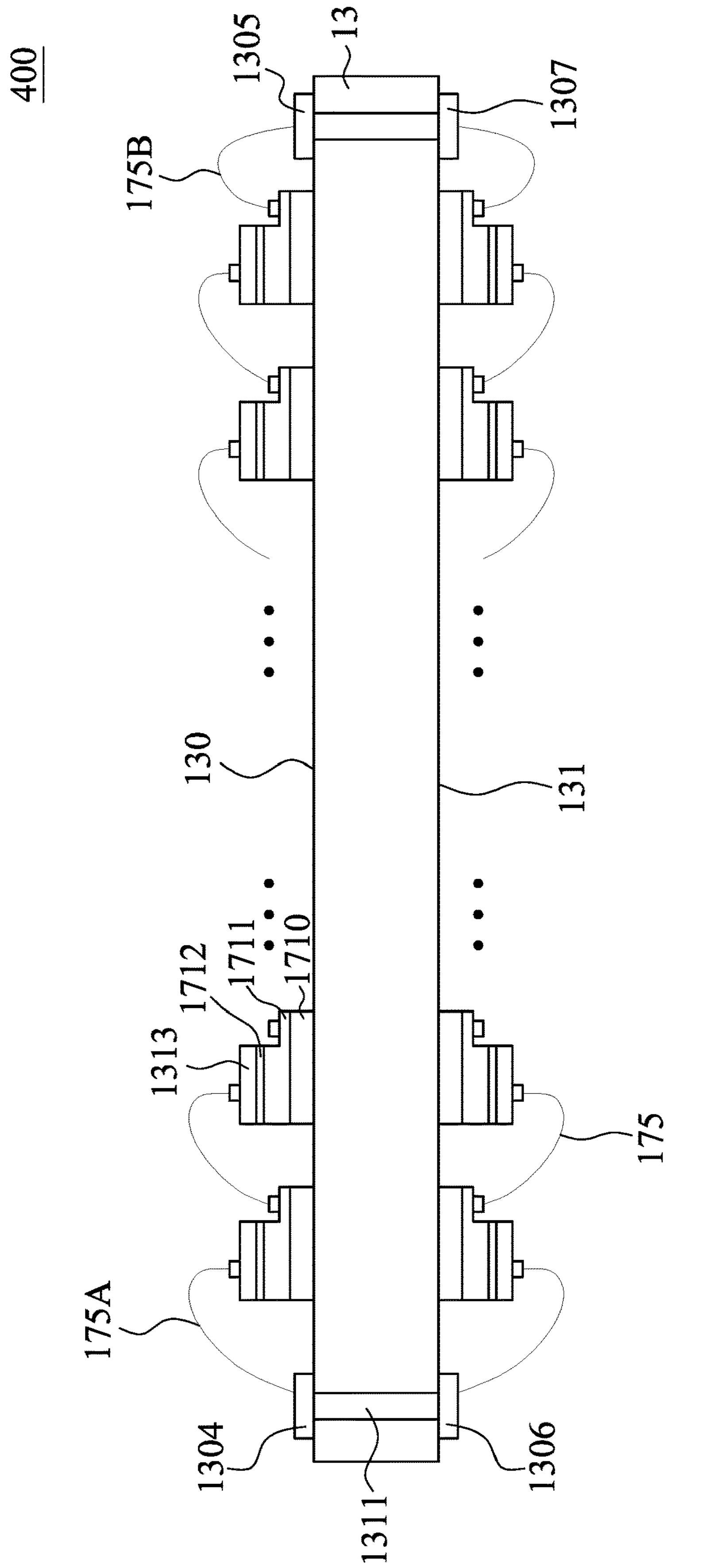
FIG. 16C shows an enlarged cross-sectional view of G in FIG. 16A.

FIGS. 16A-16B show views of the light-emitting device 22 in accordance with one embodiment of the present disclosure. FIG. 16A shows one side of the light-emitting device 22 and FIG. 16B shows another side of the light-emitting device 22. FIG. 16C is an enlarged view of G in FIG. 16A. The light-emitting device 22 of this embodiment can be applied in the aforesaid lighting apparatus 100, 200, 300, 400, 500. As shown in FIGS. 16A-16C, the light-emitting device 22 includes a board 13 having a first surface 130 and a second surface 131 opposite to the first surface 130. A first connection region 1304 and a second connection region 1305 are formed on the first surface 130 and disposed on two opposite sides of the first circuit structure 137. A plurality of light-emitting units 171, 172 is disposed on the first surface 130 and the second surface 131, respectively. Each of the light-emitting units 171, 172 includes a substrate 1710, a first-type semiconductor layer 1711, an active layer 1712, and a second-type semiconductor layer 1713. The first-type semiconductor layer 1711 and the second-type semiconductor layer 1713 can be a cladding layer or a confinement layer and provide electrons and holes such that electrons and holes can be combined in the active layer 1712 to emit light. The first-type semiconductor layer 1711, the active layer 1712, and the second-type semiconductor layer 1713 can include III-V group semiconductor material, such as AlxInyGa (1-x-y) N or AlxInyGa(1-x-y)P, wherein 0≤x, y≤1; (x+y)≤1, Based on the material of the active layer 1712, the light-emitting unit 171 can emit a red light with a peak wavelength of 610~650 nm; emit a green light with a peak wavelength of 530~570 nm; or emit a blue light with a peak wavelength of 450~490 nm. Each of the light-emitting units 171, 172 can emit the same or different light. As shown in FIGS. 16A and 16C, the light-emitting device further includes a plurality of bonding wires 175 electrically connecting the first-type semiconductor layer 1711 of one light-emitting unit 171 to the second-type semiconductor layer 1713 of adjacent light-emitting unit 171, thereby the light-emitting units 171 are electrically connected with each other in series. Furthermore, the bonding wire 175A connects the first-type semiconductor layer 1711 of the light-emitting unit 171A to the first connection region 1304, and the bonding wire 175B connects the second-type semiconductor layer 1713 of the light-emitting unit 171B to the second connection region 1305. The first circuit structure 137 is electrically connected to the first connection region 1304 and the second connection region 1305 so the first circuit structure 137 is electrically connected to the light-emitting unit 171.

As shown in FIGS. 16A and 16C, the bonding wires are electrically connected to the light-emitting units 172 such that light-emitting units 172 are electrically connected with each other in series. A third connection region 1309 and a fourth connection region 1307 are formed on the second surface 131. Likewise, the bonding wires 175 also connect the light-emitting unit 172A to the third connection region 1306, and connect the light-emitting unit 172B to the fourth connection region 1307. In addition, through holes 1311 with conductive material filled therein are formed at the position corresponding to the first connection region 1304 and the third connection region 1306, and at the position corresponding to the second connection region 1305 and the fourth connection region 1307, such that the light-emitting units 171, 172 at opposite sides of the board 13 are electrically connected with each other in series, wherein the circuit diagram is shown in FIG. 2E. A phosphor structure (not shown) covers all the light-emitting units 171, 172 so the lighting apparatus can emit a white light. A description of the phosphor structure and the white light can refer to other embodiments.

Figure 17:
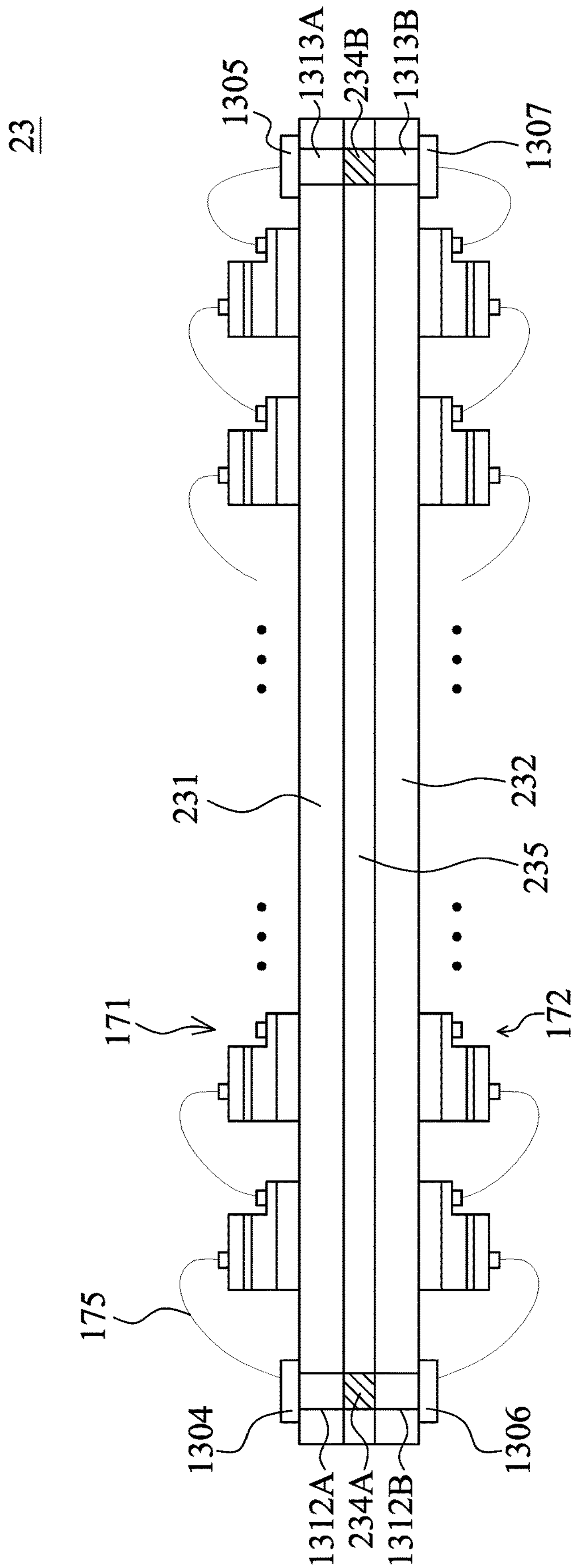
FIG. 17 shows a cross-sectional view of a light-emitting device in accordance with another embodiment of the present disclosure.

FIG. 17 shows a cross-sectional view of the light-emitting device 22 in accordance with one embodiment of the present disclosure. The light-emitting device 23 is similar to the light-emitting device 22, wherein devices or elements with similar or the same symbols represent those with the same or similar functions. The light-emitting device 23 includes a first board 231 and a second board 232, a plurality of light-emitting units 171 disposed on the first board 231, a plurality of light-emitting units 172 disposed on the second board 232. The bonding wires connect the light-emitting unit 171 to the first connection region 1304, and connect the light-emitting unit 172 to the third connection region 1306. The first board 231 and the second board 232 have first through holes 1312A, 1312B and second through holes 1313A, 1313B, respectively. The first through holes 1312A, 1312B and the second through holes 1313A, 1313B have a conductive material filled therein. The first through holes 1312A, 1312B are at a position corresponding to the first connection region 1304 and the third connection region 1306, respectively, such that the conductive materials in the first through holes 1312A, 1312B are electrically connected to the first connection region 1304 and the third connection region 1306. The second through holes 1313A are at a position corresponding to the second through region 1305 and the fourth connection region 1307, respectively, such that the conductive materials in the first through holes 1313A, 1313B are electrically connected to the second through region 1305 and the fourth connection region 1307. The light-emitting device 23 further includes conductive adhesives 234A, 234B. The conductive adhesive 234A connects the conductive material in the first through hole 1312A of the first board 231 with the conductive material in the first through hole 1312B of the second board 232. The conductive adhesive 234B connects the conductive material in the second through hole 1313A of the first board 231 with the conductive material in the second through hole 1313B of the second board 232. Accordingly, the light-emitting units 171, 172 are electrically connected to each other in series. The conductive adhesives 234A, 234B cannot be connected physically with each other and a non-conductive material (for example: air or electrically insulation adhesive) is formed between the conductive adhesives 234A, 234B. Likewise, a phosphor structure (not shown) covers all the light-emitting units 171, 172 so the lighting apparatus can emit a white light. A description of the phosphor structure and the white light can refer to other embodiments.

Figure 18A:
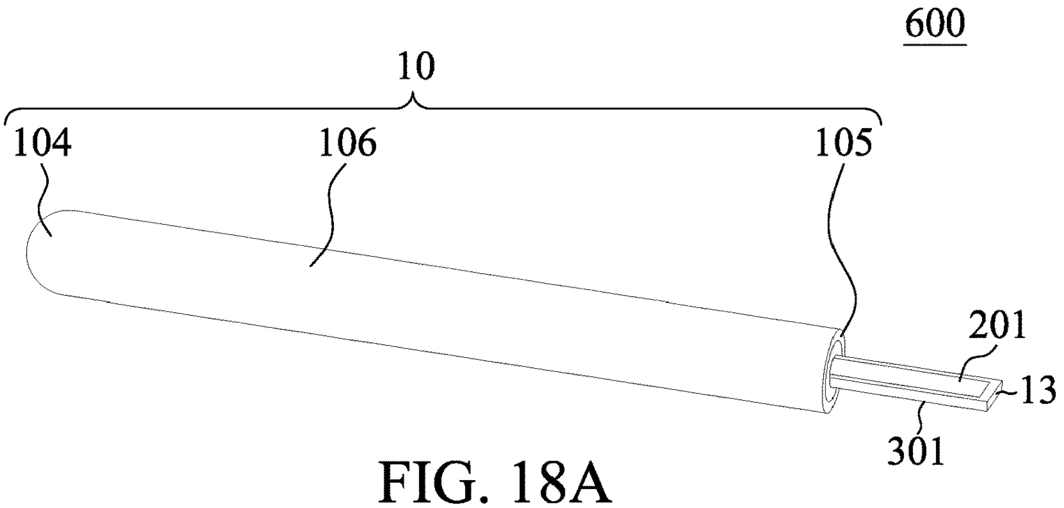
FIG. 18A shows a lighting apparatus in accordance with one embodiment of the present disclosure.
Figure 18B:
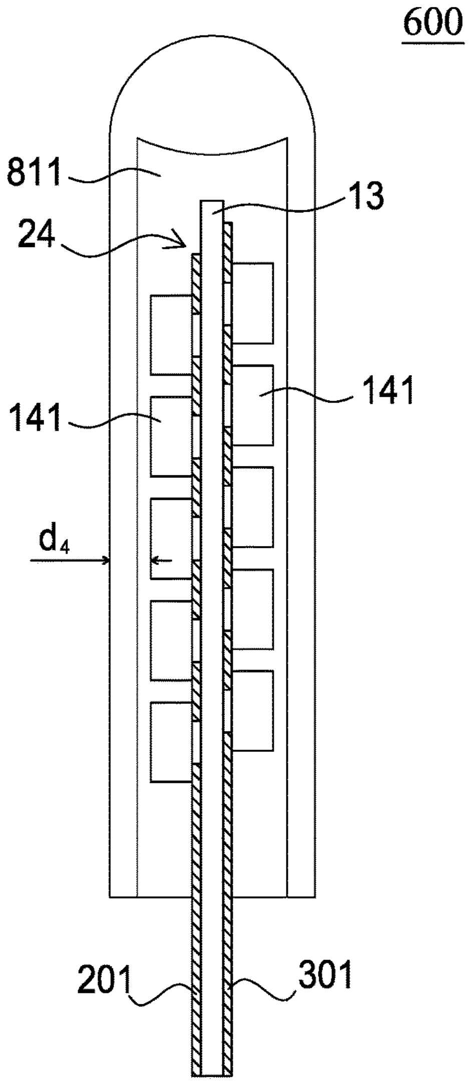
FIG. 18B shows a cross-sectional view of FIG. 18A.

FIG. 18A shows a lighting apparatus 600 in accordance with one embodiment of the present disclosure. The lighting apparatus 600 includes a package structure 10, a light-emitting device 24, a filler 811 and electrode pads 201, 301. The package structure 10 has a closed end 104, an opening end 105 and a middle portion 106 between the closed end 104 and the opening end 105. The middle portion 106 surrounds the light-emitting device 24 to expose the electrode pads 201, 301 out of the closed end 105. The electrode pads 201, 301 can be directly and electrically connected to an external circuit. As shown in FIG. 18A, since the filler 811 can include phosphor particles and/or diffusing particles, the light-emitting units 141 could not be clearly viewed from outside. In this embodiment, the package structure 10 is an elongated hollow cover and the lighting apparatus 600 can be used as a light-emitting tube. As shown in FIG. 18, the light-emitting device 24 includes a board 13 and a plurality of light-emitting units 141 disposed on two opposite sides of the board 13. According to the circuit design on the board 13, the light-emitting units 141 disposed on two opposite sides of the board 13 can be electrically connected with each other in parallel connection, in series connection or in bridge connection. In the present embodiment, the package structure 10 is spaced apart from the light-emitting unit 141 by a shortest distance (d4) smaller than 2 mm and the filler directly contacts the light-emitting unit 141 for efficiently dissipating heat from the light-emitting unit 141 to ambient (air) through the package structure 10 and the filler 811. In addition, because of the filler, the lighting apparatus 600 has a better hot/cold factor. To be more specific, when the lighting apparatus 600 is connected to the external source, in an initial state, a cold-state lighting efficiency (light output (lumen)/watt) is measured, hereinafter, in every period of time (for example. 30 ms, 40 ms, 50 ms, 80 ms, or 100 ms), the lighting efficiency is measured. When a difference between the adjacent measured light emitting efficiencies is smaller than 0.5%, the latter light efficiency is defined as a thermal steady state lighting efficiency. The hot/cold factor is a ratio of the thermal steady state lighting efficiency to the cold-state lighting efficiency. In this embodiment, when the filler is filled between the lighting apparatus 600 and the package structure 10, the hot/cold factor of the light-emitting device is R1, and when the filler is not filled between the lighting apparatus 600 and the package structure 10, the hot/cold factor of the light-emitting device is R2, wherein a difference of R1 and R2 is larger than 20%. In other embodiment, the package structure 10 can be made of a flexible material such as polyimide (PI).

Figure 18C:
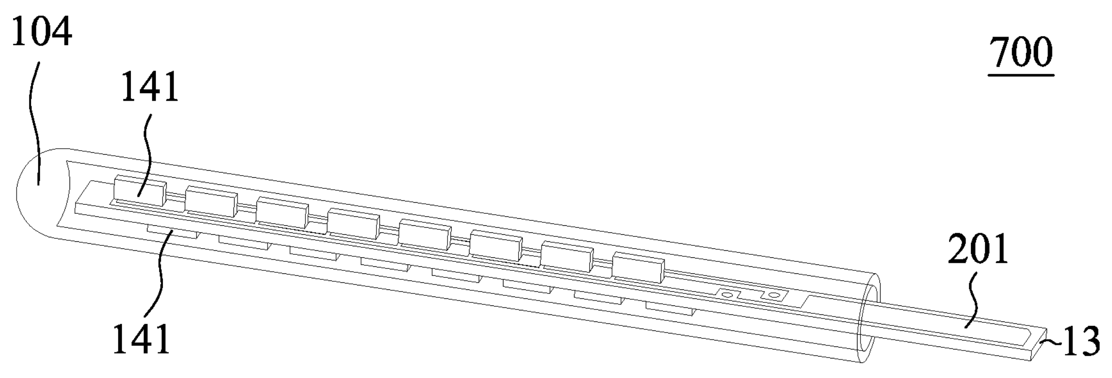
FIGS. 18C and 18D show a lighting apparatus in different angle of view in accordance with another embodiment of the present disclosure.
Figure 18D:
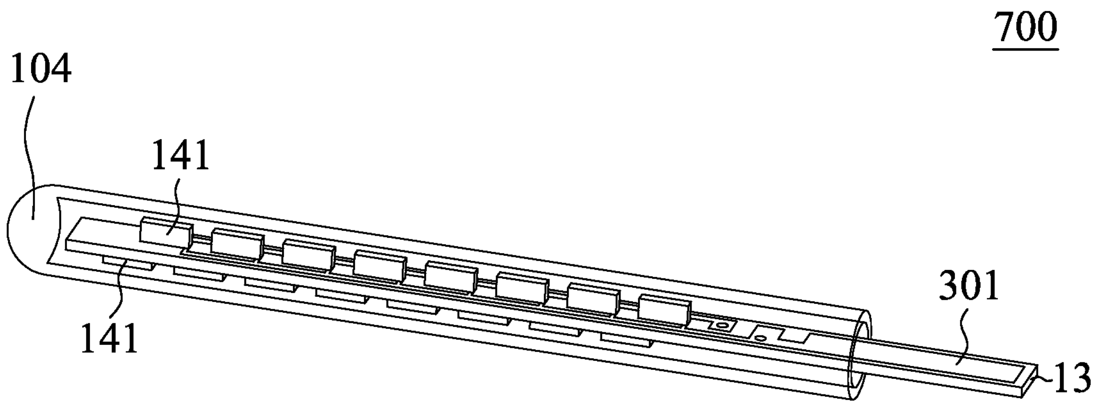

FIGS. 18C and 18D show the lighting apparatus 700 in different angle of view in accordance with another embodiment of the present disclosure. The lighting apparatus 700 is similar to the lighting apparatus 600 wherein devices or elements with similar or the same symbols represent those with the same or similar functions. The lighting apparatus 700 does not include a filler therein. Alternatively, the lighting apparatus 700 can include the filler but does not include phosphor particles and diffusing particles. Accordingly, the light-emitting units 141 of the lighting apparatus 700 can be viewed from outside. The light-emitting units 141 are disposed on two opposite sides of the board 13. According to the circuit design on the board 13, the light-emitting units 141 disposed on two opposite sides of the board 13 can be electrically connected with each other in parallel connection, in series connection or in bridge connection.

Figure 18E:
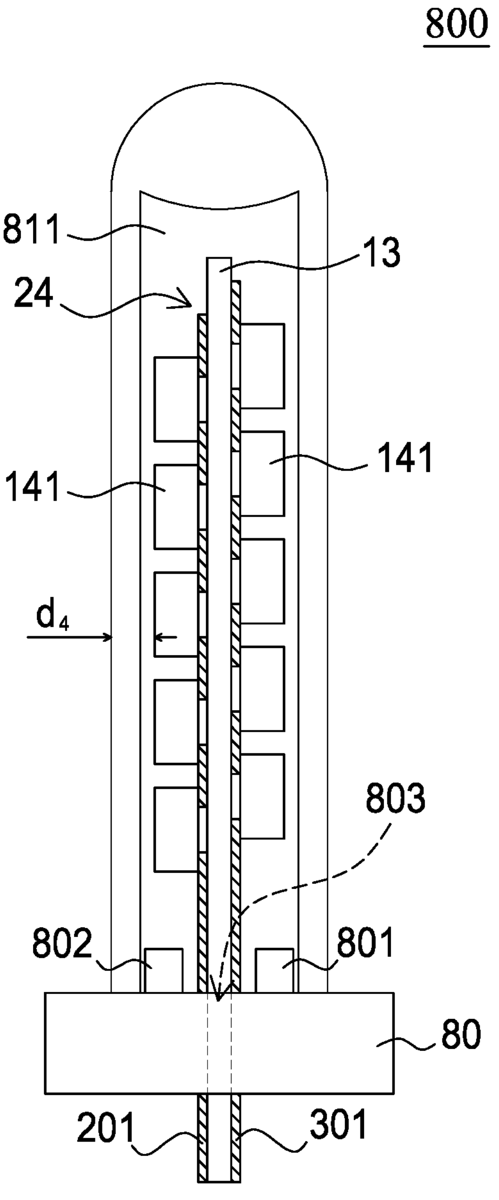
FIG. 18E shows a cross-sectional view of a lighting apparatus in accordance with another embodiment of the present disclosure.

FIG. 18E show a cross-sectional view of a lighting apparatus 800 in accordance with one embodiment of the present disclosure. The lighting apparatus 800 is similar to the lighting apparatus 600 wherein devices or elements with similar or the same symbols represent those with the same or similar functions. The lighting apparatus 800 further includes a holder 80. The holder 80 includes a first clamp portion 801, a second clamp portion 802, and a through hole 803. The first clamp portion 801 and the second clamp portion 802 are spaced apart from each other and define a space therebetween. The light-emitting device 24 has a part passing through the space and further through the through hole 803 to expose the electrode pads 201, 301 for electrically connecting to the external source. With the clamp portions 801, 802 tightly clamping the light-emitting device 24, the light-emitting device 24 can be mounted on the holder 80. In another embodiment, the space between the clamp portions 801, 802 is larger than a width of the light-emitting device 24 and does not contact the light-emitting device 24 directly so an adhesive substance (not shown) is filled within the space between the clamp portions 801, 802 for firmly mounting the light-emitting device 24 on the holder 80. The holder 80 substantially divides the light-emitting device 24 into two sides wherein one is with the light-emitting units 141 and the other is with the electrode pads 201, 301. The package structure 10 covers merely the side with light-emitting units 141 but does not cover the side with electrode pads 201, 301.

Figure 19A:
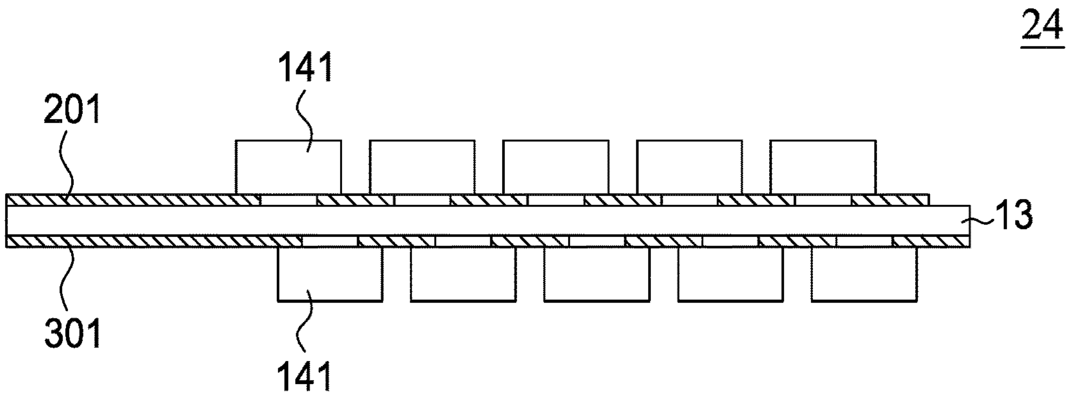
FIGS. 19A~19C show cross-sectional views of making a lighting apparatus in accordance with another embodiment of the present disclosure.
Figure 19B:
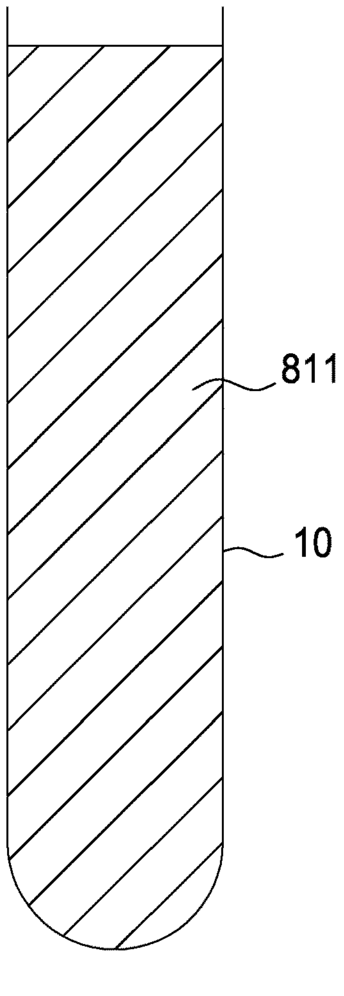
Figure 19C:
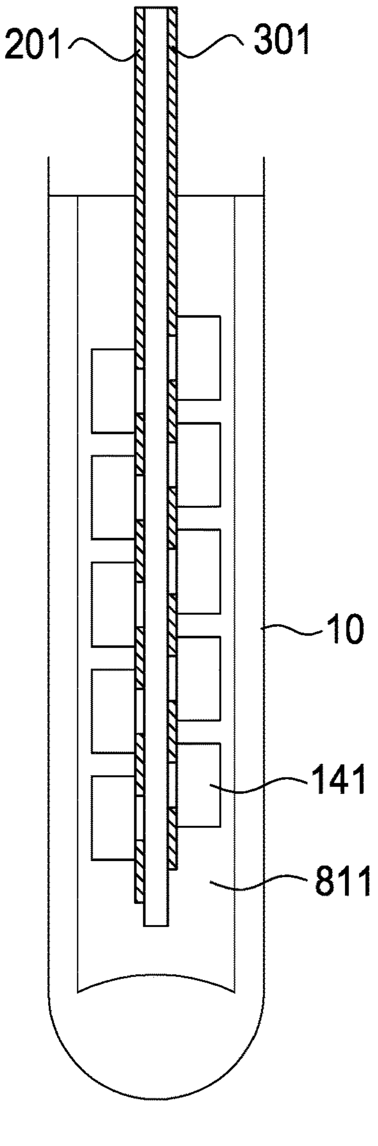

FIGS. 19A-19C show cross-sectional views of a method making the lighting apparatus 600 of FIG. 18A. Referring to FIG. 19A, a board 13 is provided and a plurality of light-emitting units 141 is disposed on the two opposite sides of the board 13 to form a light-emitting device 24. Referring to FIG. 19B, a package structure 10, which is a hollow cover in the present embodiment, is provided and a transparent substance 811, which can include a phosphor particles and/or a diffusing particles, is filled into the package structure 10. Referring to FIG. 19C, a portion of the light-emitting device 24 is embedded into the transparent substance 811. In the embedded step, gas (air, bubble) may be generated, and a degas step can be performed to remove the gas. Alternatively, the gas is not entirely removed so there is gas existing in the transparent substance 811. Subsequently, the transparent substance 811 can be solidified by heating or UV light. Optionally, before the solidification, a holder is provided and the light-emitting device 24 passes through the through hole of the holder and is mounted on the holder (as shown in FIG. 18E) such that the side with the light-emitting units 141 is fully sealed by the package structure 10 and the electrode pads 201, 301 are exposed for electrically connecting to the external source.

Figure 20A:
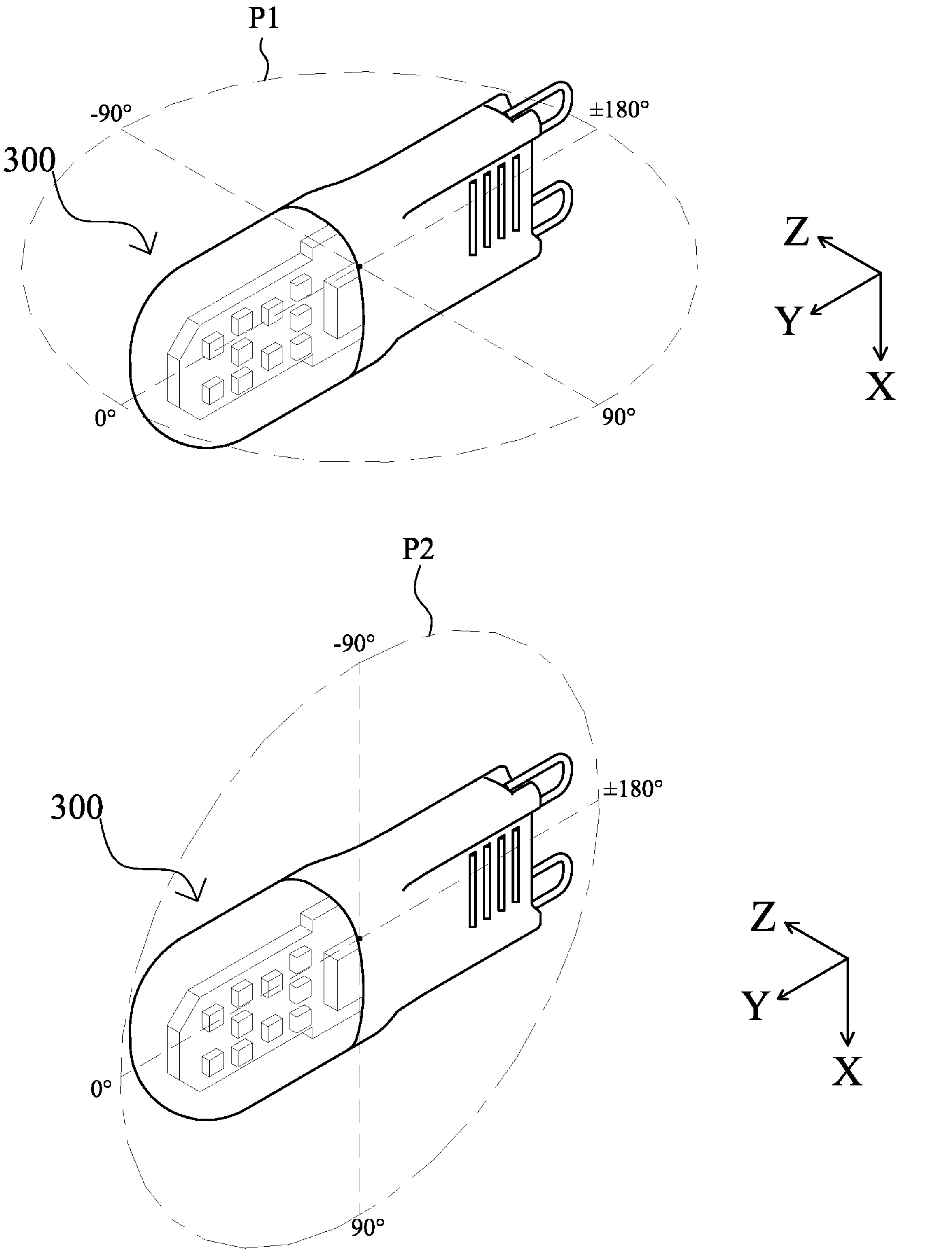
FIG. 20A is a view showing the lighting apparatus and the imaginary circles.
Figure 20B:
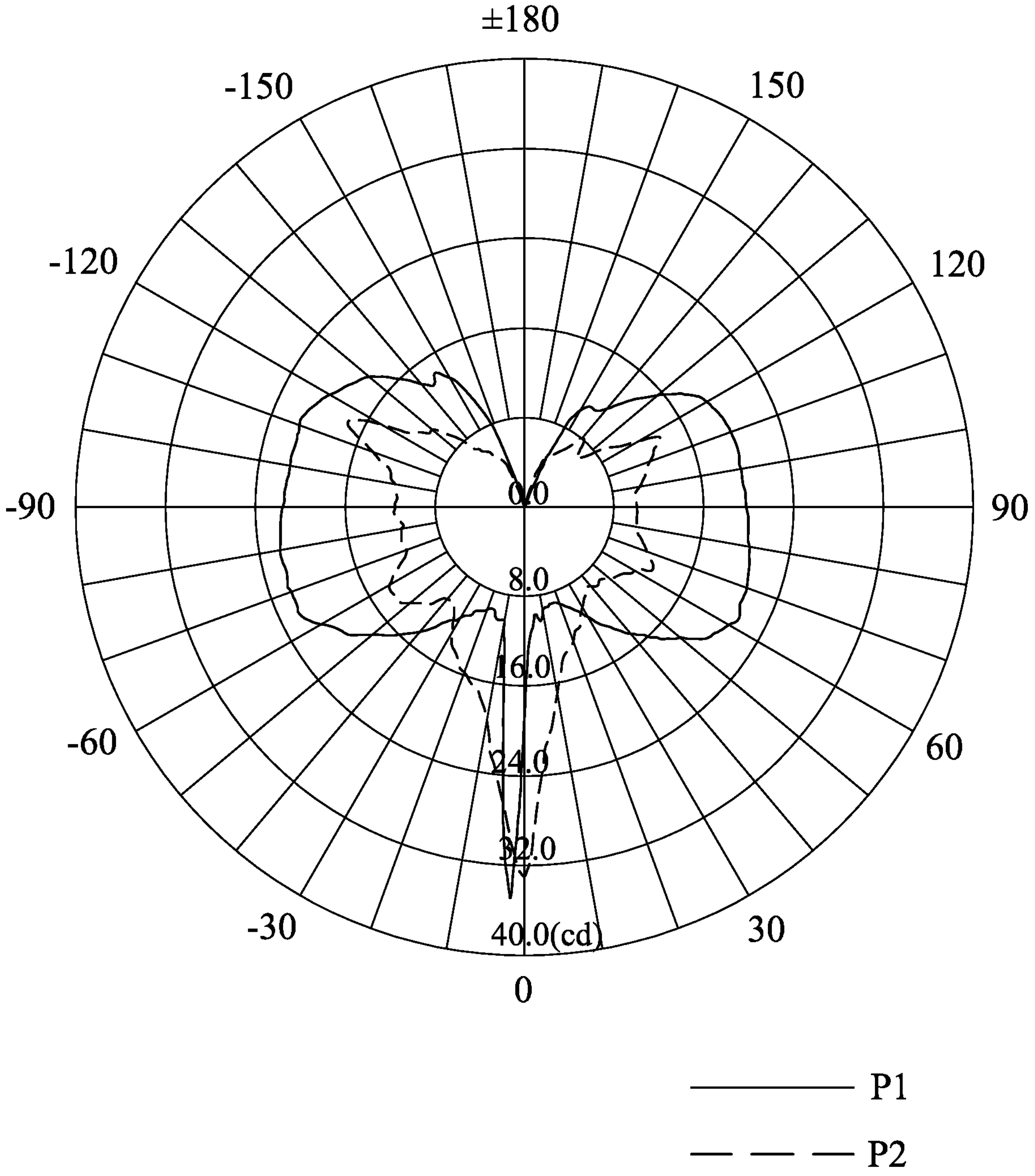
FIGS. 20B~20D show the luminous intensity distribution curves, wherein the first filler has diffusing particles with different concentrations.
Figure 20C:
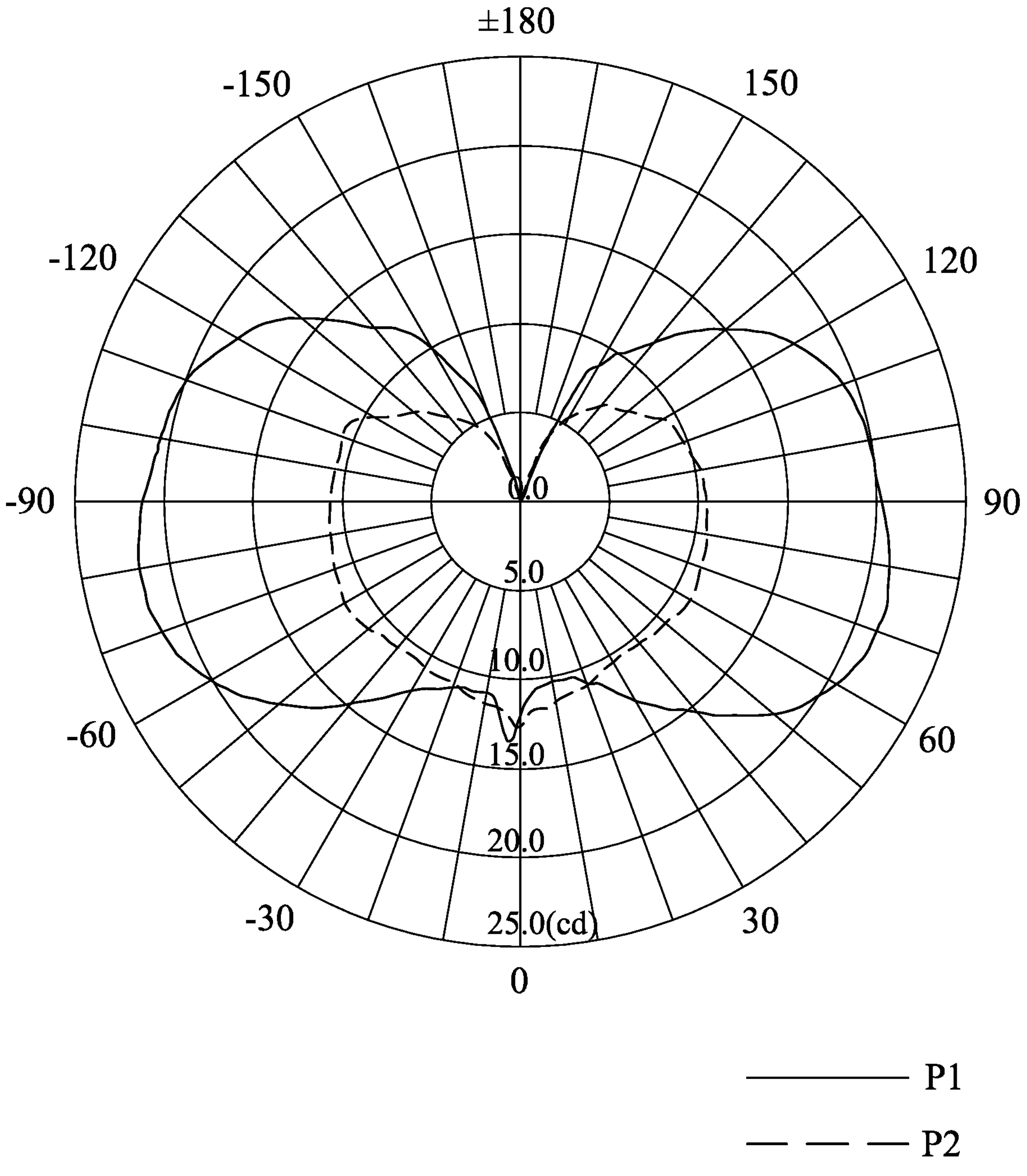
Figure 20D:
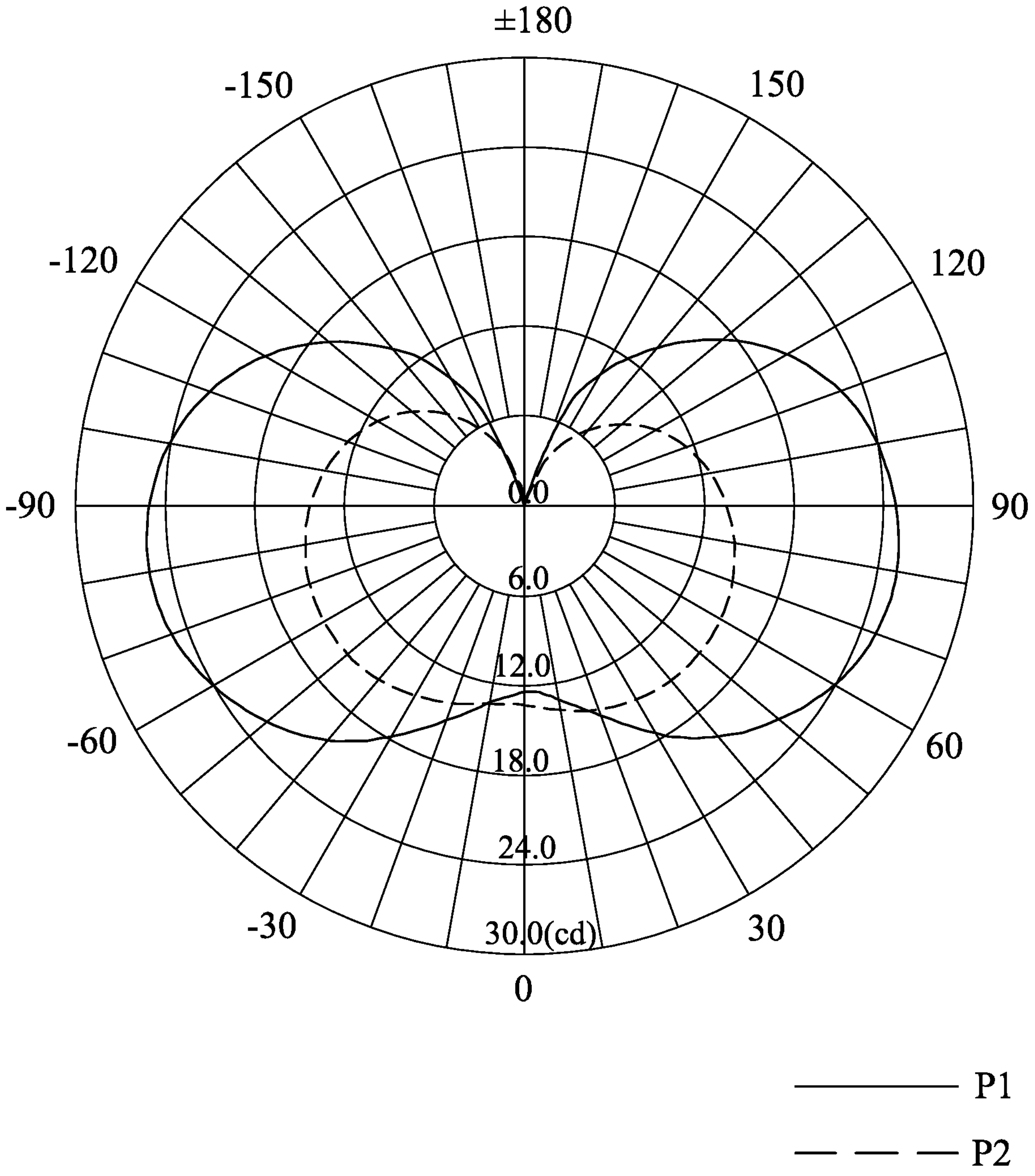

FIG. 20A is a view showing the lighting apparatus 300 and the imaginary circles (P1 circle and P2 circle). When the lighting apparatus 300 emits light, the light intensity of each point on P1 circle or P2 circle is measured. Furthermore, the light intensity of each point on the circle and angle are plotted to obtain the luminous intensity distribution curve. For measuring, the lighting apparatus 300 has a center at a position corresponding to the centers of the P1 circle and P2 circle. The related descriptions of the lighting apparatus 300 are referred to the aforesaid embodiments. FIGS. 20B-20D show the luminous intensity distribution curves, wherein the first filler having diffusing particles such as $TiO_2$ with different concentrations is filled in the inner chamber, and the lighting apparatus 300 is operated under an operating current of 100 mA. The weight concentrations of the diffusing particles in FIGS. 20B-20D are 0%, 0.01%, and 0.02%.

As shown in FIG. 20B, the solid line represents the luminous intensity distribution curve which is obtained by measuring the P1 circle of the lighting apparatus of FIG. 20A, and the dashed line represents the luminous intensity distribution curve which is obtained by measuring the P2 circle of the lighting apparatus of FIG. 20A. As shown in the solid line of FIG. 20B, the light intensity of 0° is about 35 candela (cd); the light intensity from 0° to 30° is gradually decreased; the light intensity from 30° to 90° is gradually increased; the light intensity of 180° is almost zero; the light intensity from 0° to −20° is gradually increased; the light intensity from −20° to −70° is gradually increased; and the light intensity from −70° to −180° is gradually decreased. As shown in the dashed line of FIG. 20B, the light intensity of 0° is about 33.2 candela (cd); the light intensity from 0° to 40° is gradually decreased; the light intensity from 40° to 60° is gradually increased; the light intensity from 60° to 90° is gradually decreased; the light intensity from 90° to 120° is gradually increased; the light intensity from 120° to 180° is gradually decreased; the light intensity of 180° is almost zero; the light intensity from 0° to −40° is gradually decreased; the light intensity from −40° to −60° is gradually increased; the light intensity from −60° to −115° is gradually decreased and then increased; and the light intensity from −115° to −180° is gradually decreased. The emitting angle of the lighting apparatus is about 130°.

As shown in FIG. 20C, the solid line represents the luminous intensity distribution curve which is obtained by measuring the P1 circle of the lighting apparatus of FIG. 20A; and the dashed line represents the luminous intensity distribution curve which is obtained by measuring the P2 circle of the lighting apparatus of FIG. 20A. As shown in the solid line of FIG. 20C, the light intensity of 0° is about 12.7 candela (cd); the light intensity from 0° to 10° is gradually decreased; the light intensity from 10° to 75° is gradually increased; the light intensity from 75° to 180° is gradually decreased; the light intensity of 180° is almost zero; and the curve in the light intensity from 0° to −180° is similar to that from 0° to 180°. In addition, the light intensity distribution within a range of angle of 0° to 180° is symmetrical to that within a range of angle of 0° to −180° with respect to the axis of 0°-180°. As shown in the dashed line of FIG. 20C, the light intensity of 0° is about 12 candela (cd); the light intensity from 0° to 60° is gradually decreased; the light intensity from 60° to 180° is gradually increased; the light intensity of 180° is almost zero; and the curve in the light intensity from 0° to −180° is similar to that from 0° to 180°. In addition, the light intensity distribution within a range of angle of 0° to 180° is symmetrical to that within a range of angle of 0° to −180° with respect to the axis of 0°-180°. The emitting angle of the lighting apparatus is about 285°.

As shown in FIG. 20D, the solid line represents the luminous intensity distribution curve which is obtained by measuring the P1 circle of the lighting apparatus of FIG. 20A; and the dashed line represents the luminous intensity distribution curve which is obtained by measuring the P2 circle of the lighting apparatus of FIG. 20A. As shown in the solid line of FIG. 20D, the light intensity of 0° is about 12.5 candela (cd); the light intensity from 0° to 180° is gradually increased and then decreased; and the curve in the light intensity from 0° to −180° is similar to that from 0° to 180°. In addition, the light intensity distribution within a range of angle of 0° to 180° is symmetrical to that within a range of angle of 0° to −180° with respect to the axis of 0°-180°. As shown in the dashed line of FIG. 20D, the light intensity of 0° is about 13.4 candela (cd); the light intensity from 0° to 180° is gradually increased and then decreased; the light intensity of 180° is almost zero; and the curve in the light intensity from 0° to −180° is similar to that from 0° to 180°. In addition, the light intensity distribution within a range of angle of 0° to 180° is symmetrical to that within a range of angle of 0° to −180° with respect to the axis of 0°-180°. The emitting angle of the lighting apparatus is about 280°.

Figure 20E:
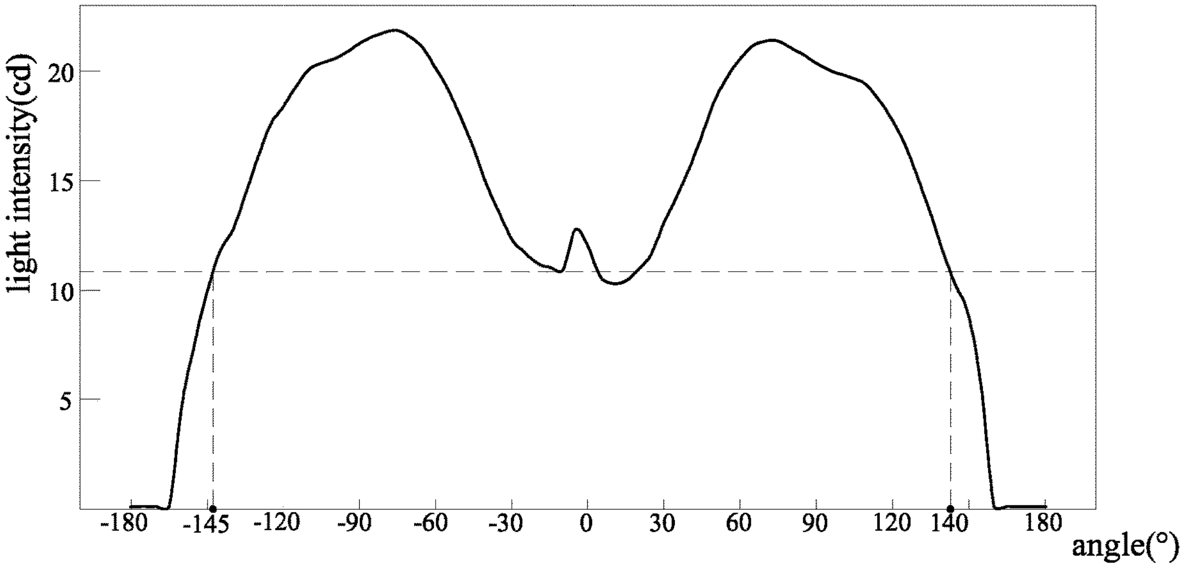
FIG. 20E is a relationship curve between the light intensity and angle.

The emitting angle described in the FIGS. 20B-20D is defined as the angular range from the maximum light intensity down to 50% of the maximum light intensity. For example, FIG. 20E shows a relationship curve between the light intensity and angle drawn using a Cartesian coordinate system (x coordinate represents angle; y coordinate represents light intensity) transformed from the luminous intensity distribution curve (polar diagram) obtained by measuring the P1 circle of the lighting apparatus of FIG. 20A. Referring to FIG. 20E, the maximum light intensity is about 21.8 candela and the value of 50% the maximum light intensity is 10.9 candela. A line is plotted whereat the value is 10.9 candela in the y coordinate to intersect the curve at two points (two intersections) and an angular range between the two points is calculated to obtain the emitting angle. When the line is intersected with the curve at more than two points (> two intersections), the angular range between the two points far away from each other is calculated to obtain the emitting angle. In addition, in this embodiment, it shows only the luminous intensity distribution curves obtained by measuring the P1 circle and P2 circle of the lighting apparatus, and the light intensity of different circles (different directions) can also be measured to obtain the luminous intensity distribution curves depending on different requirements. Moreover, each circle has an emitting angle, and a maximum value among the emitting angles is defined as the emitting angle of the lighting apparatus when calculating these emitting angles.

As shown in FIGS. 20B-20D, when the concentration of the diffusing particles is larger, the light distribution is more uniform, but the diffusing particles absorb light, which results in a slight decrease of the light intensity of the lighting apparatus.

Figure 21:
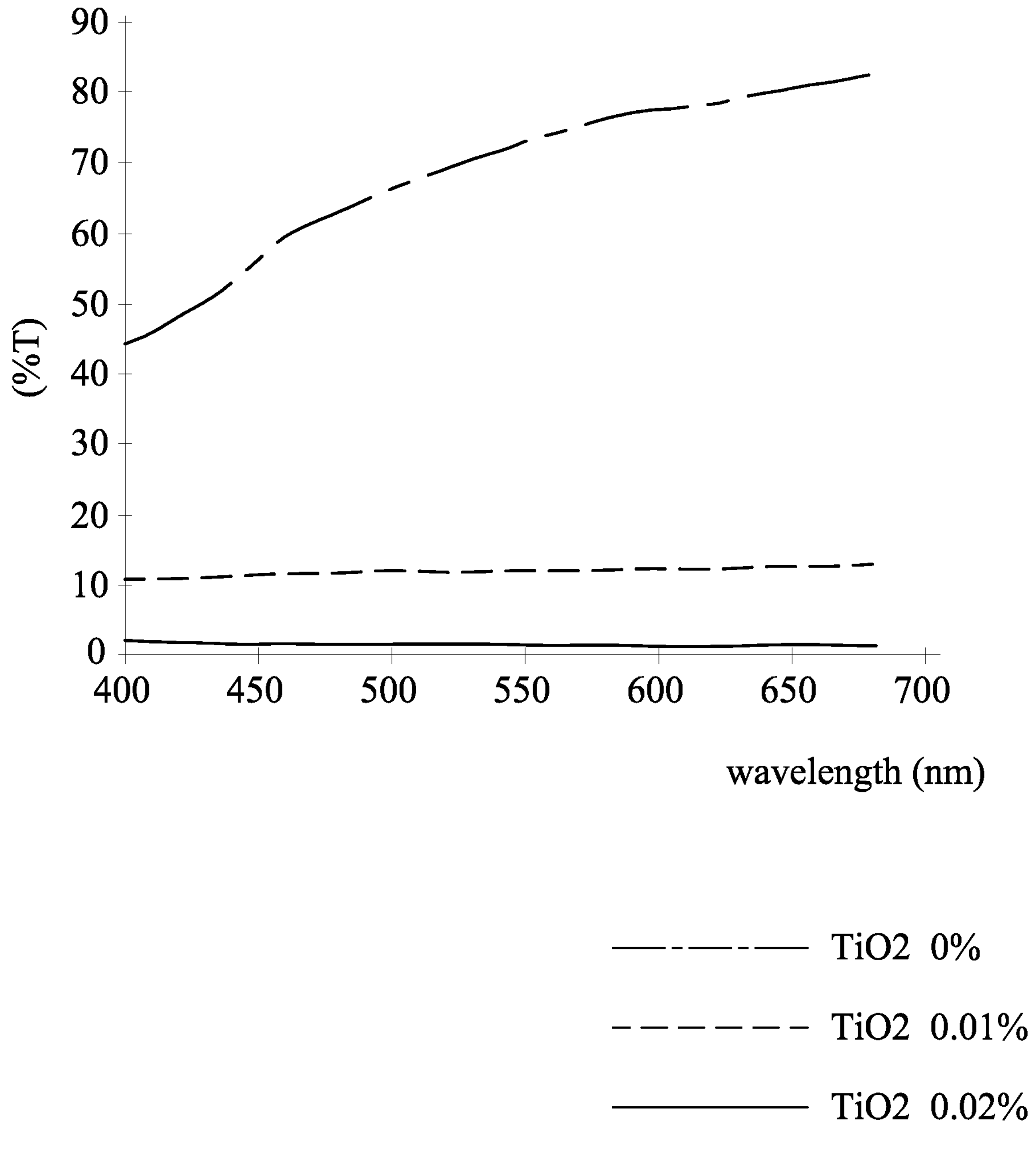
FIG. 21 shows a relationship curve between transmittance and wavelength wherein the diffusing particles with different concentrations are filled in the first filler.

FIG. 21 shows a relationship curve between transmittance and wavelength wherein the diffusing particles with different concentrations filled in the first filler. The measuring method including following steps is described:

Three specimens are provided: specimen A (filler); specimen B (filler+0.01% $TiO_2$); and specimen C (filler+0.02% $TiO_2$);

Three specimens are made into test samples A-C with a 1 cm thickness;

The transmittances of the three specimens are measured by a UV/Vis Spectrophotometer (Hitachi Instrument Inc. U-3000). The measurement is described as dividing the mercury lamp into two beams that simultaneously pass through the standard glass sample (thickness: 1 mm, n=1.52) and the test sample; comparing the fraction of light that passes through the glass sample and the test sample; after calculating using the data of the glass sample as a baseline, and the relative transmittance in different wavelengths can be acquired.

As shown in FIG. 21, the relative transmittance (% T) of test sample A in the wavelength of 400 nm-700 nm is larger than 40% and is 56.5% in the wavelength of 450 nm. The relative transmittance (% T) of test sample B in the wavelength of 400 nm-700 nm is of about 10% and is 11.5% in the wavelength of 450 nm. The relative transmittance (% T) of test sample C in the wavelength of 400 nm-700 nm is less than 5% and is 1.7% in the wavelength of 450 nm. Accordingly, when the weight concentration of $TiO_2$ is increased, the transmittance is then decreased.

Referring to FIGS. 20B-21, due to light absorption of light scattering of the diffusing particles, when the filler has the diffusing particles dispersed therein, the diffusing particles can improve the emitting angle of the lighting apparatus. However, the transmittance of the lighting apparatus is reduced and a light dissipation occurs because of light absorption of the diffusing particles. Therefore, when the light-emitting units 141 are covered by the first filler with the diffusing particles dispersed therein and the transmittance of the light produced by the light-emitting units 141 of the lighting apparatus is less than 50%, the emitting angle of the lighting apparatus is larger than 200°.

As shown in FIGS. 1B and 11A, the light-emitting body of the light-emitting units 141, 151 has a main lighting direction (indicated by arrow) substantially perpendicular to a length direction of the lighting apparatus 100. The package structure 10, the board 13 and the base 11 are assembled as the lighting apparatus along the length direction. Similarly, the light-emitting units of FIGS. 5, 8A, 8C, 16A~B have the same main lighting direction as that of FIG. 11A and also substantially perpendicular to the length direction of the lighting apparatus.

The aforesaid lighting apparatus and light-emitting tube can also be applied in U-shaped lamp, spiral lamp, bulb lamp, candle lamp, other lighting fixtures (for example, troffer).

It will be apparent to those having ordinary skill in the art that various modifications and variations can be made to the devices in accordance with the present disclosure without departing from the scope or spirit of the disclosure. In view of the foregoing, it is intended that the present disclosure covers modifications and variations of this disclosure provided they fall within the scope of the following claims and their equivalents.

What is claimed is:

1. A light-emitting unit, comprising:
a substrate;
a first light-emitting body formed on the substrate, and having a first area in a top view;
a second light-emitting body formed on the substrate, and having a second area in the top view, wherein the second area is different from the first area;
a third light-emitting body formed on the substrate and electrically connected to the first light-emitting body and the second light-emitting body;
a first electrode covering the first light-emitting body and the second light-emitting body, and electrically connected to the first light-emitting body;
a second electrode separated from the first electrode, and covering the second light-emitting body without covering the first light-emitting body; and
a transparent element enclosing the first light-emitting body, the second light-emitting body, and the third light-emitting body.

2. The light-emitting unit according to claim 1, wherein the first light-emitting body has a first longer side and a first shorter side, and the second light-emitting body has a second longer side and a second shorter side which is parallel to the first longer side, and the first longer side is larger than the second shorter side.

3. The light-emitting unit according to claim 2, wherein the third light-emitting body has a third longer side and a third shorter side which is parallel to the first longer side, and the second longer side is parallel to the third longer side.

4. The light-emitting unit according to claim 1, wherein the first electrode does not cover the third light-emitting body.

5. The light-emitting unit according to claim 1, wherein the second light-emitting body has a portion not covered by the first electrode.

6. The light-emitting unit according to claim 1, further comprising a first extension electrode connected to the first electrode and extending beyond the first light-emitting body.

7. The light-emitting unit according to claim 1, further comprising a second extension electrode connected to the second electrode and extending beyond the second light-emitting body.

8. The light-emitting unit according to claim 6, wherein the first extension electrode is arranged on the transparent element.

9. The light-emitting unit according to claim 6, wherein the transparent element has a side surface, the first extension electrode extends to the side surface without extending beyond the side surface.

10. The light-emitting unit according to claim 6, wherein the first extension electrode has an outer side surface which is not flush with an outer surface of the transparent element.

11. The light-emitting unit according to claim 1, wherein the transparent element includes epoxy, silicone, or PET.

12. The light-emitting unit according to claim 1, wherein 40%~100% of the first area is covered by the first electrode.

13. The light-emitting unit according to claim 1, wherein 10%~70% of the second area is covered by the second electrode.

14. The light-emitting unit according to claim 1, wherein the third light-emitting body has a third area in the top view, and 10%~70% of the third area is covered by the second electrode.

15. The light-emitting unit according to claim 14, wherein the third area is different from the first area and the second area.

16. The light-emitting unit according to claim 1, wherein the first electrode has an area which is 10%~50% of an area of the substrate.

17. The light-emitting unit according to claim 1, wherein the second light-emitting body and the third light-emitting body are integrally formed in a rectangular shape.

18. The light-emitting unit according to claim 1, wherein the first light-emitting body includes an inclined side surface.

19. The light-emitting unit according to claim 1, wherein the transparent element includes a plurality of phosphor particles.

20. The light-emitting unit according to claim 1, further comprising a fourth light-emitting body arranged on the substrate and having a fourth area in the top view, wherein 40%~100% of the fourth area is covered by the first electrode.

* * * * *